United States Patent
Lee et al.

(10) Patent No.: US 9,716,912 B2
(45) Date of Patent: *Jul. 25, 2017

(54) TRANSMISSION METHOD FOR BROADCAST SERVICE, RECEPTION METHOD THEREFOR, AND RECEPTION APPARATUS THEREFOR

(71) Applicant: LG ELECTRONICS INC., Seoul (KR)

(72) Inventors: Joonhui Lee, Seoul (KR); Gomer Thomas, Princeton Junction, NJ (US); Jongyeul Suh, Seoul (KR); Kwansuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,231

(22) Filed: Mar. 21, 2016

(65) Prior Publication Data

US 2016/0277788 A1 Sep. 22, 2016

Related U.S. Application Data

(63) Continuation of application No. 14/113,037, filed as application No. PCT/KR2012/003097 on Apr. 20, 2012, now Pat. No. 9,326,045.

(Continued)

(51) Int. Cl.
*G06F 3/00* (2006.01)
*G06F 13/00* (2006.01)
(Continued)

(52) U.S. Cl.
CPC ..... *H04N 21/4345* (2013.01); *H04N 21/2353* (2013.01); *H04N 21/2362* (2013.01);
(Continued)

(58) Field of Classification Search
None
See application file for complete search history.

(56) References Cited

U.S. PATENT DOCUMENTS

2002/0162120 A1* 10/2002 Mitchell ............... H04N 7/165
725/135
2009/0025051 A1 1/2009 Hong et al.
(Continued)

FOREIGN PATENT DOCUMENTS

KR 10-2009-0096336 A 9/2009
KR 10-2009-0127826 A 12/2009
(Continued)

*Primary Examiner* — William J Kim
(74) *Attorney, Agent, or Firm* — Dentons US LLP

(57) ABSTRACT

A method of a broadcast receiving device to receive broadcast service includes: receiving a broadcast table; receiving service signaling data corresponding to a service object; determining a consumption model of the service object on the basis of the service signaling data; receiving a content item configuring the service object on the basis of the service signaling data when the consumption model is a predetermined consumption model; displaying a guide on content on the basis of the broadcast table or the service signaling data; identifying one of the received content item according to an additional information request on the content; and controlling the guide on the basis of the identified content item.

6 Claims, 74 Drawing Sheets

Related U.S. Application Data

(60) Provisional application No. 61/477,174, filed on Apr. 20, 2011.

(51) Int. Cl.

| | |
|---|---|
| H04N 5/445 | (2011.01) |
| H04N 7/16 | (2011.01) |
| H04N 7/173 | (2011.01) |
| H04N 21/434 | (2011.01) |
| H04N 21/658 | (2011.01) |
| H04N 21/266 | (2011.01) |
| H04N 21/435 | (2011.01) |
| H04N 21/84 | (2011.01) |
| H04N 21/235 | (2011.01) |
| H04N 21/2362 | (2011.01) |
| H04N 21/462 | (2011.01) |
| H04N 21/482 | (2011.01) |

(52) U.S. Cl.
CPC ......... *H04N 21/266* (2013.01); *H04N 21/435* (2013.01); *H04N 21/4622* (2013.01); *H04N 21/482* (2013.01); *H04N 21/6581* (2013.01); *H04N 21/84* (2013.01)

(56) References Cited

U.S. PATENT DOCUMENTS

2009/0320087 A1 12/2009 Song et al.
2010/0134701 A1 6/2010 Eyer

FOREIGN PATENT DOCUMENTS

KR 10-2009-0127840 A 12/2009
KR 10-2010-0086440 A 7/2010

\* cited by examiner

FIG.4

| Service protection OMA BCAST DRM | Signaling Channel Service-SMT | OMA BCAST Service Guide | NRT Content Items / Files |
|---|---|---|---|
| | | FLUTE | |
| | | ALC / LCT | |
| UDP | | | |
| IP | | | |
| RS Frame | | | |
| M/H Physical Layer | | | |
| 8VSB Physical Layer | | | |

FIG.5

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for)i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG.6

| service_type | Meaning |
|---|---|
| 0x00 | [Reserved] |
| 0x01 | analog_television – The virtual channel carries analog television programming |
| 0x02 | ATSC_digital_television – The virtual channel carries television programming (audio, video and optional associated data) conforming to ATSC standards |
| 0x03 | ATSC_audio – The virtual channel carries audio programming (audio service and optional associated data) conforming to ATSC standard s. |
| 0x04 | ATSC_data_only_service – The virtual channel carries a data service conforming to ATSC standards, but no video of stream_type 0x02 or audio of stream_type 0x81. |
| 0x05-0x3F | [Reserved for future ATSC use] |

FIG.7

| Value | Meaning |
|---|---|
| 0x00 | [ Reserved ] |
| 0x01 | Analog_television-The virtual channel carries analog television programming |
| 0x02 | ATSC_digital_television-The virtual channel carries television programming (audio, video and optional data) conforming to ATSC standards. |
| 0x03 | ATSC_audio-The virtual channel carries audio programming (audio service and optional data) conforming to ATSC standards. |
| 0x04 | ATSC_data_only_service-The virtual channel carries a data service conforming to ATSC standards, but no video of stream_type 0x02 or audio of stream_type 0x81. |
| 0x05 | Software Download Data Service see A/97 |
| 0x06 | Unassociated/small screen service see A/65C Amendment 1 |
| 0x07 | Parameterized Service New A/V CODEC |
| 0x08 | ATSC_nrt_service-The virtual channel carries a NRT service conforming to ATSC standards. |
| 0x09-0x7F | [ Reserved for future ] |
| 0x80-0xFF | [ User Private ] |

FIG.8

| Syntax | No. of bits | Format |
|---|---|---|
| data_service_table_section() { | | |
|    table_id | 8 | 0xCF |
|    section_syntax_indicator | 1 | bslbf |
|    private_indicator | 1 | bslbf |
|    reserved | 2 | '11' |
|    private_section_length | 12 | uimsbf |
|    table_id_extension | 16 | uimsbf |
|    reserved | 2 | '11' |
|    version_number | 5 | uimsbf |
|    current_next_indicator | 1 | bslbf |
|    section_number | 8 | uimsbf |
|    last_section_number | 8 | uimsbf |
|    data_service_table_bytes() | | |
|    CRC_32 | 32 | rpchof |
| } | | |

| Syntax | No. of bits | Format |
|---|---|---|
| data_service_table_bytes() { | | |
|    sdf_protocol_version | 8 | uimsbf |
|    application_count_in_section | 8 | uimsbf |
|    if( application_count_in_section > 0 ) { | | |
|      for( j = 0; j <application_count_in_section; j++) { | | |
|        compatibility_descriptor() | | |
|        app_id_byte_length | 16 | uimsbf |
|        if(app_id_byte_length > 1) { | | |
|           app_id_description | 16 | uimsbf |
|           for(i-0;i< app_id_byte_length-2;i++) { | | |
|              app_id_byte | 8 | bslbf |
|           } | | |
|        } | | |
|        tap_count | 8 | uimsbf |
|        for( i = 0; i < tap_count; i++) { | | |
|           protocol_encapsulation | 8 | uimsbf |
|           action_type | 7 | uimsbf |
|           resource_location | 1 | bslbf |
|           Tap() | | |
|           tap_info_length | 16 | uimsbf |
|           for( k=0; k<N; k++) { | | |
|              descriptor() | | |
|           } | | |
|        } | | |
|        app_info_length | 16 | uimsbf |
|        for( i=0; i< M; i++) { | | |
|           descriptor() | | |
|        } | | |
|        app_data_length | 16 | uimsbf |
|        for( i = 0; i < app_data_length; i++) { | | |
|           app_data_byte | 8 | bslbf |
|        } | | |
|      } | | |
|    } | | |
|    service_info_length | 16 | uimsbf |
|    for(j=0; j<K;j++) { | | |
|      descriptor() | | |
|    } | | |
|    service_private_data_length | 16 | uimsbf |
|    for( j = 0; j < service_private_data_length; j++) { | | |
|      service_private_data_byte | 8 | bslbf |
|    } | | |
| } | | |

FIG.12

| Syntax | No. of Bits | Format |
|---|---|---|
| NRT_service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   reserved | 4 | '1111' |
|   carrier_frequency | 32 | uimsbf |
|   channel_TSID | 16 | uimsbf |
|   program_number | 16 | uimsbf |
|   source_id | 16 | uimsbf |
|   num_NRT_services | 8 | uimsbf |
|   for (i=0; i<num_NRT_services; i++) | | |
|   { | | |
|     reserved | 4 | '1111' |
|     NRT_service_status | 2 | uimsbf |
|     SP_indicator | 1 | bslbf |
|     CP_indicator | 1 | bslbf |
|     NRT_service_id | 16 | uimsbf |
|     short_NRT_service_name | 8*8 | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0; j<num_components; j++) | | |
|     { | | |
|       reserved | 1 | '1' |
|       essential_component_indicator | 1 | bsblf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       Reserved | 4 | '1111' |

FIG.13

| Syntax | No. of Bits | Format |
|---|---|---|
|     num_component_level_descriptors | 4 | uimsbf |
|     for (k=0; k<num_component_leve_descriptors; k++) | | |
|     { | | |
|         component_level_descriptor() | var | |
|     } | | |
| } | | |
| reserved | 4 | '1111' |
| num_NRT_service_level_descriptors | 4 | uimsbf |
| for (m=0; m<num_MH_service_level_descriptors; m++) | | |
| { | | |
|     NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|     virtual_channel_level_descriptor() | var | |
| } | | |
| } | | |

FIG.14

| Syntax | No. of Bits | Format |
|---|---|---|
| MH_component_descriptor() { | | |
|     descriptor_tag | 8 | 0x80 |
|     descriptor_length | 8 | uimsbf |
|     component_type | 7 | uimsbf |
|     component_encryption_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_data(component_type) | var | |
| } | | |

FIG.15

| Syntax | No. of Bits | Format |
|---|---|---|
| NRT_component_data() { | | |
|     TSI | 16 | uimsbf |
|     session_start_time | 32 | uimsbf |
|     session_end_time | 32 | uimsbf |
|     reserved | 5 | '11111' |
|     tias_bandwidth_indicator | 1 | bslbf |
|     as_bandwidth_indicator | 1 | bslbf |
|     FEC_OTI_indicator | 1 | bslbf |
|     if (tias_bandwidth_indicator == '1'){ | | |
|         tias_bandwidth | 16 | uimsbf |
|     } | | |
|     if (as_bandwidth_indicator == '1'){ | | |
|         as_bandwidth | 16 | uimsbf |
|     } | | |
|     if (FEC_OTI_indicator == '1'){ | | |
|         FEC_encoding_id | 8 | uimsbf |
|         FEC_instance_id | 16 | uimsbf |
|     } | | |
| } | | |

FIG.16

| Syntax | No. of Bits | Format |
|---|---|---|
| NRT_information_table_section() { | | |
|   table_id | 8 | 0xTBD |
|   section_syntax_indicator | 1 | '1' |
|   private_indicator | 1 | '1' |
|   reserved | 2 | '11' |
|   section_length | 12 | uimsbf |
|   service_id | 16 | uimsbf |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   time_span_start | 32 | uimsbf |
|   reserved | 5 | '11111' |
|   time_span_length | 11 | uimsbf |
|   num_items_in_section | 8 | uimsbf |
|   for(j=0; j<num_items_in_section; j++) { | | |
|     content_linkage | 32 | uimsbf |
|     updates_available | 1 | bslbf |
|     reserved | 1 | '1' |
|     TF_available | 1 | bslbf |
|     low_latency | 1 | bslbf |
|     playback_length_in_seconds | 20 | uimsbf |
|     content_length_included | 1 | bslbf |
|     playback_delay_included | 1 | bslbf |
|     expiration_included | 1 | bslbf |
|     reserved | 1 | '1' |
|     duration | 12 | uimsbf |
|     if(content_length_included=1) { | | |
|       content_length | 40 | uimsbf |
|     } | | |
|     if(playback_delay_included=1) { | | |
|       reserved | 4 | '1111' |
|       playback_delay | 20 | uimsbf |
|     } | | |
|     if(expiration_included=1) { | | |
|       expiration | 32 | uimsbf |
|     } | | |
|     content_name_lingth | 8 | uimsbf |
|     content_name_text() | | |
|     reserved | 4 | '1111' |
|     content_descriptors_length | 12 | uimsbf |
|     for(i=-;i<N; i++) { | | |
|       content_descriptor() | | |
|     } | | |
|   } | | |
|   reserved | 6 | '111111' |
|   descriptors_length | 10 | uimsbf |
|   for(i=0; i<M; i++) { | | |
|     descriptor() | | |
|   } | | |
| } | | |

FIG.17

| Syntax | No. of bits | Format |
|---|---|---|
| NRT_content_table_section ( ) { | | |
|     table_id | 8 | uimsbf |
|     section_syntax_indicator | 1 | '1' |
|     private_indicator | 1 | '1' |
|     reserved | 2 | bslbf |
|     section_length | 12 | uimsbf |
|     NRT_Channel_ID | 16 | uimsbf |
|     reserved | 2 | bslbf |
|     version_number | 5 | uimsbf |
|     current_next_indicator | 1 | 1 |
|     section_number | 8 | uimsbf |
|     last_section_number | 8 | uimsbf |
|     protocol_version | 8 | uimsbf |
|     num_contents_in_section | 8 | uimsbf |
|     for (j=0; j < num_contents_in_section; j++) { | | |
|         content_version | 32 | uimsbf |
|         content_id | 32 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | |
|         descriptors_length | 16 | uimsbf |
|         for (i=0; i < N; i++) { | | |
|             descriptor ( ) | | |
|         } | | |
|     } | | |
| } | | |

| Syntax | No.of Bits | Format |
|---|---|---|
| service_map_table_section() { | | |
| table_id | 8 | 0xDB |
| section_syntax_indicator | 1 | '0' |
| private_indicator | 1 | '1' |
| reserved | 2 | '11' |
| section_length | 12 | uimsbf |
| table_id_extension { | | |
| SMT_protocol_version | 8 | uimsbf |
| ensemble_id | 8 | uimsbf |
| } | | |
| reserved | 2 | '11' |
| version_number | 5 | uimsbf |
| current_next_indicator | 1 | bslbf |
| section_number | 8 | uimsbf |
| last_section_number | 8 | uimsbf |
| num_services | 8 | uimsbf |
| for (j=0;j< num_services; j++) | | |
| { | | |
| service_id | 16 | uimsbf |
| multi_ensemble_service | 2 | uimsbf |
| service_status | 2 | uimsbf |
| SP_indicator | 1 | bslbf |
| short_service_name_length | 3 | uimsbf |
| short_service_name | 16*m | |
| reserved | 2 | '11' |
| service_category | 6 | uimsbf |
| num_components | 5 | uimsbf |
| IP_version_flag | 1 | bslbf |
| source_IP_address_flag | 1 | bslbf |
| service_destination_IP_address_flag | 1 | bslbf |
| if (source_IP_address_flag) | | |
| source_IP_address | 32 or 128 | uimsbf |
| if (service_destination_IP_address_flag) | | |
| service_destination_IP_address | 32 or 128 | uimsbf |
| for (j=0;j< num_components; j++) | | |
| { | | |
| reserved | 1 | '1' |
| essential_component_indicator | 1 | bslbf |
| component_destination_IP_address_flag | 1 | bslbf |
| port_num_count | 5 | uimsbf |
| component_destination_UDP_port_num | 16 | uimsbf |
| if (component_destination_IP_address_flag) | | |
| component_destination_IP_address | 32 or 128 | uimsbf |
| reserved | 4 | '1111' |
| num_component_level_descriptors | 4 | uimsbf |
| for (k=0;k< num_components_level_descriptors; k++) | | |
| { | | |
| component_level_descriptor() | var | |
| } | | |
| } | | |
| reserved | 4 | '1111' |
| num_service_level_descriptors | 4 | uimsbf |
| for (m=0; m<num_service_level_descriptors; m++) { | | |
| service_level_descriptor() | var | |
| } | | |
| } | | |
| reserved | 4 | '1111' |
| num_ensemble_level_descriptors | 4 | uimsbf |
| for (n=0; n<num_ensemble_level_descriptors; n++) { | | |
| ensemble_level_descriptor() | var | |
| } | | |
| } | | |

```
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault ="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs ="unbounded"/>
      <xs:element name="FDT-Content-ID" type="xs:unsignedShort" minOccurs="0" maxOccurs="unbounded"/> ①
      <xs:anynamespace="##other" processContents="skip" minOccurs="0" maxOccurs ="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attributename="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence >
      <xs:element name="File-Content-ID" type="Content-ID-Type" minOccurs="0" maxOccurs ="unbounded"/> ②
      <xs:any namespace="##other" processContents="skip" minOccurs="0" maxOccurs ="unbounded"/>
    </xs:sequence >
    <xs:attribute name="Content-Location" type="xs:anyURI" use="required"/>
    <xs:attributename="TOI" type="xs:positiveInteger" use="required"/>
    <xs:attributename="Content-Length" type="xs:unsignedLong" use="required"/>
    <xs:attributename="Transfer-Length" type="xs:unsignedLong" use="optional"/>
    <xs:attributename="Content-Type" type="xs:string" use="optional"/>
    <xs:attributename="Content-Encoding" type="xs:string" use="optional"/>
    <xs:attributename="Content-MD5" type="xs:base64Binary" use="optional"/>
    <xs:attributename="FEC-OTI-FEC-Encoding-ID" type="xs:unsignedLong" use="optional"/>
    <xs:attributename="FEC-OTI-FEC-Instance-ID" type="xs:unsignedLong" use="optional"/>
    <xs:attributename="FEC-OTI-Maximum-Source-Block-Length" type="xs:unsignedLong" use="optional"/>
    <xs:attributename="FEC-OTI-Encoding-Symbol-Length" type="xs:unsignedLong" use="optional"/>
    <xs:attributename="FEC-OTI-Max-Number-of-Encoding-Symbols" type="xs:unsignedLong" use="optional"/>
    <xs:attributename="FEC-OTI-Scheme-Specific-Info" type="xs:base64Binary" use="optional"/>
    <xs:anyAttribute processContents ="skip"/>
  </xs:complexType >
  <xs:complexType name="Content-ID-Type">
    <xs:attribute name="Content-ID" type="xs:unsignedShort" use="required"/>
    <xs:attribute name="entry" type="xs:boolean" default="false" use="optional"/> ③
    <xs:anyAttribute processContents="skip"/>
  </xs:complexType>
</xs:schema>
```

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType ">
    <xs:sequence >
      <xs:element name="File" type="File-Type" maxOccurs ="unbounded"/>
      <xs:element name="FDT-Content-ID" type="FDT-Content-ID-Type" minOccurs="0" maxOccurs="unbounded"/>
      <xs:any namespace="##other" processContents ="skip" minOccurs="0" maxOccurs="unbounded"/>
    </xs:sequence>                                                                                      ①
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType>
  <xs:complexType name="File-Type">
    <xs:sequence>
      <xs:element name="File-Content-ID" type="Content-ID-Type" minOccurs="0" maxOccurs ="unbounded"/>
      <xs:any namespace="##other" processContents="skip" minOccurs="0" maxOccurs ="unbounded"/>
    </xs:sequence >
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType >
  <xs:complexType name="FCT-Content-ID-Type"> ②
    <xs:sequence>
      <xs:element name="Entry-Content-Location" type=xs:anyURI "minOccurs="0" maxOccurs="unbounded"/>
    </xs:sequence>
    <xs:attribute name="Content-ID" type="xs:unsingedShort" use="required"/>
    <xs:anyAttribute processContents="skip"/>
  </xs:complexType>
  <xs:complexType name="Content-ID-Type">
    <xs:attribute name="Content-ID" type="xs:unsingedShort" use="required"/>
    <xs:attribute name="entry" type="xs:boolean" default="false" use="optional"/>
    <xs:anyAttribute processContents ="skip"/>
  </xs:complexType >
</xs:schema >
```

| Syntax | No. of Bits | Format |
|---|---|---|
| tdo_trigger_table_section() { | | |
|     table_id | 8 | 0xTBD |
|     section_syntax_indicator | 1 | 0 |
|     private_indicator | 1 | 1 |
|     reserved | 2 | 11 |
|     section_length | 12 | uimsbf |
|     source_id | 16 | uimsbf |
|     reserved | 2 | 11 |
|     TTT_version_number | 5 | uimsbf |
|     current_next_indicator | 1 | 1 |
|     section_number | 8 | uimsbf |
|     last_section_number | 8 | uimsbf |
|     num_triggers_in_section | 8 | uimsbf |
|     for (i=0; i< num_triggers_in_section; i++) { | | uimsbf |
|         trigger_id | 32 | uimsbf |
|         trigger_time | 32 | uimsbf |
|         trigger_action | 16 | uimsbf |
|         trigger_description_length | 8 | uimsbf |
|         trigger_description_text | var | |
|         service_id_ref | 16 | uimsbf |
|         content_linkage | 32 | uimsbf |
|         num_trigger_descriptors | 8 | uimsbf |
|         for (j=0; j<num_bundle_descriptors; j++) { | | |
|             trigger_descriptor () | var | |
|         } | | |
|     } | | |
| } | | |

FIG.26

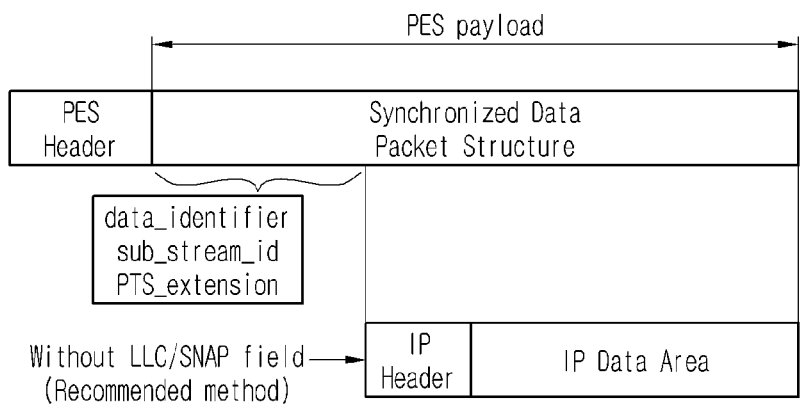

FIG.27

| Syntax | No. of bits | Format |
|---|---|---|
| synchronized_data_packet(){ | | |
|     data_identifier | 8 | uimsbf |
|     sub_stream_id | 8 | uimsbf |
|     PTS_extension_flag | 1 | bslbf |
|     output_data_rate_flag | 1 | bslbf |
|     reserved | 2 | '11' |
|     synchronized_data_packet_header_length | 4 | uimsbf |
|     if (PTS_extension_flag=='1'){ | | |
|         reserved | 7 | '1111111' |
|         PTS_extension | 9 | uimsbf |
|     } | | |
|     for (i=0;i<N1;i++){ | | |
|         synchronized_data_private_data_byte | 8 | bslbf |
|     } | | |
|     for (i=0;i<N2;i++){ | | |
|         synchronized_data_byte | 8 | bslbf |
|     } | | |
| } | | |

FIG.28

| Syntax | No. of bits | Format |
|---|---|---|
| contentTypeDescriptor(){ | | |
|     descriptorTag | 8 | 0x72 |
|     descriptorLength | 8 | uimsbf |
|     for(i=0;i<descriptorLength;i++){ | | |
|         contentTypeByte | 8 | bslbf |
|     } | | |
| } | | |

FIG.29

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
|     descriptor() | |
| } | |
| for(i=0;i<N1;i++){ | |
|     steam_type | 8 |
|     reserved | 3 |
|     elementary_PID | 13 |
|     reserved | 4 |
|     ES_info_length | 12 |
|     for(i=0;i<N2;i++){ | |
|         descriptor() | |
|     } | |
| } | |
| CRC_32 | 32 |
| } | |

| Syntax | No. of Bits | Format |
|---|---|---|
| service_id_descriptor() { | | |
|     descriptor_tag | 8 | 0xC2 |
|     descriptor_length | 8 | uimsbf |
|     service_count | 8 | uimsbf |
|     for (i=0; i<service_count; i++) | | |
|         service_id | 16 | bslbf |
|     for (j=0; j< N; j++) { | | |
|         reserved | 8 | bslbf |
|     } | | |
| } | | |

FIG.30

| Syntax | No. Of bits |
|---|---|
| TS_program_map_section(){ | |
|   table_id | 8 |
|   section_syntax_indicator | 1 |
|   '0' | 1 |
|   reserved | 2 |
|   section_length | 12 |
|   program_number | 16 |
|   reserved | 2 |
|   version_number | 5 |
|   current_next_indicator | 1 |
|   section_number | 8 |
|   last_section_number | 8 |
|   reserved | 3 |
|   PCR_PID | 13 |
|   reserved | 4 |
|   program_info_length | 12 |
|   for(i=0;i<N;i++){ | |
|     descriptor() | |
|   } | |
|   for(i=0;i<N1;i++){ | |
|     steam_type | 8 |
|     reserved | 3 |
|     elementary_PID | 13 |
|     reserved | 4 |
|     ES_info_length | 12 |
|     for(i=0;i<N2;i++){ | |
|       descriptor() | |
|     } | |
|   } | |
|   CRC_32 | 32 |
| } | |

| Syntax | No. of Bits | Format |
|---|---|---|
| Trigger_stream_descriptor() { | | |
|   descriptor_tag | 8 | 0xC2 |
|   descriptor_length | 8 | uimsbf |
|   target_service_count | 8 | uimsbf |
|   for (i=0; i<service_count; i++) { | | |
|     target_service_id | 16 | bslbf |
|     target_content_item_count | 8 | uimsbf |
|     for(k=0; k<target_content_item_count; k++) | | |
|       target_content_linkage | 32 | bslbf |
|   } | | |
|   for (j=0; j< N; j++) { | | |
|     reserved | 8 | bslbf |
|   } | | |
| } | | |

FIG.31

| | No. of bits | Identifier |
|---|---|---|
| application_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0;i<N;i++){ | | |
|       descriptor() | | |
|     } | | |
|     reserved_future_use | 4 | bslbf |
|     application_loop_length | 12 | uimsbf |
|     for(i=0;i<N;i++){ | | |
|       application_identifier() | | |
|       application_control_code | 8 | uimsbf |
|       reserved_future_use | 4 | bslbf |
|       application_descriptors_loop_length | 12 | uimsbf |
|       for(j=0;j<N;j++){ | | |
|         descriptor() | | |
|       } | | |
|     } | | |
|     CRC_32 | 32 | rpchof |
| } | | |

FIG.32

| Syntax | No. of Bits | Format |
|---|---|---|
| System_time_table_section(){ | | |
|     table_id | 8 | uimsbf |
|     section_syntax_indicator | 1 | '1' |
|     private_indicator | 1 | '1' |
|     reserved | 2 | '11' |
|     section_length | 12 | uimsbf |
|     table_id_extension | 16 | 0x0000 |
|     reserved | 2 | '11' |
|     version_number | 5 | '00000' |
|     current_next_indicator | 1 | '1' |
|     section_number | 8 | 0x00 |
|     last_section_number | 8 | 0x00 |
|     protocol_version | 8 | uimsbf |
|     system_time | 32 | uimsbf |
|     GPS_UTC_offset | 8 | uimsbf |
|     daylight_savings | 16 | uimsbf |
|     for (i=0;i<N;i++){ | | |
|       descriptor() | | |
|     } | | |
|     CRC_32 | 32 | rpchof |
| } | | |

```
link_descriptor() {
descriptor_tag                    8 0xe8
descriptor_length                 8 uimsbf
number_of_links                   8 uimsbf
for (i=0; i<number_of_links; i++) {
    link_type                     8 uimsbf
    link_media                    8 uimsbf
    mime_type_length              8 uimsbf
    mime_type                     var
    description_length            8 uimsbf
    description                   var
    link_length                   uimsbf
    link_byte                     var
    }
}
```

FIG.44

|  | link_type |
|---|---|
| Html Portal | 0x01 |
| Thumbnail | 0x02 |
| Preview Clip | 0x03 |
| EPG | 0x04 |
| Highlight | 0x05 |
| MultiView | 0x06 |
| TDO | 0x07 |

FIG.45

|  | link_media | link_byte |
|---|---|---|
| NRT service | 0x02 | service_id content_linkage |
| Internet service | 0x03 | URI |

FIG.52

| Syntax | No. of Bits | Format |
|---|---|---|
| NRT_service_descriptor() { | | |
|     descriptor_tag | 8 | 0xC4 |
|     descriptor_length | 8 | uimsbf |
|     reserved | 2 | '11' |
|     consumption_model | 6 | uimsbf |
|     auto-update | 1 | bslbf |
|     storage_reservation_present | 1 | bslbf |
|     default_content_length_present | 1 | bslbf |
|     reserved | 5 | '11111' |
|     if (storage_reservation_present==1) { | | |
|         storage_reservation | 24 | uimsbf |
|     if (default_content_length_present==1) { | | |
|         default_content_length | 32 | uimsbf |
|     } | | |
|     for (j=0; j< N; j++) { | | bslbf |
|         reserved | 8 | |
|     } | | |
| } | | |

FIG.53

| Consumption_model | Meaning |
|---|---|
| 0x00 | Forbidden. |
| 0x01 | Browse & Download - The NRT service describes content that can be selected for later download. |
| 0x02 | Portal - The NRT service provides an experience similar to a web browser access. Files needed to support text/graphics rendering are available in the associated FLUTE session. |
| 0x03 | Push - The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been pre-loaded is displayed. |
| 0x04 | TDO - The NRT service offers TDO(Triggered Declarative Object). |
| 0x05 - 0x3F | Reserved for use by ATSC or other SDOs who register the use with ATSC. |

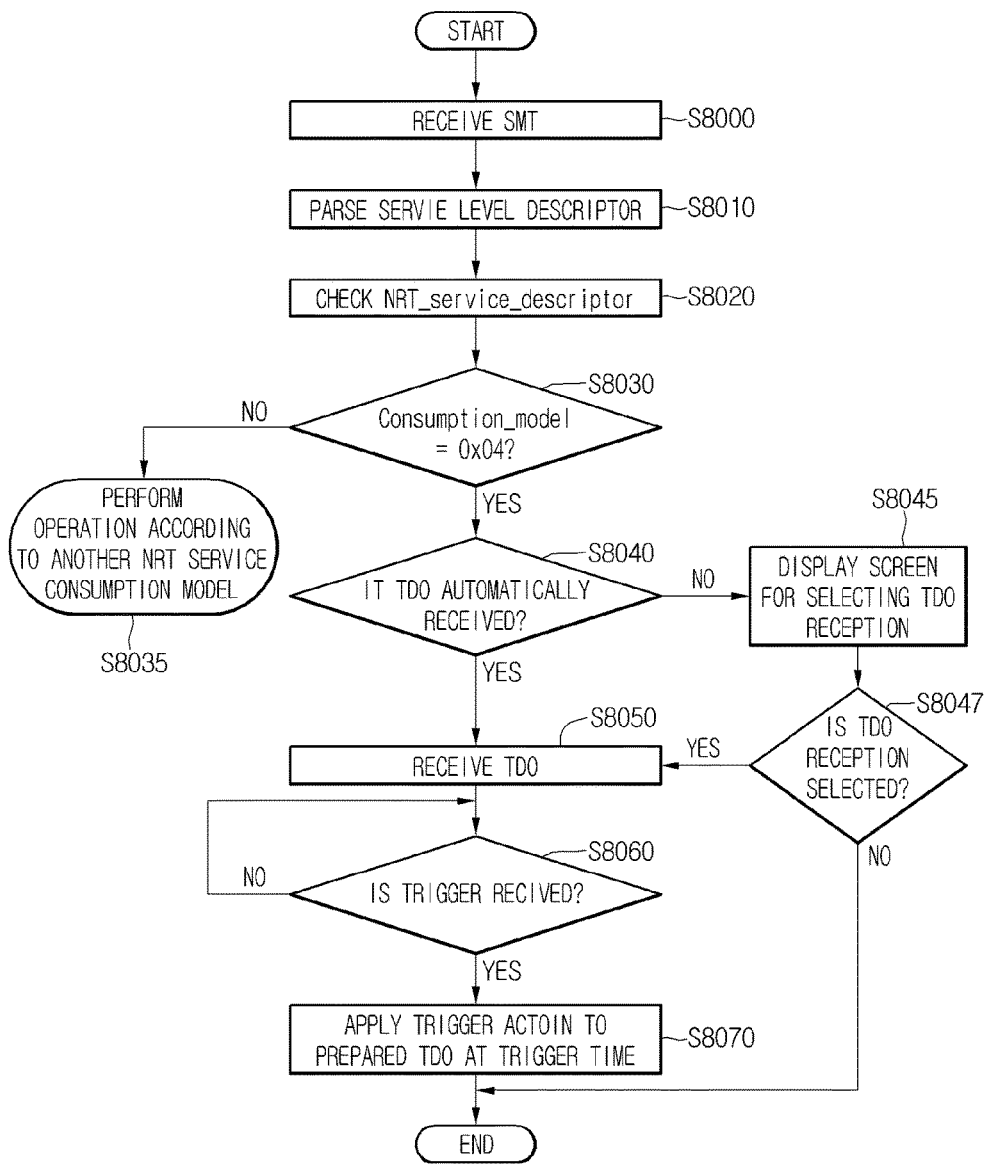

| Syntax | No. of Bits | Format |
|---|---|---|
| TDO_metadata_descriptor() { | | |
| descriptor_tag | 8 | 0xTBD |
| descriptor_length | 8 | Uimsbf |
| scheduled_activation_start_time | 32 | uimsbf |
| scheduled_activation_end_time | 32 | uimsbf |
| priority | 8 | uimsbf |
| activation_repeat_flag | 1 | bslbf |
| reserved | 7 | '11111' |
| if (repeating==1) { | | |
| repeat_interval | 8 | uimsbf |
| } | | |
| for (j=0; j< N; j++) { | | |
| reserved | 8 | bslbf |
| } | | |
| } | | |

| Syntax | No. of Bits | Format |
|---|---|---|
| internet_location_descriptor() { | | |
| descriptor_tag | 8 | 0xC9 |
| descriptor_length | 8 | uimsbf |
| reserved | 3 | '111' |
| URL_count | 5 | uimsbf |
| for (i=0; i<URL_count; i++) { | | |
| URL_length | 8 | uimsbf |
| URL() | var | |
| } | | |
| for (j=0; j< N; j++) { | | |
| reserved | 8 | bslbf |
| } | | |
| } | | |

FIG.65

| Syntax | No. Bits | Format |
|---|---|---|
| NRT_information_table_section() { | | |
|   table_id | 8 | 0xDF |
|   section_syntax_indicator | 1 | '0' |
|   private_indicator | 1 | '1' |
|   reserved | 2 | '11' |
|   section_length | 12 | uimsbf |
|   table_id_extension { | | |
|     protocol_version | 8 | uimsbf |
|     subnet_id | 8 | uimsbf |
|   } | | |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   service_id | 16 | uimsbf |
|   time_span_start | 32 | uimsbf |
|   reserved | 5 | '11111' |
|   time_span_length | 11 | uimsbf |
|   num_content_items_in_section | 8 | uimsbf |
|   for (j=0; j< num_content_items_in_section; j++) { | | |
|     content_linkage | 32 | uimsbf |
|     updates_available | 1 | bslbf |
|     TF_available | 1 | bslbf |
|     content_security_conditions_indicator | 1 | bslbf |
|     available_on_internet | 1 | bslbf |
|     playback_length_included | 1 | bslbf |
|     playback_delay_included | 1 | bslbf |
|     expiration_included | 1 | bslbf |
|     content_length_included | 1 | bslbf |
|     no_entry_flag | 1 | bslbf |
|     reserved | 3 | '111' |

FIG.66

| | | |
|---|---|---|
| acquisition_time | 12 | uimsbf |
| if (playback_length_included==1) { | | |
|     reserved | 4 | '1111' |
|     playback_length_in_seconds | 20 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| if (content_length_included==1) { | | |
|     content_length | 40 | uimsbf |
| } | | |
| content_name_length | 8 | uimsbf |
| content_name_text() | var | |
| num_content_descriptors_length | 8 | uimsbf |
| for (i=0; i<num_content_descriptors; i++) { | | |
|     content_descriptor() | var | |
| } | | |
| } | | |
| num_descriptors | 8 | uimsbf |
| for (i=0; i<num_descriptors; i++) { | | |
|   descriptor() | var | |
| } | | |
| } | | |

FIG.69

| Syntax | No. of Bits | Format |
|---|---|---|
| NRT_service_descriptor() { | | |
| descriptor_tag | 8 | 0xC4 |
| descriptor_length | 8 | uimsbf |
| reserved | 2 | '11' |
| consumption_model | 6 | uimsbf |
| auto-update | 1 | bslbf |
| storage_reservation_present | 1 | bslbf |
| default_content_length_present | 1 | bslbf |
| equivalent_service_not_present | 1 | bslbf |
| reserved | 4 | '1111' |
| if (storage_reservation_present==1) { | | |
| storage_reservation | 24 | uimsbf |
| if (default_content_length_present==1) { | | |
| default_content_length | 32 | uimsbf |
| } | | |
| if (equivalent_service_not_present==0) { | | |
| num_equivalent_services | 8 | uimsbf |
| for (i=0; i< num_equivalent_services ; i++) { | | |
| equivalent_service_id | 16 | uimsbf |
| } | | |
| } | | |
| for (j=0; j< N; j++) { | | |
| reserved | 8 | bslbf |
| } | | |
| } | | |

FIG.70

| Syntax | No. Bits | Format |
|---|---|---|
| NRT_information_table_section() { | | |
| table_id | 8 | 0xDF |
| section_syntax_indicator | 1 | '0' |
| private_indicator | 1 | '1' |
| reserved | 2 | '11' |
| section_length | 12 | uimsbf |
| table_id_extension { | | |
|    protocol_version | 8 | uimsbf |
|    subnet_id | 8 | uimsbf |
| } | | |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| service_id | 16 | uimsbf |
| time_span_start | 32 | uimsbf |
| reserved | 5 | '11111' |
| time_span_length | 11 | uimsbf |
| num_content_items_in_section | 8 | uimsbf |
| for (j=0; j< num_content_items_in_section; j++) { | | |
|    content_linkage | 32 | uimsbf |
| updates_available | 1 | bslbf |
| TF_available | 1 | bslbf |
| content_security_conditions_indicator | 1 | bslbf |
| available_on_internet | 1 | bslbf |
| playback_length_included | 1 | bslbf |
| playback_delay_included | 1 | bslbf |
| expiration_included | 1 | bslbf |
| content_length_included | 1 | bslbf |
| no_entry_flag | 1 | bslbf |
| available_on_currrent_service | 1 | bslbf |
| reserved | 3 | '111' |

FIG.71

| | | |
|---|---|---|
| reserved | 3 | '111' |
| acquisition_time | 12 | uimsbf |
| if (playback_length_included==1) { | | |
|     reserved | 4 | '1111' |
|     playback_length_in_seconds | 20 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| if (content_length_included==1) { | | |
|     content_length | 40 | uimsbf |
| } | | |
| content_name_length | 8 | uimsbf |
| content_name_text() | var | |
| num_content_descriptors_length | 8 | uimsbf |
| for (i=0; i<num_content_descriptors; i++) { | | |
|     content_descriptor() | var | |
| } | | |
| } | | |
| num_descriptors | 8 | uimsbf |
| for (i=0; i<num_descriptors; i++) { | | |
|     descriptor() | var | |
| } | | |
| } | | |

FIG.72

| Syntax | No. Bits | Format |
|---|---|---|
| Other_NRT_location_descriptor() { | | |
| descriptor_tag | 8 | TBD |
| descriptor_length | 8 | uimsbf |
| reserved | 2 | '11' |
| num_other_NRT_locations | 6 | uimsbf |
| for (i=0; i< num_other_NRT_locations ; i++) { | | |
| other_service_id | 16 | uimsbf |
| } | | |
| } | | |

FIG.74

| Consumption_model | Meaning |
|---|---|
| 0x00 | Forbidden. |
| 0x01 | Browse & Download – The NRT service describes content that can be selected for later download. |
| 0x02 | Portal – The NRT service provides an experience similar to a web browser access. Files needed to support text/graphics rendering are available in the associated FLUTE session. |
| 0x03 | Push – The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been pre-loaded is displayed. |
| 0x04 | Triggered – The NRT service offers Triggered content items including TDO(Triggered Downloadable Object). |
| 0x05 | EPG – The NRT service offers content item provides information about a TV service (virtual channel), a TV event, and NRT service, or an NRT content item. |
| 0x06 – 0x3F | Reserved for use by ATSC or other SDOs who register the use with ATSC. |

FIG.81

| Syntax | No. of Bits | Format |
|---|---|---|
| linkage_descriptor() { | | |
| descriptor_tag | 8 | TBD |
| descriptor_length | 8 | uimsbf |
|    reserved | 1 | '1' |
|    target_type | 3 | uimsbf |
|    major_channel_number | 10 | uimsbf |
|    minor_channel_number | 10 | uimsbf |
|    channel_TSID | 16 | uimsbf |
|    source_id | 16 | uimsbf |
|    if (target_type = 0x02) { | | |
|      event_id | 16 | uimsbf |
|    } else if (target_type= 0x03) { | | |
|      MH_service_id | 16 | uimsbf |
|    } else if (target_type = 0x04) { | | |
|      MH_service_id | 16 | uimsbf |
|      content_linkage | 16 | Uimsbf |
|    } | | |
| } | | |

FIG.82

| target_type | Meaning |
|---|---|
| 0x00 | Reserved. |
| 0x01 | TV service (virtual channel) |
| 0x02 | TV event |
| 0x03 | NRT service |
| 0x04 | NRT Content Item |
| 0x05 – 0x07 | Reserved for use by ATSC or other SDOs who register the use with ATSC. |

FIG.83

| Syntax | No. of Bits | Format |
|---|---|---|
| linkage_descriptor() { | | |
|   descriptor_tag | 8 | TBD |
|   descriptor_length | 8 | uimsbf |
|   reserved | 2 | '11' |
|   num_of_linked_content_items | 6 | uimsbf |
|   for (j=0; j<num_of_linked_content_items;j++) { | | |
|     service_id_ref | 16 | |
|     content_linkage_ref | 32 | uimsbf |
|     reserved | 4 | '1111' |
|     role | 4 | uimsbf |
|   } | | |
| } | | |

FIG.84

| Syntax | No. of Bits | Format |
|---|---|---|
| Enhanced_EPG_descriptor() { | | |
| descriptor_tag | 8 | TBD |
| descriptor_length | 8 | uimsbf |
| reserved | 4 | '1111' |
| num_of_NRT_services | 4 | uimsbf |
| for (i=0; i < num_of_NRT_services; i++) { | | |
| service_id_ref | 16 | uimsbf |
| consumption_model | 6 | uimsbf |
| access_controlled | 1 | bslbf |
| reserved | 1 | '1' |
| reserved | 5 | '11111' |
| short_service_name_length | 3 | uimsbf |
| short_service_name | variable | bslbf |
| } | | |
| } | | |

FIG.85

| Syntax | No. of Bits | Format |
|---|---|---|
| service_enhancements_descriptor() { | | |
| descriptor_tag | 8 | TBD |
| descriptor_length | 8 | uimsbf |
| num_of_enhancements | 1 | '1' |
| for (i=0; i < num_of_enhancements; i++) { | 3 | uimsbf |
| service_id_ref | 16 | uimsbf |
| consumption_model | 6 | uimsbf |
| reserved | 2 | '11' |
| num_of_linked_content_items | 16 | uimsbf |
| for (j=0; j<num_of_linked_content_items;j++) { | 16 | uimsbf |
| content_linkage | 32 | uimsbf |
| } | 16 | uimsbf |
| capability_code_count | 8 | uimsbf |
| for (i=0; i<capability_code_count; i++) { | | |
| essential_indicator | 1 | bslbf |
| capability_code | 7 | uimsbf |
| if (capability_code > 0x6F) { | | |
| format_identifier | 32 | |
| } | | |
| } | | |
| } | | |
| } | | |

FIG.87

Program Guide

| Chan | Type | | | |
|---|---|---|---|---|
| 3-1 | E311 | E312 ● | E313 | E314 |
| 3-2 [NRT] | E321 [NRT] ● | | E322 | E323 |
| 12-1 | E1211 | | | |
| 12-2 | E1221 | | | |

NRT#1
Service name(or Service id):...
Consumption model: ⋯
Access controlled:⋯
Capability info: ⋯

NRT#2
...

NRT#3
...

TRANSMISSION METHOD FOR BROADCAST SERVICE, RECEPTION METHOD THEREFOR, AND RECEPTION APPARATUS THEREFOR

This application is a continuation of U.S. application Ser. No. 14/113,037 filed Oct. 21, 2013, which claims the priority to and benefit of PCT/KR2012/003097 filed on Apr. 20, 2012, and U.S. Provisional Application No. 61/477,174 filed on Apr. 20, 2011, which are hereby incorporated by reference in their entirety.

TECHNICAL FIELD

The present disclosure relates to a method of transmitting broadcast service, a method of receiving the broadcast service, and a receiver therefor.

BACKGROUND ART

A digital television (DTV) is now presented to offer various services in addition to a television (TV)'s original function such as playing video and audio. For example, broadcasting information such as Electronic Program Guide (EPG) may be provided to a user, and also, broadcasting services from at least two channels may be simultaneously provided to a user. Especially, since a receiving system of the DTV includes a large capacity of a storage device, and is connected to a data communication channel and the internet (through which two-way communication is available), more services become accessible through broadcast signals. Additionally, since services offered through broadcast signals become more diversified, needs for utilizing the diversified services accurately is increased.

DISCLOSURE OF THE INVENTION

Technical Problem

Embodiments provide a method of receiving and processing non-real-time (NRT) service and a method of transmitting NRT service.

Embodiments also provide a method of providing a content downloaded through NRT service and a receiver thereof.

Embodiments also provide a broadcast service receiving method of providing various information on a broadcast service including real-time service and NRT service without interfering with an existing receiver.

Technical Solution

In one embodiment, a method of a broadcast receiving device to receive broadcast service includes: receiving a broadcast table; receiving service signaling data corresponding to a service object; determining a consumption model of the service object on the basis of the service signaling data; receiving a content item configuring the service object on the basis of the service signaling data when the consumption model is a predetermined consumption model; displaying a guide on content on the basis of the broadcast table or the service signaling data; identifying one of the received content item according to an additional information request on the content; and controlling the guide on the basis of the identified content item.

In another embodiment, a broadcast service receiving device includes: a receiver receiving a broadcast table or service signaling data on a service object; a service manager determining a consumption model of the service object on the basis of the service signaling data, receiving a content item in the service object on the basis of the service signaling data when the consumption model corresponds to a predetermined consumption model, and generating a guide on a content on the basis of the broadcast table or the service signaling data; and a display unit displaying the generated guide, wherein the service manager identifies one of the received content item according to an additional information request on the content and controls the guide on the identified content item.

In further another embodiment, a method of a broadcast transmitting device to transmit broadcast service includes: setting a predetermined consumption model to an NRT service object including additional information on a content to be displayed, in a guide of a receiver; inserting linkage information of the NRT service object and the content into a broadcast table or NRT service signaling data; transmitting the broadcast table or the NRT service signaling data; and transmitting the service object.

Advantageous Effects

According to an embodiment of the present invention, broadcast information may be received and provided through NRT service.

Additionally, according to an embodiment of the present invention, broadcast information may be provided through NRT service without interfering with an existing receiver.

Furthermore, according to an embodiment of the present invention, complex and various broadcast information may be efficiently provided.

BRIEF DESCRIPTION OF THE DRAWINGS

FIG. 4 is view illustrating one example of the protocol stack for mobile NRT service.

FIG. 5 is a view illustrating a bit stream section of a TVCT table section (VCT) according to an embodiment.

FIGS. 6 and 7 are views illustrating how to define a value of a service_type field according to an embodiment.

FIG. 8 is view of data_service_table_section) for identifying an application of NRT service and bit stream syntax of data_service_table_bytes in a DST section.

FIG. 11 is a view illustrating a method of signaling DSM-CC addressable section data by using VCT according to another embodiment of the present invention.

FIGS. 12 and 13 are views illustrating a bit stream syntax of NST according to an embodiment.

FIG. 14 is a view illustrating a bit stream syntax of NRT_component_descriptor (MH_component_descriptor) according to an embodiment.

FIG. 15 is a view illustrating a bit stream syntax of NRT component descriptor including NRT_component_data according to an embodiment.

FIG. 16 is a view illustrating a bit stream syntax of NRT-IT section for signaling NRT application according to an embodiment.

FIG. 17 is a view illustrating a syntax structure of bit stream for NRT section (NRT_content_table_section) according to an embodiment.

FIG. 18 is a view illustrating a bit stream syntax structure of an SMT session providing signaling information on NRT service data according to an embodiment.

FIG. 19 is a view illustrating an FDT schema for mapping a file and content_id according to an embodiment.

FIG. 20 is a view illustrating an FDT schema for mapping a file and content_id according to another embodiment.

FIG. 25 is a view illustrating a bit stream syntax of a trigger according to an embodiment.

FIG. 26 is a view illustrating a PES structure according to a synchronized data stream method including a trigger according to an embodiment.

FIG. 27 is a view illustrating a synchronized data packet structure of PES payload for transmitting trigger as bit stream syntax according to an embodiment.

FIG. 28 is a view illustrating a content type descriptor structure in tap( ) on DST according to an embodiment.

FIG. 29 is a view illustrating a syntax of PMT and service identifier descriptor according to an embodiment.

FIG. 30 is a view illustrating a trigger stream descriptor according to an embodiment.

FIG. 31 is a view of AIT according to an embodiment.

FIG. 32 is a view of STT according to an embodiment.

FIGS. 44 and 45 are views illustrating contents of fields included in a link descriptor according to an embodiment of the present invention.

FIG. 45 is a timing diagram according to another embodiment of the present invention.

FIG. 47 is a view illustrating a maintenance trigger receiving method according to an embodiment of the present invention.

FIG. 52 is a view illustrating a syntax of an NRT service descriptor (NRT_service_descriptor), that is, a service level descriptor according to an embodiment of the present invention.

FIG. 53 is a view illustrating a meaning according to each value of a consumption_model field in an NRT service descriptor according to an embodiment of the present invention.

FIG. 54 is a flowchart illustrating an operation of the receiver 300 when a TDO is transmitted by a TDO consumption model according to an embodiment of the present invention.

FIGS. 65 and 66 are views illustrating an NRT-IT to transmit information on an entry content item according to an embodiment of the present invention.

FIG. 69 is a view illustrating a syntax of an NRT service descriptor included in an SMT according to an embodiment of the present invention.

FIGS. 70 and 71 are views illustrating a syntax of another NRT-IT according to another embodiment of the present invention.

FIG. 72 is a view illustrating a syntax of an Other NRT location descriptor (Other_NRT_location_descriptor) according to another embodiment of the present invention.

FIG. 74 is a view illustrating a meaning according to each value of a consumption_model field in an NRT service descriptor when an EPG consumption model is allocated according to an embodiment of the present invention.

FIG. 81 is a view illustrating a syntax of a linkage descriptor according to an embodiment of the present invention.

FIG. 82 is a view illustrating a target type field of a linkage descriptor according to an embodiment of the present invention.

FIG. 83 is a view illustrating a linkage descriptor according to another embodiment of the present invention.

FIG. 84 is a view illustrating a syntax of an enhanced EPG descriptor according to an embodiment of the present invention.

FIG. 85 is a view illustrating a syntax of an enhanced EPG descriptor according to another embodiment of the present invention.

FIG. 87 is a view illustrating an EPG provided through a method of receiving broadcast service according to an embodiment of the present invention.

MODE FOR CARRYING OUT THE INVENTION

Preferred embodiments of the present invention will be described below in more detail with reference to the accompanying drawings. The configurations and operations of the present invention shown in and described with the accompanying drawings are explained as at least one example, and the technical idea of the present invention and its core configurations and operations are not limited thereby.

The terms used in the present invention are selected as currently used general terms if possible in the consideration of functions of the present invention but could vary according to intentions or conventions of those in the art or the advent of new technology. In certain cases, there are terms that are selected by an applicant arbitrarily, and in such a case, their meanings will be described in more detail in the specification. Accordingly, the terms used in the present invention should be defined on the basis of the meanings of the terms and contents over the present invention not the simple names of the terms.

Moreover, among the terms in the present invention, a real time (RT) service literally means a service in real time. That is, the service is time-restricted. In contrast, a non-real time (NRT) service is a service in NRT other than the RT service. That is, the NRT service is not restricted by time. Furthermore, data for NRT service is called NRT service data.

A broadcast receiver according to the present invention may receive NRT service through a medium such as a terrestrial wave, a cable, and the internet.

The NRT service may be stored in a storage medium of the broadcast receiver, and then may be displayed on a display device according to a predetermined time or at the user's request. The NRT service is received in a file format, and is stored in a storage medium according an embodiment. The storage medium may be an HDD embedded in the broadcast receiver according to an embodiment. As another example, the storage medium may be a Universal Serial Bus (USB) memory or an external HDD, which is connected to the broadcast receiving system.

Signaling information is necessary to receive files constituting the NRT service, store them in a storage medium, and provide a service to a user. The present invention may designate the above signaling information as NRT service signaling information or NRT service signaling data.

The NRT service includes Fixed NRT service and Mobile NRT service according to a method of obtaining IP datagram including NRT service signaling data. Especially, the Fixed NRT service is provided to a fixed broadcast receiver, and the Mobile NRT service is provided to a mobile broadcast receiver.

Figure 1:
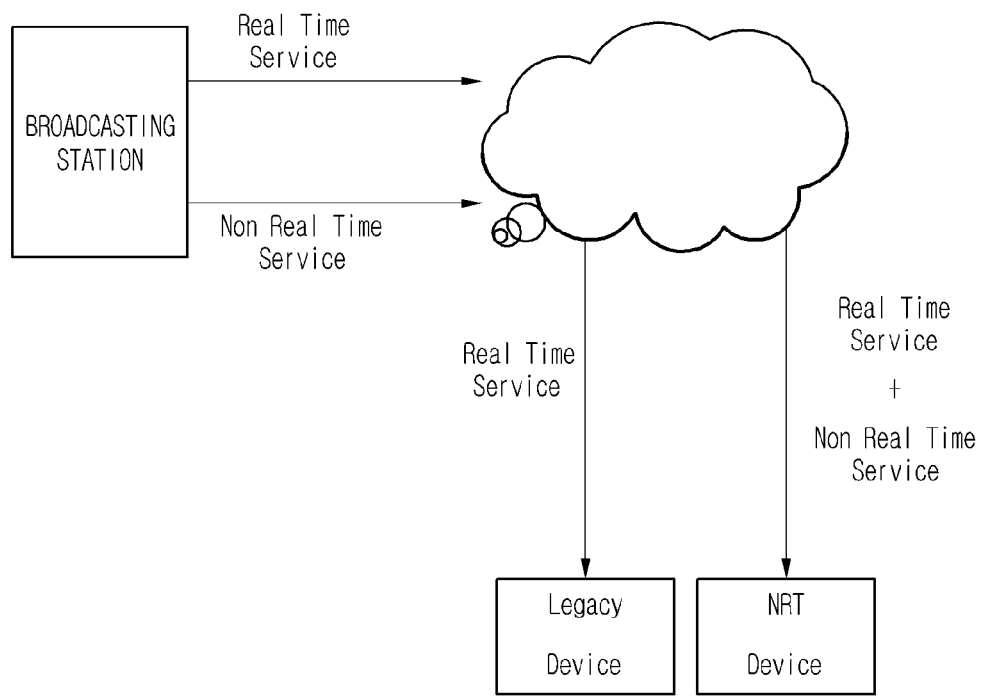
FIG. 1 is a conceptual diagram illustrating how RT service and NRT service are provided.

FIG. 1 is a conceptual diagram illustrating how RT service and NRT service are provided.

A broadcasting station transmits the RT service according to a traditional way, that is, like current terrestrial broadcasting (or mobile broadcasting). At this point, the broadcasting station transmits the RT service, and then, by using a remaining bandwidth during the transmission or an exclusive bandwidth, may provide the NRT service. That is, the RT service and NRT service are transmitted through the same or different channel. Accordingly, in order for a broadcast receiver to separate the RT service and the NRT service and store the separated NRT service in order to provide it to a user if necessary, service signaling information (or NRT service signaling data) is required. The NRT service signaling information (or NRT service signaling data) will be described in more detail later.

For example, a broadcasting station transmits broadcasting service data in real time and transmits news clip, weather information, advertisements, and Push VOD in non-real time. Additionally, the NRT service may be specific scenes, detail information of a specific program, and preview in real-time broadcasting stream in addition to news clip, weather information, advertisements, and Push VOD.

A typical broadcast receiver (i.e., a legacy device) may receive and process the RT service but may not receive and process the NRT service. That is, the typical broadcast receiver (i.e., a legacy device) is not influenced, in principle, by an NRT stream in a channel broadcasting RT service. That is, even when receiving NRT service, the typical broadcast receiver cannot process the received NRT service because it does not include a unit for processing it properly.

On the contrary, the broadcast receiver (i.e., an NRT device) of the present invention receives NRT service combined with RT service and properly processes the NRT service, so that it provides more various functions to a viewer than a typical broadcast receiver.

Figure 2:
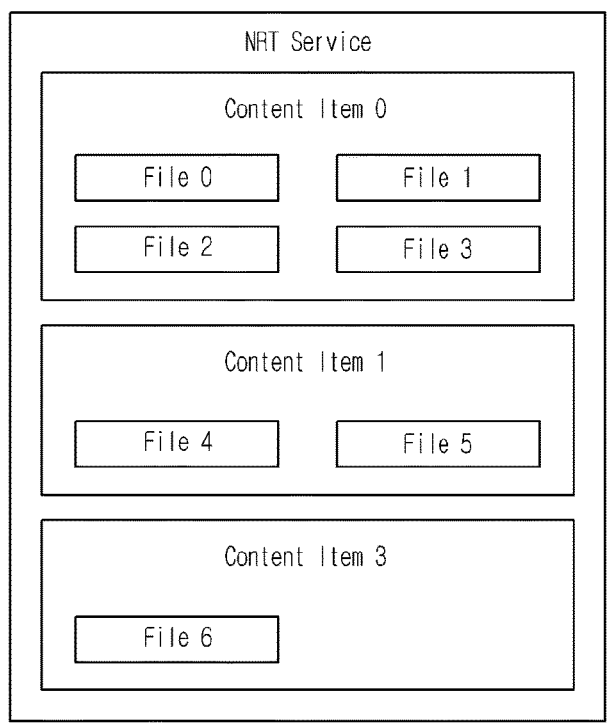
FIG. 2 is a view illustrating a structure of NRT service according to an embodiment.

FIG. 2 is a view illustrating a structure of NRT service according to an embodiment.

The NRT service includes at least one content item (or content or NRT content) as shown in FIG. 2, and the content item includes at least one file according to an embodiment. A file and object have the same meaning in the present invention.

The content item is a minimum unit playable independently. For example, news is provided in NRT. If the news includes business news, political news, and lift news, it may be NRT service, and each may be designated as a content item. Moreover, each of the business news, political news, and life news may include at least one file.

At this point, the NRT service may be transmitted in an MPEG-2 transport stream (TS) packet format through the same broadcasting channel as the RT service or an exclusive broadcasting channel. In this case, in order to identify the NRT service, a unique PID may be allocated to the TS packet of the NRT service data and then transmitted. According to an embodiment of the present invention, IP based NRT service data is packetized into an MPEG-2 TS packet and then transmitted.

At this point, NRT service signaling data necessary for receiving the NRT service data is transmitted through an NRT service signaling channel. The NRT service signaling channel is transmitted through a specific IP stream on an IP layer, and at this point, this specific IP stream may be packetized into an MPEG-2 TS packet and then transmitted. The NRT service signaling data transmitted through the NRT service signaling channel may include at least one of a Service Map Table (SMT), an NRT Service Table (NST), an NRT Content Table (NCT), an NRT Information Table (NRT-IT), and a Text Fragment Table (TFT). The NST or SMT provides access information on at least one NRT service operating on an IP layer, or the content items or files constituting the NRT service. The NRT-IT or NCT provides access information on the content items or files constituting the NRT service.

Additionally, NRT service signaling data including SMT (or NST) and NRT-IT (or NCT) may be included in a PSIP table on MPEG-2 TS or may be transmitted through an NRT service signaling channel on an IP layer in a virtual channel. Moreover, a plurality of NRT service data may be provided through one virtual channel.

The NRT-IT includes information describing a content downloadable to be stored in a receiving device. Information provided to the NRT-IT may include a content title (for example, the name of a downloadable program), available time for downloading content, content recommendation, availability of caption service, content identification, and other metadata.

Additionally, the TFT provides detailed description on a content item or service. The TFT may include a data structure supporting multi languages and, as a result, may represent detailed descriptions (e.g., each string corresponds to one language) in different languages. The text fragment table may be included in private sections having a table_id value (TBD) and may be identified by TFT_id. A TFT section may be included IP packets in a service signaling channel, and a multicast IP address (224.0.23.60) and a port (4937) may be allocated to the service signaling channel by IANA.

First, a receiver may identify whether a corresponding service is the NRT service with reference to a service_category field in the SMT, for example. Additionally, the receiver may uniquely identify the NRT service from the SMT through an NRT_service_id field.

Additionally, the NRT service may include a plurality of content items. The receiver may identify an NRT content item through a content_id field in the NCT or NRT-IT. In addition, the NRT content item and NRT service may be connected to each other by matching the NRT_channel_id field of the NCT to the NRT_service_id field.

Moreover, the NRT service may be transmitted through a FLUTE session and the receiver may extract FDT information from the FLUTE session. Then, content_id in the extracted FDT information is mapped into content_id of NCT or OMA-BCAST SG in order to confirm and receive the NRT service content that a user selects. If the mapping method is described briefly, for example, the receiver identifies each file constituting the NRT content item through the TOI and Content-Location fields in the FDT in the FLUTE session. Each TOI or the Content-Location and content item maps the content_ID of the FDT into the content_id field of the NCT or the content_id field of the OMA BCAST SG, so as to confirm and receive the NRT service content.

Figure 3:
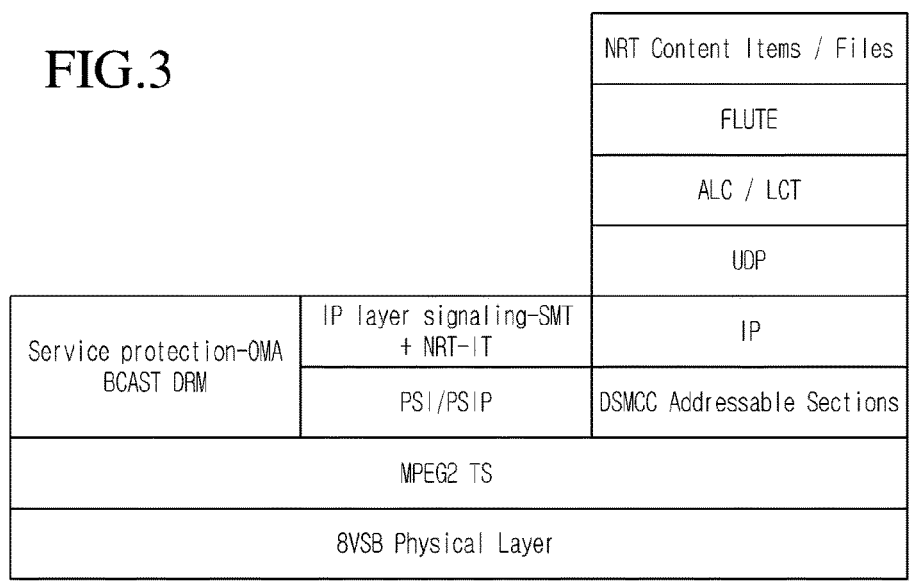
FIG. 3 is a view illustrating a protocol stack for NRT service according to an embodiment.

FIG. 3 is a view illustrating a protocol stack for NRT service according to an embodiment.

For Fixed NRT service, the NRT service of a file format is IP-packetized in an IP layer, and then, is transmitted in an MPEG-2 TS format through a specific channel.

Through an MPEG-2 based Program Specific Information (PSI) or Program and System Information Protocol (PSIP) table, for example, a VCT, it is determined whether there is NRT service in a virtual channel and identification information of NRT service is signaled.

According to an embodiment, the NRT service signaling channel, which transmits NRT service signaling data signaling the access information of the IP based NRT service, is IP packetized into a specific IP stream in the IP layer, and then, is transmitted in an MPEG-2 TS format.

That is, a broadcasting station packetizes the NRT content item or files according to a file transfer protocol method as shown in FIG. 3, and then, packetizes the packetized NRT content item or files in an Asynchronous Layered Coding (ALC) or Layered Coding Transport (LCT) method. Then, the packetized ALC or LCT data are packetized according to a UDP method. Then, the packetized UDP data is packetized according to the IP method again, and then, becomes IP data. Here, the IP data may include a File Description Table (FDT) having information on a File Delivery over Unidirectional Transport (FLUTE) session. The packetized IP data may be designated as IP datagram for convenience of description in the present invention.

Additionally, the IP datagram of NRT service is encapsulated in an addressable section structure and is packetized again in an MPET-2 TS format. That is, one addressable section structure has a section header and CRC checksum, which are added to one IP datagram. The format of the addressable section structure is matched to a Digital Storage Media Command and Control (DSM-CC) section format for private data transmission in terms of a structure. Accordingly, the addressable section may be designated as a DSM-CC addressable section.

Moreover, NRT service signaling data including at least one of SMT (or NST) and NRT-IT (or NCT) necessary for receiving NRT content/files may be transmitted through an NRT service signaling channel on an IP layer. Accordingly, the NRT service signaling data may be packetized according to an IP method in order to transmit it through the NRT service signaling channel on an IP layer. The NRT service signaling channel is encapsulated in the IP datagram having a well-known IP address and is multi-casted according to an embodiment.

Additionally, the NRT service signaling data may be included in Program Specific Information (PSI) or Program and System Information Protocol (PSIP) table section data and then transmitted. Moreover, the PSI table may include a Program Map Table (PMT) and a Program Association Table (PAT) The PSIP table may include a Virtual Channel Table (VCT), a Terrestrial Virtual Channel Table (TVCT), a Cable Virtual Channel Table (CVCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

Furthermore, as data for digital rights management and encryption of broadcasting service to protect the NRT service from illegal distribution and reproduction, BroadCast Services Enabler Suite Digital Rights Management (BCAST DRM) suggested by Open Mobile Alliance (OMA) may be used.

Moreover, the above mentioned Program Specific Information (PSI), Program and System Information Protocol (PSIP) table section data, DSM-CC addressable section data, and OMA BCAST DRM data are divided by a 184 byte unit, and then, a 4 byte MEPG header is added to each 184 bytes in order to obtain a 188 byte MPEG-2 TS packet. At this point, a value allocated to the PID of the MPEG header is a unique value identifying a TS packet for transmitting the NRT service and NRT service signaling channel.

MPEG-2 TS packets may be modulated in a predetermined transmission method in a physical layer, for example, an 8-VSB transmission method, and then, may be transmitted to a receiving system.

Moreover, FIG. 4 is a view illustrating a protocol stack for NRT service according to another embodiment.

FIG. 4 is view illustrating one example of the protocol stack for mobile NRT service. As shown in FIG. 4, an adaption layer is included between an IP layer and a physical layer. As a result, without using an MPEG-2 TS format, the IP datagram of mobile service data and IP datagram of signaling information may be transmitted.

That is, a broadcasting station packetizes the NRT content/files according to a file transfer protocol method as shown in FIG. 4, and then, packetizes them according to an Asynchronous Layered Coding (ALC)/Layered Coding Transport (LCT) method. Then, the packetized ALC/LCT data are packetized according to a UDP method. Then, the packetized ALC/LCT/UDP data is packetized again according to the IP method and becomes ALC/LCT/UDP/IP data. The packetized ALC/LCT/UDP/IP data may be designated as IP datagram for convenience of description in the present invention. At this point, OMA BCAST SG information undergoes the same process as the NRT content/file to constitute IP datagram.

Additionally, when NRT service signaling information (for example, SMT) necessary for receiving the NRT content/files is transmitted through a service signaling channel, the service signaling channel is packetized according to a User Datagram protocol (UDP) method, and the packetized UDP data is packetized again according to the IP method to become UDP/IP data. The UDP/IP data may be designated as IP datagram for convenience of description in the present invention. At the time, the service signaling channel is encapsulated in the IP datagram including Well-known IP destination address and well-known destination UDP port number, and is multi-casted according to an embodiment.

In addition, in relation to OMA BCAST DRM for service protection, a UDP header and an IP header are sequentially added to constitute one IP datagram.

The IP datagram of the NRT service, NRT service signaling channel, and mobile service data are collected in an adaption layer to generate a RS frame. The RS frame may include IP datagram of OMA BCAST SG.

The length (i.e., the number of rows) of a column in the RS frame is set by 187 bytes, and the length (i.e., the number of columns) of a row is N bytes (N may vary according to signaling information such as a transmission parameter (or TPC data).

The RS frame is modulated in a predetermined transmission method in a mobile physical layer (for example, VSB transmission method) and then is transmitted to a receiving system.

Moreover, whether the NRT service is transmitted is signaled through a PSI/PSIP table. As one example, whether the NRT service is transmitted is signaled to the VCT or TVCT.

FIG. 5 is a view illustrating a bit stream section of a TVCT table section (VCT) according to an embodiment.

Referring to FIG. 5, the TVCT table section has a table form of an MPEG-2 private section as one example, but is not limited thereto.

When the VCT and PID of the audio/video are parsed and then transmitted through the TVCT, the packet identification (PID) information may be obtained.

Accordingly, the TVCT table section includes a header, a body, and a trailer. A header part ranges from a table_id field to a protocol_version field. A transport_stream_id field is a 16 bit field and represents an MPEG-2 TS ID in a program association table (PAT) defined by a PID value of 0 for multiplexing. In a body part, a num_channels_in_section field is an 8 bit field and represents the number of virtual channels in a VCT section. Lastly, a trailer part includes a CRC_32 field.

First, the header part will be described as follows.

A table_id field (8 bits) is set with 0xC8 and identifies that a corresponding table section is a table section constituting TVCT.

A section_syntax_indicator field (1 bit) is set with 1 and represents that the section follows a general section syntax.

A private_indicator field (1 bit) is set with 1.

A section_length field (12 bits) describes that the number of bits remaining in the section to the last of the section from immediately after the section_length field. The value of the section_length field may not be greater than 1021.

A table_id_extension field (16 bits) may be set with 0x000.

A version_number field (5 bits) may have 0 and means the version number of VCT.

A current_next_indicator field (1 bit) represents that a corresponding table section is applicable currently if set with 1.

A section_number field (8 bits) indicates the number of corresponding table section among TVCT sections. In a first section of TVCT, section_number should be set with 0x00.

A last_section_number field (8 bits) means the table section of the last and highest number among TVCT sections.

A protocol_version field (8 bits) is a function that allows a table type delivering parameters having a different structure than one defined in a current protocol. Today, only one valid value of protocol_version is 0. The protocol_version having other than 0 may be used for the future version of the standard in order to recognize another table having a different structure.

Next, the body part will be described.

A num_channels_in_section field (8 bits) designates the numbers of virtual channels in the VCT section. The numbers are restricted by a table section length.

A short_name field (16 bits) represents the name of the virtual channel using 16 bit code value from 1 to 7 sequentially.

A major_channel_number field (10 bits) represents a major channel number related to a virtual channel defined by repetition in a "for" loop. Each virtual channel should relate to a major channel number and a minor channel number. The major channel number together with the minor channel number serve as a reference number of a virtual channel of a user.

A minor_channel_number field (10 bits) represent minor or sub channel numbers ranging from '0' to '999'. This field together with major_channel_number serves as the second of the number or a channel number of second part representing the right portion. The minor_channel_number is set with 0 if service_type is an analog television. When the service_type is an ATSC_digital_television or an ATSC_audio_only, it uses a minor number ranging from 1 to 99. A value of the minor_channel_number does not overlap that of the major_channel_number in a TVCT.

A modulation_mode field (8 bits) represents a modulation mode for carrier related to a virtual channel.

A carrier_frequency field (32 bits) has a recommendation value of 0. Although the field is used to identify a carrier frequency, it is not recommended.

A channel_TSID field (16 bits) is an unsigned integer field representing an MPEG-2 TS ID related to a TS containing an MPEG-2 program, which is reference by a virtual channel in a range from '0x0000' to '0xFFFF'.

A program_number field (16 bits) identifies an unsigned integer number related to a virtual channel defined in an MPEG-2 program association table (PAT) and a TS program map table (PMT). A virtual channel corresponding to analog service includes program_number of '0xFFFF'.

An ETM_location field (2 bits) describes the existence and location of an extended text message (ETM).

An access_controlled field (1 bit) indicates an access to events related to a virtual channel is controlled once it is set. If the flag is set with 0, an event access is not restricted.

A hidden field (1 bit) indicates that a user by a direct entry of a virtual channel number cannot access a virtual channel once it is set. A hidden virtual channel is omitted when a user surfs a channel, and is shown when the user accesses undefined or direct channel entry. A typical application of a hidden channel is a test signal and NVOD service. The hidden channel and its events may be shown on an EPG display according to a state of a hide_guide bit.

A hidden_guide field allows a virtual channel and its events to be displayed on an EPG display once it is set with 0 for a hidden channel. The bit is not related to a channel having no hidden bit set and thus non-hidden channels and their events are always displayed on an EPG display regardless of a state of a hide_guide bit. A typical application of a hidden channel, in which a hidden_guide bit set is set with 1, is a test signal and service easily obtainable through an application level pointer.

A service_type field (6 bits) represents a type of service transmitted from a virtual channel. FIGS. 6 and 7 are views illustrating how to define a value of a service_type field according to an embodiment. According to an embodiment, a service_type value (i.e., '0x04') shown in FIG. 6 means that service_type is ATSC_data_only_service and NRT service is transmitted through a virtual channel. According to another embodiment, a service_type value (i.e., '0x08') shown in FIG. 7 means that service_type is ATSC_nrt_service and a virtual channel provides NRT service satisfying the ATSC standard.

A source_id field (16 bits) represents the source of a program related to a virtual channel.

A descriptors_length field represents the total length (byte unit) of a descriptor for the following virtual channel.

A descriptor( ) field includes at least zero descriptor.

An additional_descriptors_length field represents a total length (byte unit) of the following VCT descriptor.

Lastly, in relation to the trailer part, a CRC_32 field is a 32 bit field and includes a cyclic redundancy check (CRC) value, which ensures zero output from registers of a decoder defined in an MPEG-2 system after processing an entire STT section.

FIG. 8 is view of data_service_table_section) for identifying an application of NRT service and bit stream syntax of data_service_table_bytes in a DST section. A broadcasting station NRT service data or NRT service signaling data, satisfying ASTC standard, may be transmitted through the DST table section of FIG. 8.

Hereinafter, semantic of fields including a data_service_table_section structure is as follows.

A table_id field (8 bits) as a field for type identification of a corresponding table section is a table section in which a corresponding table section constitutes DST through this field. For example, a receiver identifies that a corresponding table section is a table section constituting DST if a value of the field is 0XCF.

A section_syntax_indicator field (1 bit) is an indicator defining a section format of DST, and the section format may be short-form syntax (0) of MPEG, for example.

A private_indicator field (1 bit) represents whether the format of a corresponding section follows a private section format and may be set with 1.

A private_section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields.

A version_number field (5 bits) represents the version number of DST.

A current_next_indicator field (1 bit) indicates whether a transmitted DST table section is applicable currently. If the field value is 0, it means that there is no table yet and the next table is valid.

A section_number field (8 bits) represents a section number in sections in which a corresponding table section constitutes a DST table. section_number of the first section in DST is set with '0x00'. The section_number is increased by one as the section of DST is increased.

A last_section_number field (8 bits) represents the last section number constituting a DST table, i.e., the highest section_number.

data_service_table_bytes represents a data block constituting DST, and its detailed structure will be described below.

A CRC_32 field is a 32 bit field and includes a cyclic redundancy check (CRC) value, which ensures zero output from registers of a decoder defined in an MPEG-2 system after processing an entire DST section.

Hereinafter, semantic of fields including a data_service_table_bytes structure is as follows.

An sdf_protocol_version field (8 bits) describes the version of a Service Description Framework protocol.

An application_count_in_section field (8 bits) represents the number of applications listed in a DST section.

A compatibility_descriptor( ) field represents that a corresponding structure includes a DSM-CC compatible descriptor. Its purpose is to signal compatible requirements of an application in a receiving platform in order to use a corresponding data service after determining its ability.

An app_id_byte_length field (16 bits) describes the number of bytes used for identifying an application.

An app_id_description field (16 bits) describes the format and semantic of the following application identification bytes. For example, a value of an app_id_description may be defined as Table 1.

TABLE 1

| Value | Application Identifier Format |
| --- | --- |
| 0x0000 | DASE application |
| 0x0001-0x7FFF | ATSC reserved |
| 0x8000-0xFFFF | User private |

An app_id_byte field (8 bits) represents a byte of an application identifier.

A tap_count field (8 bits) describes the number of Tap( ) structures used for corresponding application.

A protocol_encapsulation field (8 bits) describes a protocol encapsulation type used for transmitting a specific data element referenced by a Tap( ) field. A value of the protocol_encapsulation field is defined as Table 2.

TABLE 2

| Value | Encapsulated Protocol |
| --- | --- |
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |

TABLE 2-continued

| Value | Encapsulated Protocol |
| --- | --- |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0xFF | User defined |

An action_type field (7 bits) represents attribute of data referenced by a Tap( ).

A resource_location field (1 bit) describes a position of an association_tag field matching to an association_tag value listed in the next Tap structure. When a corresponding field is set with 0, association_tag exists in PMT of a current MPEG-2 program. Like this, when the corresponding field is set with 1, a matching association_tag exits in DSM-CC Resource Descriptor in a Network Resources Table of a corresponding data service.

A Tap( ) field may include information on searching a data element of an application state in a communication channel of a lower layer. An association_tag field in a Tap( ) field may include correspondence information between data elements of an application state. A value of an association_tag field in one Tap structure corresponds to a value of an association_tag field of one association tag descriptor in a current PMT. For example, a Tap( ) field may have a specific structure including fields of Table 3.

TABLE 3

| Syntax | No. of bits | Format |
| --- | --- | --- |
| Tap ( ) { | | |
| tap_id | 16 | uimsbf |
| use | 16 | uimsbf |
| association_tag | 16 | uimsbf |
| selector( ) | | |
| } | | |

A tap_id field (16 bits) is used by an application to identify data elements. A value of tap_id has a range defined by values of app_id_byte fields related to Tap( ) in DST. A tap_id value is selected by a data service provider. Additionally, the tap_id value may be used for application to deal with a data element.

A Use field (16 bits) is used to specify a communication channel referenced by association_tag.

An association_tag field (16 bits) uniquely identifies one of a DSM-CC resource descriptor listed in a Network Resource Table or data elementary stream listed in PMT. A value of a corresponding field may be identical to an association_tag value of association_tag_descriptor.

A Selector( ) field describes a specific data element available in a communication channel or data elementary stream referenced by the association_tag field. Additionally, the selector structure may indicate a protocol required for a corresponding data element.

A tap_info_length field (16 bits) describes the number of bytes of descriptors in the next of a corresponding field.

A descriptor( ) field may include descriptor information according to a corresponding descriptor format.

An app_info_length field (8 bits) describes the number of bytes of the next descriptors of a corresponding field.

A descriptor( ) field may include descriptor information according to a corresponding descriptor format.

An app_data_length field (16 bits) describes the length of a byte unit of app_data_byte fields.

An app_data_byte (8 bits) field represents input parameters related to application and other private data fields in 1 byte.

A service_info_length field (8 bits) describes the number of byte units of the next descriptor.

A descriptor( ) field may include descriptor information according to a corresponding descriptor format.

A service_private_data_length field (16 bits) describes the length of a byte unit in private fields.

A service_private_data_byte field (8 bits) represents a private field in 1 byte.

Figure 9:
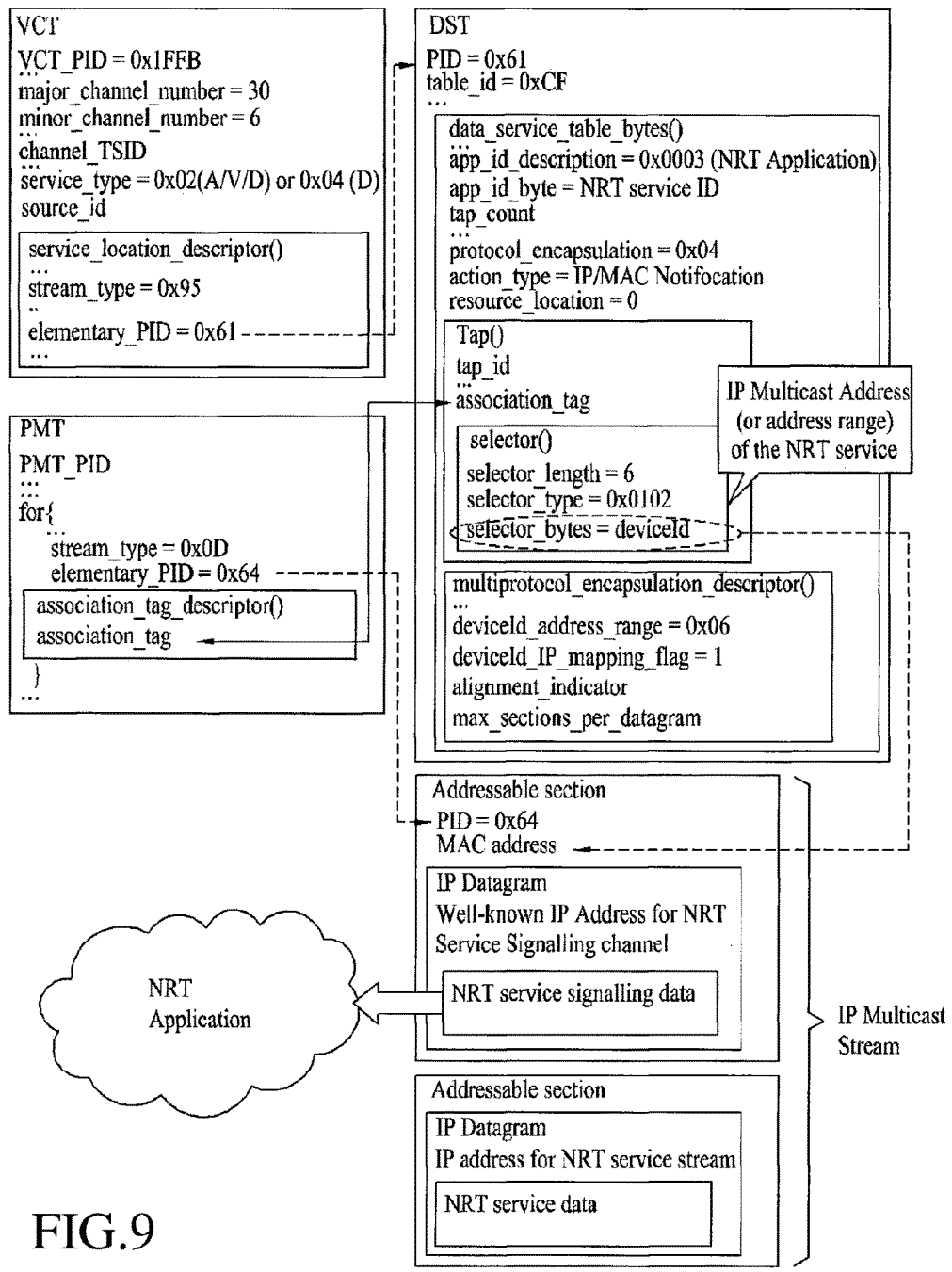
FIG. 9 is a view illustrating a method of receiving and providing NRT service in a receiving system by using ATSC A/90 standard for transmitting data broadcasting stream and ATSC A/92 standard for transmitting IP multicast stream.

FIG. 9 is a view illustrating a method of receiving and providing NRT service in a receiving system by using ATSC A/90 standard for transmitting data broadcasting stream and ATSC A/92 standard for transmitting IP multicast stream.

That is, information on stream constituting each virtual channel is signaled to service location descriptor of VCT or ES_loop of PMT. For example, as shown in FIG. 7 or 8, if VCT service type is 0x02 (i.e., digital A/V/Data), 0x04 (i.e., Data only), or 0x08 (i.e., NRT Only service), NRT service stream may be transmitted to the virtual channel. At this point, if 0x95 (i.e., DST transmission) is allocated to a stream_type field value in a service location descriptor (or ES_loop of PMT), it means that broadcast is transmitted. If the stream_type field value has no value or is not 0x95, only typical A/V is transmitted. That is, if the stream_type field value in service location descriptor has 0x95, an Elementary_PID field value at this point is a PID value of a Data Service Table (DST). Accordingly, DST may be received through the Elementary_PID.

Through the DST, types of application and detailed information on data broadcasting stream transmitted through the channel may be obtained. The DST is used to identify NRT application (i.e., NRT service).

That is, the App_id_description field of DST defines the format and interpretation of the following application identification bytes. According to an embodiment, '0x0003' is allocated to the App_id_description field to identify NRT application. The above numerical value is just one example, and does not restrict the range of the rights of the present invention.

If the App_id_description field value is '0x0003', the next following Application_id_byte value becomes a Service ID value of the NRT application. A service ID for the NRT application may have a URI value uniquely identifying a corresponding service around the world.

After the NRT application is identified, PID of an MPEG-2 TS packet divided from the IP datagram of an NRT service signaling channel is searched through Tap information. Then, IP datagram transmitting a NRT service signaling channel may be obtained from MPEG-2 TS packets having PID obtained through the tap information, and NRT service signaling data may be obtained from the obtained IP datagram. At this point, the IP access information of the NRT service signaling channel may be well-known IP access information, i.e., well-known IP address and well-known UDP port number.

That is, if the Protocol_encapsulation field value in the DST is 0x04, asynchronous IP stream is transmitted, and if the Selector_type field value is 0x0102, a device_id value indicating destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

Then, the receiver receives NRT service data, i.e., NRT content item/files to store them in a storage medium or display them on a display device, on the basis of the extracted NRT service signaling data.

According to another embodiment, a Stream Type field value of DST may have new 0x96 instead of 0x95 to signal NRT service. This is because NRT service, i.e., new application, may malfunction when a typical receiver determines whether there is data broadcasting stream only on the basis of whether there is stream having a stream type of 0x95. In this case, with designating a stream newly, a typical receiver may disregard it to guarantee backwards compatibility.

Figure 10:
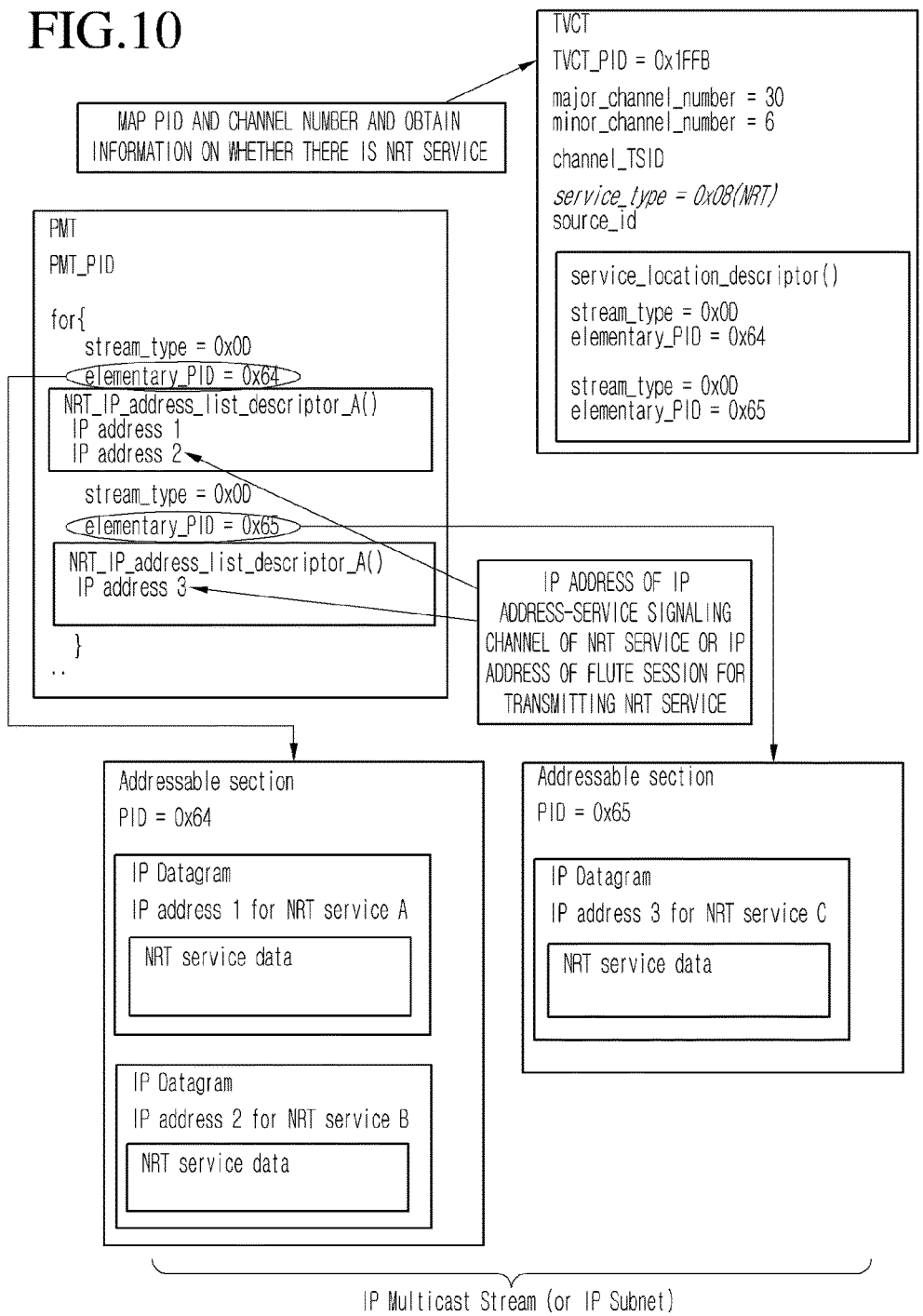
FIGS. 10 and 11 are views illustrating a method of signaling a DSM-CC addressable section data by using VCT according to another embodiment.
Figure 11:
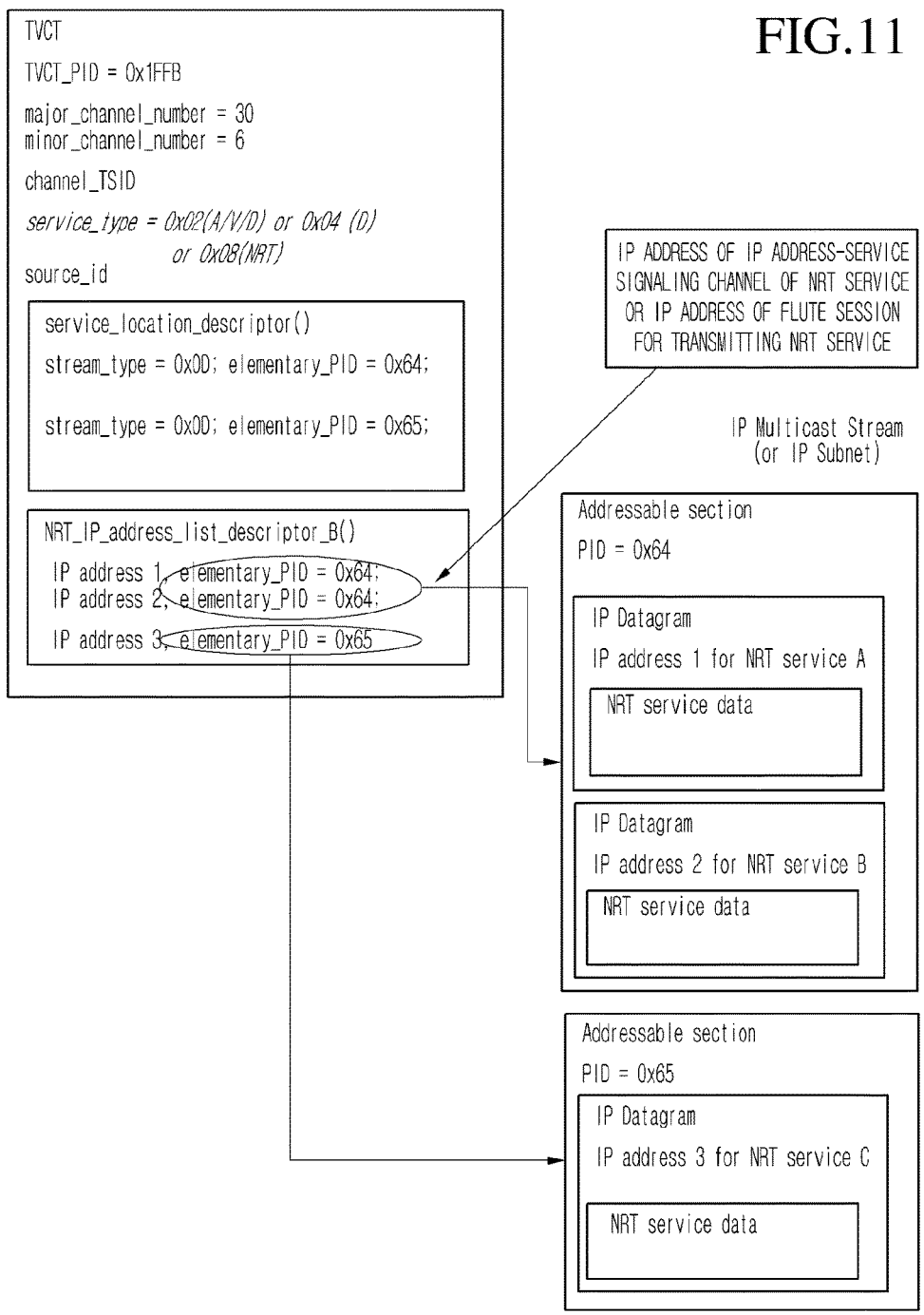

FIGS. 10 and 11 are views illustrating a method of receiving NRT service by using DSM-CC addressable section data according to another embodiment.

A data transmission method using DST is a standard for transmitting all kinds of IP datagram through digital broadcasting stream, and may be inefficient for the NRT service. Accordingly, FIGS. 10 and 11 illustrate a method of receiving the NRT service by signaling the PID of a specific stream including IP address information and section data of the IP datagram with respect to the NRT service through the data of the DSM-CC addressable section.

As shown in FIG. 10, the receiver may obtain information that NRT service stream is transmitted through the virtual channel when a service type of VCT (or TVCT) is 0x08 (i.e., NRT Only service). That is, the receiver may obtain information on whether there is NRT service according to service_type information by mapping the PID of a virtual channel into a channel number.

At this point, if 0x0D is allocated to a stream_type field value in service location descriptor of VCT (or ES loop of PMT), it means that DSM-CC stream is transmitted. An Elementary_PID field value at this point may be the PID value of a DSM-CC addressable section. Accordingly, the receiver receives a DSM-CC addressable section including NRT service data through Elementary_PID.

That is, the receiver may obtain the PID of the DSM-CC addressable section through VCT or PMT. Here, the receiver may obtain an NRT_IP_address_list_descriptor_A( ) field including an IP address of an NRT service signaling channel or an IP address of the FLUTE session for transmitting NRT service data, which corresponds to the PID obtained from PMT of the corresponding stream.

Moreover, the receiver may receive DSM-CC addressable section data from IP multicast stream or IP subnet on the basis of the IP address obtained from an NRT_IP_address_list_descriptor_A( ) field. The receiver may obtain a corresponding IP datagram including a specific NRT service (for example, A, B, or C) data by searching a DSM-CC addressable section having PID corresponding to the obtained elementary_PID from the received DSM-CC addressable section data.

FIG. 11 is a view illustrating a method of signaling a DSM-CC addressable section data by using VCT according to another embodiment.

As mentioned above, the receiver may obtain information that NRT service stream may be transmitted when a service_type in VCT is 0X02, 0X04 of 0X08. Also, the receiver may obtain elementary_PID having a stream type of 0X0D from the service_location_descriptor( ) field to receive the DSM-CC stream. Here, the receiver may obtain an NRT_IP_address_list_descriptor_B( ) field including an IP address of an NRT service signaling channel or an IP address of the FLUTE session for transmitting NRT service data, which corresponds to the obtained elementary_PID.

Moreover, the receiver may receive DSM-CC addressable section data from IP multicast stream or IP subnet on the basis of the IP address obtained from an NRT_IP_address_list_descriptor_B( ) field. The receiver may obtain the IP datagram including specific NRT service (for example, A, B, or C) that it wants to receive from the received DSM-CC addressable section data by parsing the DSM-CC addressable section having PID corresponding to the obtained elementary_PID.

The processes for extracting NRT service signaling data and NRT service data are described as follows. Here, 0x08 is allocated to the service_type field value in VCT, and indicates that at least one NRT service is transmitted to a corresponding virtual channel.

That is, when the receiver is turned on and a channel is selected by default or a user through a tuner, the PSI/PSIP section handler obtains VCT and PMT from a broadcast signal received through the selected channel. Also, the PSI/PSIP section handler parses the obtained VCT to confirm whether there is NRT service. This is confirmed by checking the service_type field value in a virtual loop of the VCT. For example, when the service_type field value is not 0x08, the corresponding virtual channel does not transmit NRT service. At this point, since the virtual channel transmits existing service (i.e., legacy ATSC service), the receiver operates properly according to information in the virtual channel.

Additionally, in relation to a demultiplexing unit, if a service_type field value is 0x08 according to a control of a service manager, a corresponding virtual channel transmits NRT service. In this case, PID of DST is extracted by parsing a service location descriptor in a virtual channel loop of the VCT. Moreover, DST is received by using the extracted PID.

Moreover, the receiver confirms whether a corresponding service provided through a channel selected from the received DST is NRT service.

The NRT service is confirmed by an App_id_description field value.

According to an embodiment, '0x0003' is allocated to the App_id_description field to identify NRT application. The above numerical value is just one example, and does not restrict the range of the rights of the present invention.

If the App_id_description field value in the DST is '0x0003', the next following Application_id_byte value becomes a Service ID value of the NRT application (i.e., NRT service). Therefore, the service manager or PSI/PSIP section handler extracts Tap( ) to PID of an MEGP-2 TS packet separated from the IP datagram of the NRT service signaling channel after identifying the NRT application (i.e., NRT service). Then, stream PID including association_tag of the extracted Tap is extracted from PMT.

Also, the addressable section handler may recover the DSM-CC addressable section by removing decapsulation, i.e., an MPEG-2 header, after receiving MPEG-2 TS packets corresponding to the extracted stream PID.

Then, the receiver recovers the IP datagram transmitting an NRT service signaling channel by removing a section header and CRC checksum from the DSM-CC addressable section and obtains NRT service signaling data from the recovered IP datagram. Here, access information on the IP datagram transmitting the NRT service signaling channel is a well-known destination IP address and a well-known destination UDP port number.

That is, if the Protocol_encapsulation field value in the DST is 0x04, asynchronous IP stream is transmitted, and if the Selector_type field value is 0x0102, a device_id value indicating a destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

The receiver receives NRT service data, i.e., NRT content item/files to store them in a storage medium or display them on a display device, on the basis of the extracted NRT service signaling data.

Moreover, the NRT service may be provided Dynamic Content Delivery (DCD) service according to an embodiment. The DCD service is service for transmitting content to a receiver periodically or at the user request, and the content is selected from a server according to receiver information. The DCD service supports a point-to-point method and a broadcast method in a communication means for content delivery, and the above NRT service is transmitted through an OMA BCAST method and one of the broadcast methods of the DCD service.

NRT service data may be transmitted through the DCD service of the OMA BCAST method. In this case, the receiver may obtain the DCD channel information to receive NRT service and may receive the NRT service through a corresponding DCD channel on the basis of the DCD channel information.

Moreover, the DCD channel information may be included in the NST and transmitted. For example, the receiver receives NST, and obtains DCD channel information through DCD bootstrap.

Additionally, the NST may include DCD channel metadata, received through a DCD administrative channel, for signaling of the DCD channel information. Accordingly, the receiver may obtain information on a channel for receiving NRT service and metadata through NST.

Accordingly, when NST including DCD channel information is transmitted, the receiver accesses the DCD channel through NST without transmission of the NRT service signal data, and then receives the NRT service.

Like this, if NST includes metadata of a channel for receiving NRT service, there are several advantages.

First, without receiving the NRT service signaling data on the basis of the service type of a virtual channel, service access speed may be increased by receiving channel metadata that directly receives NRT service from NST.

Additionally, update signaling for a channel change item may be performed in real time in a broadcast environment.

Moreover, access information in OMA BCAST SG may be obtained by referring to NST. For example, the receiver receives DCD channel meta data on the basis of the DCD channel information in NST, and obtains access information to receive NRT service on the basis of the NRT service signaling data and DCD channel metadata obtained from NST.

Lastly, NST including a list of NRT service related to another virtual channel may be transmitted. Accordingly, list information of the NRT service may be transmitted through a specific NRT service signaling channel on an IP layer not on a PSI or PSIP layer. Accordingly, in this case, backwards compatibility to PSI or PSIP may be reserved.

In addition, as mentioned above, the DCD channel information including the DCD channel metadata may be included in the access information of SG in OMA BCAST, and the access information corresponds to the NRT service information in NST. In more detail, the receiver may obtain NRT service information in NST from an access fragment of OMA BCAST SG. Accordingly, the receiver may obtain information on receiving NRT service by receiving NST corresponding to the obtained NRT service information.

Moreover, the NRT service transmitted through the DCD channel may be divided by a service category allocated. For example, the service category of the NRT service transmitted through the DCD channel may be identified by 0X0F.

FIGS. 12 and 13 are views illustrating a bit stream syntax of NST according to an embodiment.

Here, the corresponding syntax is created in an MPEG-2 private section format to help understanding, but the format of the corresponding data may vary. For example, the corresponding data may be expressed in a Session Description Protocol (SDP) format and signaled through a Session Announcement Protocol (SAP) according to another method.

NST describes service information and IP access information in a virtual channel for transmitting NST, and provides NRT broadcast stream information of a corresponding service by using an identifier of the NRT broadcast stream, i.e., NRT_service_id, in each service. Furthermore, the NST describes description information of each fixed NRT service in one virtual channel, and a descriptor area may include other additional information.

A table_id field (8 bits) as a field for type identification of a corresponding table section is a table section in which a corresponding table section constitutes NST through this field.

A section_syntax_indicator field (1 bit) is an indicator defining a section format of NST, and the section format may be short-form syntax (0) of MPEG, for example.

A private_indicator field (1 bit) represents whether the format of a corresponding section follows a private section format and may be set with 1.

A section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields. Here, a table_id_extension field includes an NST_protocol_version field.

The NST_protocol_version field (8 bits) shows a protocol version for notifying that NST transmits parameters having a different structure than other defined in a current protocol. Currently, this field value is 0. If the field value is designated with other than 0 later, it is for a table having a different structure.

A version_number field (5 bits) represents the version number of NST.

A current_next_indicator field (1 bit) indicates whether a transmitted NST table section is applicable currently. If the field value is 0, it means that there is no table yet and the next table is valid.

A section_number field (8 bits) represents a section number in sections in which a corresponding table section constitutes a NST table.

section_number of the first section of an NRT Service Table (NST) is set with '0x00'. The section_number is increased by one each time a section of the NST is increased.

A last_section_number field (8 bits) represents the last section number constituting a NST table, i.e., the highest section_number. (Highest section_number)

A carrier_frequency field (32 bits) notifies a transmission frequency corresponding to a channel.

A channel_TSID field (16 bits) means a unique channel identifier of broadcast stream in which a corresponding NST section is currently transmitted.

A program_number field (16 bits) represents the number of a program related to a virtual channel.

A source_id field (16 bits) represents the source of a program related to a virtual channel.

A num_NRT_services field (8 bits) represents the number of NRT services in an NST section.

Additionally, NST provides information on a plurality of fixed NRT services by using a 'for' loop. Hereinafter, the same field information may be provided to each fixed NRT service.

An NRT_service_status field (2 bits) identifies a state of a corresponding mobile service. Here, MSB indicates whether a corresponding mobile service is active (1) or inactive (0), and whether the corresponding mobile service is hidden (1) or not (0). Here, if the mobile service is NRT service, a state of the corresponding NRT service is identified. Hidden service is mainly used for exclusive application and a typical receiver disregards it.

A SP_indicator field (1 bit) is a field representing service protection if the service protection applied to at least one of components necessary for providing meaningful presentation of a corresponding mobile service is set.

A CP_indicator field (1 bit) represents whether content protection of a corresponding NRT service is set. If the CP_indicator field value is 1, it means that the content protection is applied to at least one of components required to provide a meaningful presentation of a corresponding NRT service.

An NRT_service_id field (16 bits) is an indicator that uniquely identifies a corresponding NRT service in a range of a corresponding NRT broadcast. The NRT_service_id is not changed during the corresponding service. Here, if the service is terminated, in order to evade confusion, NRT_service_id for the service may not be used for another service until an appropriate time elapses.

A Short_NRT_service_name field (8*8 bits) displays a short name of the NRT service. If there is no short name of the NRT service, the field may be filled with a null value (for example, 0x00).

An NRT_service_category field (6 bits) identifies a type of service in the corresponding NRT service.

A num_components field (5 bits) displays the number of IP stream components in the NRT service.

If an IP_version_flag field (1 bit) is set with 0, it indicates that a source_IP_address field, an NRT_service_destination_IP_address field, and a component_destination_IP_address field are IPv4 addresses. If set with 1, a source_IP_address field, an NRT_service_destination_IP_address field, and a component_destination_IP_address field are IPv6 addresses.

A source_IP_address_flag field (1 bit) indicates when a flag is set that there is a source_IP_address value for corresponding NRT service to indicate source specific multicast.

An NRT_service_destination_IP_address_flag field (1 bit) indicates when a flag is set with 1 that there is an NRT_service_destination_IP_address field for providing a default IP address for components of a corresponding NRT service.

In relation to a source_IP_address field (128 bits), there is a corresponding field if source_IP_address_flag is set with 1, but there is no corresponding field if set with 0. If there is a corresponding field, the corresponding field includes a source IP address of all IP datagram transmitting components of the corresponding NRT service. A restricted use of a 128 bit long address of a corresponding field is for future use of IPv6, which is not currently used though. Source_IP_address becomes a source IP address of the same server transmitting all channels of a FLUTE session.

In relation to an NRT_service_destination_IP_address field (128 bits), if source_IP_address_flag is set with 1, there is a source_IP_address field, but if source_IP_address_flag is set with 0, there is no corresponding source_IP_address field. If there is no corresponding source_IP_address field, a component_destination_IP_address field exists for each component in a num_components loop. A restricted use of a 128 bit long address of a corresponding source_IP_address field is for future use of IPv6, which is not currently used though. NRT_service_destination_IP_Address is signaled if there is a destination IP address of a session level of the FLUTE session.

Additionally, NST provides information on a plurality of components by using a 'for' loop. An essential_component_indicator field (1 bit) indicates when a value of a corresponding value is set with 1 that a corresponding component is a necessary component for NRT service. If not, the corresponding component is a selected component.

A port_num_count field (6 bits) indicates numbers of UDP ports related to a corresponding UDP/IP stream component. Values of the destination UDP port numbers are increased by one, starting from a component_destination_UDP_port_num field value.

A component_destination_IP_address_flag field (1 bit) is a flag representing that there is a component_destination_IP_address field for corresponding component if set with 1.

In relation to component_destination_IP_address field (128 bits), if component_destination_IP_address_flag is set with 1, there is corresponding field, but if component_destination_IP_address_flag is set with 0, there is no corresponding field. If there is a corresponding field, the corresponding field includes a source IP address of all IP datagram transmitting components of the corresponding NRT service. A restricted use of a 128 bit long address of a corresponding field is for future use of IPv6, which is not currently used though.

A component_destination_UDP_port_num field (16 bits) represents a destination UDP port number for corresponding UDP/IP stream component.

A num_component_level_descriptors field (4 bits) provides the number of descriptors providing additional information on corresponding IP stream component.

A component_level_descriptors field identifies at least one descriptor providing additional information on a corresponding IP stream component.

A num_NRT_service_level_descriptors field (4 bits) represents the number of NRT service level descriptors for corresponding service.

NRT_service_level_descriptor( ) identifies no or at least one descriptor providing additional information on corresponding NRT service. Here, a specific service type for NRT service may be provided. The specific service type includes a portal service providing web content, push VOD, and A/V download.

A num_virtual_channel_level_descriptors field (4 bits) describes the number of virtual channel level descriptors for a corresponding virtual channel.

virtual_channel_level_descriptor( ) represents a descriptor providing additional information on a virtual channel that a corresponding NST describes.

Moreover, NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel.

Additionally, a destination port number is signaled through component_destination_UDP_port_num and the number of destination ports starting from component_destination_UDP_port_num may be additionally designated through port_num_count.

A plurality of channels may be configured for one destination IP address by designating a port in plurality. Here, one component designates a plurality of channels. However, it is desired to identify a channel through a destination IP address in general. Here, one channel is typically mapped into one component.

Content items/files for NRT service are transmitted through FLUTE, and corresponding FLUTE session information is signaled using access information on the NST table.

FIG. 14 is a view illustrating a bit stream syntax of NRT_component_descriptor (MH_component_descriptor) according to an embodiment.

NRT_component_descriptor( ) is shown in a component descriptor loop in each component of each NRT service in NST. Then, all parameters in a corresponding descriptor correspond to parameters used for components of NRT service.

Hereinafter, each field information transmitted through the NRT_component_descriptor of FIG. 14 will be described as follows.

A component_type field (7 bits) identifies an encoding format of a component. The identification value may be one of values allocated for payload_type of a RTP/AVP stream. Additionally, the identification value may be a dynamic value ranging from 96 to 127. Values of the field for components constituting media transmitted through RTP are identical to those in payload_type in an RTP header of IP stream transmitting a corresponding component.

An adding value of a component_type field in a range of 43 to 71 will be defined in the future version of the standard. When NRT service stream is transmitted based on FLUTE, in order to additionally signal parameters (described below) necessary for FLUTE session, 38 (which is component_type defined for a FLUTE component in ATSC) may be used, or 43 (i.e., an unallocated value) may be defined as component_type for new NRT transmission, and used.

A num_STKM_streams field (8 bits) identifies numbers of STKM streams related to a corresponding component.

A STKM_stream_id field (8 bits) identifies STKM stream having keys in order to decrypt the obtained corresponding protected component. Here, the STKM_stream_id field in the component descriptor for the STKM stream is referred.

An NRT_component_data (component_type) field provides at least one of encoding parameters necessary for expressing a corresponding component and other parameters. Here, a structure of an NRT_component_data element is determined by a value of a component_type field.

A File Delivery Table (FDT) of FLUTE sessions is used for delivering item lists of all content items, and provides sizes, data types, and other information of items related to obtain the items.

Accordingly, the present invention obtains information for accessing the FLUTE session transmitting a corresponding content by using NST, in order to receive a selected content from SG obtained by using NRT-IT. Moreover, the present invention maps information in a file transmitted through a corresponding FLUTE session into information on a content item of NRT-IT. In this case, identification of service including the selected content item is resolved through NRT_service_id of the NST.

NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel. Additionally, a destination port number is signaled through component_destination_UDP_port_num and the number of destination ports starting from component_destination_UDP_port_num may be additionally designated through port_num_count.

A plurality of channels may be provided to one destination IP address by designating a plurality of ports, and in such a case, one component designates a plurality of channels. However, it is recommended that a channel be distinguished through a destination IP address, and in such a case, one channel is mapped into one component.

component_attribute_byte may be used to signal an additional attribute of a component constituting a session. Additional parameters necessary for signaling a FLUTE session may be signaled through this.

In this regard, parameters for signaling the FLUTE session are required, and include definitely necessary required parameters and optional necessary parameters related to a corresponding FLUTE session. Firstly, the definitely necessary parameters include parameters such as a source IP address, the number of channels in the session, the destination IP address and port number for each channel in the session, the Transport Session Identifier (TSI) of the session, and the start time and end time of the session. The optional necessary parameters related to a corresponding FLUTE session include parameters such as FEC Object Transmission Information, some information that tells receiver in the first place, that the session contains files that are of interest and bandwidth specification.

The number of channels in the session may be explicitly provided, or may be obtained by adding up the number of streams constituting the session. Through the NST and component_descriptor, parameters such as start time and end time of the session, source IP address, destination IP address and port number for each channel in the session, Transport Session Identifier (TSI) of the session, and number of channels in the session may be signaled.

FIG. 15 is a view illustrating a bit stream syntax of NRT component descriptor including NRT_component_data according to an embodiment.

One NRT service may be included in multiple FLUTE sessions. Each session may be signaled using at least one NRT component descriptors depending on IP addresses and ports used for the session.

Hereinafter, each field of NRT_component_data will be described as follows.

A TSI field (16 bits) represents TSI of a FLUTE session.

A session_start_time field indicates a start time of the FLUTE session. If all values of the corresponding fields are 0, it means that a session started already.

A session_end_time field indicates an end time of the FLUTE session. If all values of the corresponding fields are 0, it means that a session continues infinitely.

A tias_bandwidth_indicator field (1 bit) indicates flags including Transport Independent Application Specific (TIAS) bandwidth information. If it indicates that the TIAS bandwidth field exists, a corresponding bit is set with 1, and if it indicates that the TIAS bandwidth field does not exist, the corresponding bit is set with 0.

In relation to an as_bandwidth_indicator field (1 bit), flags include Application Specific (AS) bandwidth information. If it indicates that the AS bandwidth field exists, a corresponding bit is set with 1, and if it indicates that the AS bandwidth field does not exist, the corresponding bit is set with 0.

An FEC_OTI_indicator field (1 bit) represents whether FEC object transmission information (OTI) is provided.

A tias_bandwidth field represents a TIAS maximum bandwidth.

An as_bandwidth field has an AS maximum bandwidth value.

An FEC_encoding_id field represents FEC encoding ID used in the corresponding FLUTE session.

An FEC_instance_id field represents FEC instance ID used in the corresponding FLUTE session.

Provided is a method of providing all Information necessary for receiving the FLUTE session by signaling the same parameters as above through FLUTE component data bytes, and of receiving files by obtaining information on all the files delivered through the FLUTE session that uses FDT received through the session.

This FLUTE component descriptor may be delivered through a Component_level_descriptor loop of NST. If the FLUTE channel is in plurality, since TSI and session_start_time, session_end_Time, i.e., parameters of a session level, should be signaled once, a FLUTE component descriptor may be transmitted only in one of components in several channels through a Component_level_descriptor loop.

FIG. 16 is a view illustrating a bit stream syntax of NRT-IT section for signaling NRT application according to an embodiment.

Information provided from NRT-IT includes a title of content (for example, a name of downloadable program), download available time and information, content advisories, caption service availability, content identification, and other metadata. One item of content may include at least one file. For example, an audio/video clip may be played in a JPEG thumbnail image used for displaying a screen.

An instance of NRT-IT may include data corresponding to an arbitrarily predetermined period, or may describe a NRT content starting at a predetermined time and ends at the indefinite future. Each NRT-IT represents a start time and a duration period that may be indefinite. Each NRT-IT instance may be divided into 256 sections. Each section includes information on a plurality of content items. Information of a specific content item cannot be divided and stored in at least two sections.

The downloadable content item, which is more extended than a period that at least one NRT-IT instance takes, is the first of NRT-IT. The content item description is stored in NRT_information_table_section( ) in an availability order. Accordingly, when a value of last_section_number is greater than 0 (it means that NRT-IT is transmitted to a plurality of sections), all content item description in a specific section not the first section may have the same as or higher availability than the content item description of the next section.

Each NRT-IT identifies an NRT service related to a specific value of a valid service_id in a specific virtual channel during the period.

A table_id field (8 bits) is set with 0xTBD to identify a table section that a corresponding table section constitutes NRT-IT.

A service_id field (16 bits) describes a service_id field related to NRT service showing a content item that the section describes.

An NRT_IT_version_number field (5 bits) is defined as a set in at least one NRT_content_table_section( ) having a common value with respect to service_id, current_next_indicator, protocol_version, and time_span_start fields. It identifies a version number of an NRT-IT instance. The version number is increased by 1 modulo 32 when a field of NRT-IT instance is changed.

A current_next_indicator field (1 bit) represents that a corresponding table section is applicable currently if set with 1.

A protocol_version field (8 bits) is set with 0. A function of protocol_version allows a table type having parameters in the future, which has a different structure than those defined in the current protocol. Currently, only one valid value of protocol_version is 0. A value other than 0 in protocol_version is used for the future version of standard to recognize other tables having different structures.

A time_span_start field (32 bits) represents a start time of an instance period represented in GPS sec from 00:00:00 UTC, Jan. 6, 1980. A time of day of time_span_start is set to 00 min of the time. A value 0 of time_span_start represents a period of an NRT-IT instance starting from a negative past. A value of time_span is identical at each section of multi-sectioned NRT-IT instance. Values of time_span_start and time_span_length are set not to overlap another NRT-IT instance of an IP subnet at a specified period.

A time_span_length field (11 bits) identifies a number of min starting at the time recognized at time_span_start that the instance covers. Once it is set, a value of time_span_length does not change in a value of time_span_start. If a value of time_span_length is 0, an NRT-IT instance covers an entire time starting from time_span_start at the indefinite future. When a value of time_span_start is 0, there is no meaning in time_span_length.

A value of time_span_start is identical at each section of multi-sectioned NRT-IT instance. Values of time_span_start and time_span_length are set not to overlap another NRT-IT instance of an IP subnet at a specified period.

A num_items_in_section field (8 bits) represents the number of content items described in an NRT-IT section.

A content_linkage field (16 bits) represents an identification number within a range from 0x0001 to 0xFFFF. 0x0000 is not used. content_linkage is a linkage function for two: this links at least one file of FLUTE FDT related to NRT service with metadata of NRT-IT and forms TF_id (identifier for Text Fragement in Text FragmentTable). A value of a content_linkage field corresponds to a value of an FDT-Cotent-Linkage element or a value of a File-Content-Linkage element in FLUTE FDT of each file related to a content item. A priority rule is applied when each content linkage value including a corresponding content linkage element in FLUTE FDT is matched.

A TF_available flag (Boolean flag) is set with 1 when Text Fragment exists in a Text Fragment Table of a service signaling channel. If Text Fragment is not included in a service signaling channel for the content item, a value of the TF_available field is set with 0.

If a low_latency flag (Boolean flag) is set with 1, as a user waits, content is valid in a current digital transmission of sufficiently low delay time that collection attempts. If set with 0, a collection delay time becomes longer and a user interface suggests a post view to a user.

A playback_length_in_seconds (20 bits) is an integer representing a playing time of a content in sec. A content including texts and/or still images has a value of 0. In relation to a content including audio or audio/video content, playback_length_in_seconds represents a playing time of audio or audio/video content.

If a content_length_included flag (Boolean flag) is set with 1, a content_length field exists in the repetition in a 'for' loop. If set with 0, it indicates that the content_length field does not exist in the repetition in a 'for' loop.

If a playback_delay_included flag (Boolean flag) is set with 1, it indicates that a playback_delay field exists in the repetition in a 'for' loop. If set with 0, it indicates that the playback_delay field does not exist in the repetition in a 'for' loop.

If an expiration_included flag (Boolean flag) is set with 1, an expiration field exits in the repetition in a 'for' loop. If set with 0, it indicates that the expiration field does not exist in the repetition in a 'for' loop.

A duration (12 bits) field represents an expected cycle time of carousel including a referenced content item in a range of 1 to 2880 in min. A receiver uses a duration parameter determining a time taking for the referenced content capture.

playback_delay (20 bits) is represented with a number of the next sec of the first byte before playing a related content while incoming stream is buffered. A value of 0 represents playing starts immediately. When playback_delay is not set, a receiver collects a complete file or a file before playing.

An expiration field (32 bits) represents expiration time expressed in GPS sec from 00:00:00 UTC, Jan. 6, 1980. After expiration, the content is deleted from the memory. If it is not expired, the receiver uses a method that a company for managing a memory resource selects.

A content_name_length_ field (8 bits) represents the length (byte unit) of content_name_text.

A content_name_text( ) field represents a content item title in a system having a plurality of string structures.

A content_descriptors_length field (12 bits) represents an entire length (byte unit) of content_descriptor providing additional information on a content level.

content_descriptor is a descriptor that is additionally applied to each content item.

descriptor_length (10 bits) represents an entire length (byte unit) of a descriptor.

A descriptor is generally applied to all content items described in the current NRT-IT section.

FIG. 17 is a view illustrating a syntax structure of bit stream for NRT section (NRT_content_table_section) according to an embodiment. Detailed description of each field in the NCT section is as follows.

In FIG. 17, a table_id field (8 bits) as the identifier of a table includes an identifier identifying NCT.

A section_syntax_indicator field (1 bit) is an indicator defining a section format of NCT.

A private_indicator field (1 bit) represents whether NCT follows a private section.

A section_length field (12 bits) represents the section length of NST.

An NRT_channel_id field (16 bits) represents a value uniquely identifying NRT service including content described in NCT.

A version_number field (5 bits) represents the version number of NCT.

A current_next_indicator field (1 bit) represents whether information in a corresponding NCT section is applicable currently or in the future.

A section_number field (8 bits) represents the section number of a current NCT section.

A last_section_number field (8 bits) represents the last_section_number of NCT.

A protocol_version field (8 bits) indicates a protocol version for allowing NCT, which transmits parameters having different structures then those defined in a current protocol. (An 8-bit unsigned integer field whose function is to allow, in the future, this NRT Content Table to carry parameters that may be structured differently than those defined in the current protocol. At present, the value for the protocol_version shall be zero. Non-zero values of protocol_version may be used by a future version of this standard to indicate structurally different tables.)

A num_contents_in_section field (8 bits) indicates the number of contents in the NCT. At this point, the number of contents represents the number of contents transmitted through a virtual channel that source_id specifies.

Later, a 'for' loop (or a content loop) is performed as many as the number of contents corresponding to the num_contents_in_section field value, to provide the detailed information of a corresponding content by each content.

A content_version field (32 bits) indicates the version number for content (or a file) having a specific content_id value. That is, let's assume that if content_id of a content that a receiver receives previously is 0x0010, the same content, i.e., its content_id value is 0x0010 is transmitted. At this point, if the content_version field value is different, the previously stored content is updated or replaced by receiving the newly announced content through the NCT. In this embodiment, the content_version field value means a series number representing a release version but may actually represent published (released) time directly. At this point, if the content_version field is difficult to represent publish time, a new field may be used to represent the published (released) time.

A content_id field (16 bits) indicates an identifier uniquely identifying the content (or file).

A content_available_start_time field (32 bits) and a content_available_end_time field (32 bits) represent a start time and end time of a FLUTE session transmitting the content.

An ETM_location field (2 bits) describes the existence and location of an extended text message (ETM).

A content_length_in_seconds field (30 bits) represents an actual play time of a corresponding content in sec unit when the content (or file) is an A/V file.

A content_size field (48 bits) represents the size of the content (or file) in byte unit.

A content_delivery_bit_rate field (32 bits) represents a bit rate at which the content (or file) is transmitted, and means a target bit rate. That is, when a service provider or broadcasting station transmits a corresponding content, the content_delivery_bit_rate field displays how wide a bandwidth is to be allocated. Accordingly, if a receiver uses content_size and content_delivery_bit_rate, the minimum time for receiving a corresponding content (or file) is obtained. That is, the time for receiving content is estimated and provided to a user. Also, the minimum receiving time is obtained by calculating (content_size*8)/(content_delivery_bit_rate) and its unit is in sec.

A content_title_length field (8 bits) represents the length of content_title_text( ) in byte unit. If this field is used, the receiver knows how many bytes need to be read to obtain content_title_text( ) information.

A content_title_text( ) field represents a content title in the format of a multiple string structure.

That is, the receiver uses the NCT to obtain configuration information on NRT content/file, and provides a guide for the NRT/file on the basis of the obtained configuration information on NRT content/file. Moreover, the receiver obtains access information of FLUTE session, which transmits the content/file selected by the guide, from NST, and receives the selected content by using the obtained FLUTE session access information.

Moreover, the present invention may include container information, encoding information, and decoding parameters of media objects, necessary for rendering of the content/files constituting NRT service, in the NCT, and then transmit it. Accordingly, a receiving system extracts the container information, the encoding information, and the decoding parameters of media objects by each content, necessary for rendering of the corresponding content/files, and uses them in rendering.

FIG. 18 is a view illustrating a bit stream syntax structure of an SMT session providing signaling information on NRT service data according to an embodiment.

Here, the corresponding syntax is created in an MPEG-2 private section format to help understanding, but the format of the corresponding data may vary.

The SMT describes signaling information (or signaling information of NRT service) and IP access information of a mobile service in Ensemble in which SMT is transmitted. The SMT uses Transport_Stream_ID, i.e., an identifier of broadcast stream including each service, and provides broadcasting stream information of a corresponding service. Furthermore, SMT includes description information of each mobile service (or NRT service) in one Ensemble, and includes other additional information in a descriptor area.

As mentioned above, the SMT session may be included as the IP stream format in the RS frame, and then, transmitted. In this case, RS frame decoders of a receiver describe later decode inputted RS frames, and outputs the decoded RS frames as a corresponding RS frame handler. Moreover, each RS frame handler divides the inputted RS frame by a row unit to constitute M/H TP, and outputs it as an M/H TP handler.

In addition, examples of fields transmitted through SMT are as follows.

A table_id field (8 bits) is a field indicating a table type, and through this, it is confirmed that this table section is a table section in SMT. (table_id: An 8-bit unsigned integer number that indicates the type of table section being defined in Service Map Table (SMT)).

A section_syntax_indicator field (1 bit) is an indicator defining a session format of SMT, and its session format may be a short-form syntax ('0') of MPEG (section_syntax_indicator: This 1-bit field shall be set to '0' to always indicate that this table is derived from the "short" form of the MPEG-2 private section table).

A private_indicator field (1 bit) indicates whether SMT follows a private section (private_indicator: This 1-bit field shall be set to '1').

A section_length field (12 bits) represents the remaining session length of SMT after a corresponding field (section_length: A 12-bit field. It specifies the number of remaining bytes this table section immediately following this field. The value in this field shall not exceed 4093 (0xFFD)).

A table_id_extension field (16 bits) is dependent on a table, and may be a logical part of a table_id field providing a range of the remaining fields (table_id_extension: This is a 16-bit field and is table-dependent. It shall be considered to be logically part of the table_id field providing the scope for the remaining fields).

Here, a table_id_extension field includes an SMT_protocol_version field.

The SMT_protocol_version field (8 bits) shows a protocol version that allows SMT transmitting parameters having a different structure than those defined in a current protocol (SMT_protocol_version: An 8-bit unsigned integer field whose function is to allow, in the future, this SMT to carry parameters that may be structured differently than those defined in the current protocol. At present, the value for the SMT_protocol_version shall be zero. Non-zero values of SMT_protocol_version may be used by a future version of this standard to indicate structurally different tables).

An ensemble_id field (8 bits) includes values of '0x00' to '0x3F', as an ID value related to corresponding Ensemble (ensemble_id: This 8-bit unsigned integer field in the range 0x00 to 0x3F shall be the Ensemble ID associated with this Ensemble. The value of this field shall be derived from the parade_id carried from the baseband processor of physical layer subsystem, by using the parade_id of the associated Parade for the least significant 7 bits, and using '0' for the most significant bit when the Ensemble is carried over the Primary RS frame, and using '1' for the most significant bit when the Ensemble is carried over the Secondary RS frame).

A version_number field (5 bits) represents the version number of SMT. A current_next_indicator field (1 bit) indicates whether a transmitted SMT table session is applicable currently (current_next_indicator: A one-bit indicator, which when set to '1' shall indicate that the Service Map Table sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field (8 bits) represents a current SMT session number (section_number: This 8-bit field shall give the section number of this NRT Service Signaling table section. The section_number of the first section in an NRT Service Signaling table shall be 0x00. The section_number shall be incremented by 1 with each additional section in the NRT Service Signaling table).

A last_section_number field (8 bits) represents the last session number constituting an SMT table.

(last_section_number: This 8-bit field shall give the number of the last section (i.e., the section with the highest section_number) of the Service Signaling table of which this section is a part).

A num_services field (8 bits) indicates the number of services in an SMT session. (num_services: This 8 bit field specifies the number of services in this SMT section.). At least one mobile service, at least one NRT service, or mobile and NRT services may be received through Ensemble having the SMT. If only NRT services are transmitted through the Ensemble having SMT, it may indicate the number of NRT services in the SMT.

Later, a 'for' loop (or a service loop) is performed as many times as the number of services corresponding to the num_service field value, to provide signaling information on a plurality of services. That is, signaling information of a corresponding service is displayed by each service in the SMT session. Here, the service may be mobile or NRT service. At this point, the following field information may be provided to each service.

A service_id field (16 bits) represents a value uniquely identifying a corresponding service (A 16-bit unsigned integer number that shall uniquely identify this service within the scope of this SMT section.). The service_id of a service shall not change throughout the life of the service.

To avoid confusion, it is recommended that if a service is terminated, then the service_id for the service should not be used for another service until after a suitable interval of time has elapsed. Here, if the service is NRT service, the service_id may identify the NRT service.

A Multi_ensemble_service field (2 bits) identifies whether a corresponding service is transmitted through at least one Ensemble.

Additionally, the corresponding field identifies whether service is rendered as a portion of the service transmitted through a corresponding Ensemble. That is, if the service is NRT service, the filed identifies whether NRT service is transmitted through at least one Ensemble (multi_ensemble_service: A two-bit enumerated field that shall identify whether the Service is carried across more than one Ensemble. Also, this field shall identify whether or not the Service can be rendered only with the portion of Service carried through this Ensemble.).

A service_status field (2 bits) identifies a state of a corresponding service. Here, MSB indicates whether a corresponding service is active (1) or inactive (0), and LSB indicates whether a corresponding service is hidden (1) or not (0). Here, when the service is NRT service, MSB of the service_status field indicates whether a corresponding NRT service is active (1) or inactive (0), and LSB indicates whether a corresponding NRT service is hidden (1) or not (0).

A SP_indicator field (1 bit) represents whether service protection of a corresponding service is set. If a SP_indicator field value is 1, service protection is applied to components required for providing meaningful presentation of a corresponding service.

A short_service_name_length field (3 bits) represents the length of a short service name in a short_service_name field in byte unit.

A short_service_name field represents a short name of a corresponding service (short_service_name: The short name of the Service, each character of which shall be encoded per UTF-8 [29]. When there is an odd number of bytes in the short name, the second byte of the last of the byte pair per the pair count indicated by the short_service_name_length field shall contain 0x00). For example, if the service is mobile service, a short name of the mobile service is displayed, and if it is NRT service, a short name of the NRT service is displayed.

A service_category field (6 bits) identifies a type category of a corresponding service. If a value of a corresponding field is set with a value indicating "informative only", it is dealt as an informative description for the category of the service. And, a receiver is required to test a component_level_descriptors( ) field of SMT in order to identify an actual category of the received service. The service_category field has an NTP time based component for services having video and/or audio component.

Especially, in regards to the present invention, if a service_category field value has '0x0E', a corresponding service indicates NRT service. In this case, it is indicated that signaling information of service currently described in an SMT session is signaling information of NRT service.

A num_services field (5 bits) indicates the number of IP stream components in this service.

IP_version_flag field (1 bit), when set to '0', shall indicate that source_IP_address, service_destination_IP_address, and component_destination_IP_address fields are IPv4 addresses. The value of '1' for this field is reserved for possible future indication that source_IP_address, service_destination_IP_address, and component_destination_IP_address fields are for IPv6. Use of IPv6 addressing is not currently defined.

A source_IP_address_flag field (1 bit) shall indicate, when set, that a source IP address value for this Service is present to indicate a source specific multicast.

When a service_destination_IP_address_flag field (1 bit) is set, it indicates that a corresponding IP stream component is transmitted through IP datagram having a different target IP address than service_destination_IP_address.

Accordingly, if the flat is set, a receiving system uses component_destination_IP_address as destination_IP_address, and disregards a service_destination_IP_address field in a num_channels loop (service_destination_IP_address_flag: A 1-bit Boolean flag that indicates, when set to '1', that a service_destination_IP_address value is present, to serve as the default IP address for the components of this Service).

In relation to the source_IP_address field (32 or 128 bits), if source_IP_address_flag is set with 1, interpretation is required, but if not set with 0, no interpretation is required.

When the source_IP_address_flag field is set with '1' and the IP_version_flag field is set with '0', this field indicates a 32 but IPv4 address representing a source of a corresponding circuit channel. If the IP_version_flag field is set with '1', this field indicates a 32 bit IPv6 address representing a source of a corresponding virtual channel (source_IP_address: This field shall be present if the source_IP_address_flag is set to '1' and shall not be present if the source_IP_address_flag is set to '0'. If present, this field shall contain the source IP address of all the IP datagram carrying the components of this Service. The conditional use of the 128 bit-long address version of this field is to facilitate possible use of IPv6 in the future, although use of IPv6 is not currently defined).

If the service is NRT service, the Source_IP_address field becomes a source IP address of the same server transmitting all channels of the FLUTE session.

In relation to the service_destination_IP_address field (32 or 128 bits), if service_destination_IP_address_flag is set with 1, interpretation is required, but if set with 0, no interpretation is required. When the service_destination_IP_address_flag field is set with '1' and the IP_version_flag field is set with '0', this field indicates a 32 bit destination IPv4 address for a corresponding virtual channel.

When the service_destination_IP_address_flag field is set with '1' and the IP_version_flag field is set with '1', this field indicates a 64 bit destination IPv6 address for a corresponding virtual channel. If the corresponding service_destination_IP_address cannot be interpreted, a component_destination_IP_address field in a num_components loop needs to be interpreted, and a receiving system uses component_destination_IP_address to access an IP stream component (service_destination_IP_address: This field shall be present if the service_destination_IP_address_flag is set to '1' and shall not be present if the service_destination_IP_address_flag is set to '0'. If this service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined). If the service is NRT service, the service_destination_IP_Address field is signaled with a destination IP address of a session level of the FLUTE session.

Additionally, SMT provides information on a plurality of components by using a 'for' loop.

Later, a 'for' loop (or a component loop) is performed as many times as the number of components corresponding to the num_components field value, to provide access information on a plurality of components. That is, access information on each component in a corresponding service is provided. At this point, the following field information on each component may be provided. Here, one component corresponds to one FLUTE session according to an embodiment.

An essential_component_indicator field (1 bit), when set to '1', shall indicate that this component is an essential component for the service. Otherwise, this field indicates that this component is an optional component).

A component_destination_IP_address_flag field (1 bit) shall indicate, when set to '1', that the component_destination_IP_address is present for this component.

A port_num_count field (6 bits) shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_destination_UPD_port_num field and shall be incremented by two, to allow for the RTCP streams associated with the RTP streams.

A component_destination_UDP_port_num (16 bits) represents the destination UDP port number for this UDP/IP stream component. For RTP streams, the value of component_destination_UDP_port_num shall be even, and the next higher value shall represent the destination UDP port number of the associated RTCP stream).

A component_destination_IP_address field (32 or 128 bits) shall be present if the component_destination_IP_address_flag is set to '1' and shall not be present if the component_destination_IP_address_flag is set to '0'. When this field is present, the destination address of the IP datagram carrying this component of the M/H Service shall match the address in this field. When this field is not present, the destination address of the IP datagram carrying this component shall match the address in the M/H_service_destination_IP_address field. The conditional use of the 128 bit-long address version of this field is to facilitate possible use of IPv6 in the future, although use of IPv6 is not currently defined.

A num_component_level_descriptors field (4 bits) indicates the number of descriptors providing additional information on a component level.

component_level_descriptor( ) fields are included in the component loop as many as a number corresponding to the num_component_level_descriptors field value, so that additional information on the component is provided.

A num_service_level_descriptors field (4 bits) indicates the number of descriptors providing additional information on a corresponding service level.

service_level_descriptor( ) fields are included in the service loop as many as a number corresponding to the num_service_level_descriptors field value, so that additional information on the service is provided. If the service is mobile service, additional information on the mobile service is provided, and if it is NRT service, additional information on the NRT service is provided.

A num_ensemble_level_descriptors field (4 bits) indicates the number of descriptors providing additional information on an ensemble level.

ensemble_level_descriptor( ) fields are included in the ensemble loop as many as a number corresponding to the num_ensemble_level_descriptors field value, so that additional information on the ensemble is provided.

Moreover, component_descriptor( ) as component_level_descriptors( ) may be provided to SMT of FIG. 18.

The component_descriptor( ) is used as one of component_level_descriptors( ) of SMT, and describes additional signaling information of a corresponding component.

Accordingly, in relation to mobile NRT service, signaling information necessary for receiving a corresponding FLUTE session may be provided using the component descriptor of FIG. 14.

For example, if a component_type field value of the component descriptor of FIG. 14 is 38, a component_data (component_type) field provides data for FLUTE file delivery as shown in FIG. 15. Since each field description of FIGS. 14 and 15 is made above, overlapping descriptions will be omitted.

FIG. 19 is a view illustrating an FDT schema for mapping a file and content_id according to an embodiment. FIG. 20 is a view illustrating an FDT schema for mapping a file and content_id according to another embodiment. They represent an FDT instant level entry file designating method. NRT content includes a plurality of files. However, since each file has no mark, it is difficult to search a file related to NRT content. Accordingly, as shown in FIGS. 19 and 20, content_id is inserted into FDT in each file.

Hereinafter, an FDT instance level means, if a common attribute of all files declared in FDT needs to be defined, a level including a definition portion for the common attribute. An FDT file level may mean a level including definition for an individual attribute of each file.

A receiver identifies whether a service transmitted through a corresponding channel is an SMT based NRT service. Additionally, the receiver identifies a content item and file of the corresponding NRT service.

As mentioned above, although the receiver may identify a file and content item in the NRT service, it does not have information on files of the content item and thus cannot match them. Accordingly, the receiver may not process the NRT service.

Accordingly, the present invention provides a method of identifying whether a content item is related. That is, a corresponding method shows what kinds of files are included in a content item. In this case, the receiver may properly process the received NRT service. Accordingly, the corresponding method may be designated on the basis of FDT information in FLUTE session transmitting NRT service. For example, each file constituting a content item is identified on the basis of a content-location and TOI field designated in the FLUTE session. content_id in FDT is matched to a content identifier (content_id) of NCT or a content identifier of content fragment in OMB BCAST SG.

Referring to FIGS. 19 and 20, a portion indicated with 1 declares a content identifier in an FDT-Instance level, and this declared content identifier is assigned to all files declared in a corresponding FDT-Instance. Of course, this information may be overridden by assigning a new content identifier in a file level. Or, if a specific file belongs to another content item not a content item defined in the FDT-Instance level, this may be notified through assigning a file level content_id described below. This embodiment expresses content_id in 16 bits.

In relation to a portion indicated with 2, when a file in the FDT Instance is included different content items with content_id declaration in a file level, this method signals which file, all files of a content item and content, belongs to which entry.

A portion 3 is a method of notifying whether a corresponding file for each file is an entry file. That is, a file corresponding to a root file, which is played first among several files constituting a content item or is necessarily executed first to access a content item is called an entry file, and represents a method of notifying this information. An entry attribute may be omitted, and its default value is false. When it is omitted, it means that a corresponding file is not an entry file. "Entry" is a head of a file that needs to be processed to execute the file. For example, "index.html" may be an "entry". Accordingly, an entry file may be set with "true" and other files are set with "false". Through the entry file, transmitting the same file repeatedly may be effectively controlled. Once a file is downloaded, the entry file indicates a file of content for another reference, so that there is no need to download it in another or an additional instance.

A specific file functions as an entry in a specific group as a group related to a file level signals whether entry is possible, but its corresponding role may fail in another group. When a content identifier is assigned in an FDT-instance level, a method of notifying an entry file may be considered as the following two methods.

1) A method of additionally assigning a file level content identifier to a file corresponding to an entry file and setting its entry attribute with true: in this case, a content identifier is duplicated in an FDT-Instance level and a file level, but has the most flexible structure. That is, although one of the File-level and FDT-instance level may designate content_id, if another content_id is designated together in the File-level and FDT-instance, the content_id of the File level has priority to that of the FDT-instance level.

2) like another embodiment of the FDT schema of FIG. 20, files functioning as an entry file may be directly referenced in content identifier definition in the FDT-instance level. For this, according to the embodiment of FIG. 20, FDT-Content-ID-Type is additionally defined for an FDT-instance level content identifier, and as shown in the portion 2, extends to include a content location of an entry file. In the case of the portion 2, an entry level is defined with its content_id. For example, each content_id shows which entry file exists.

In this method, content-location is duplicated so signaling may be problematic, but entry file configuration information may be immediately obtained by each content item.

Figure 21:
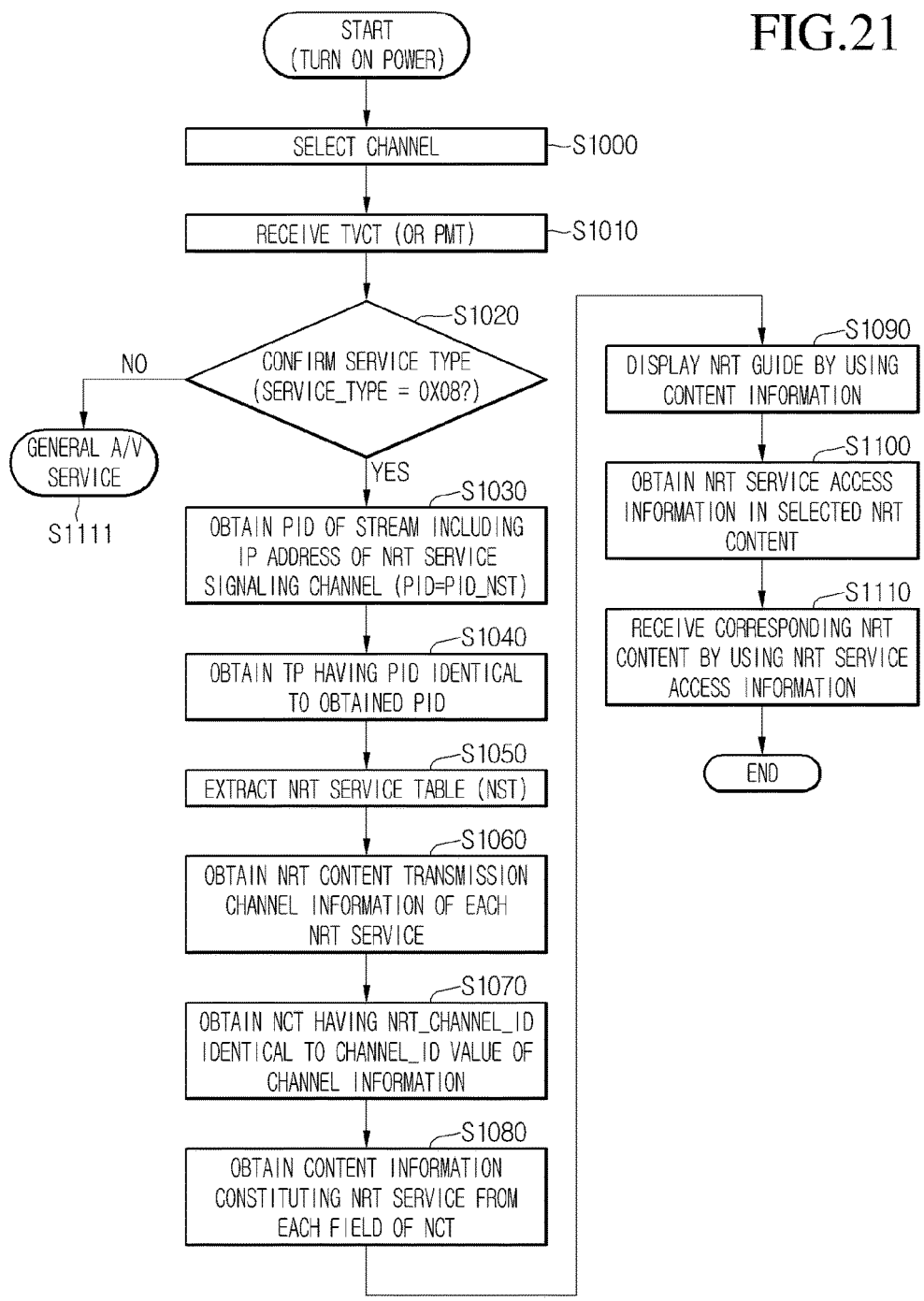
FIG. 21 is a flowchart illustrating an operation of a receiver according to an embodiment.

FIG. 21 is a flowchart illustrating an operation of a receiver according to an embodiment.

Referring to FIG. 21, according to an embodiment, a receiver receives NRT service signaling data through an NRT service signaling channel, displays NRT guide information on the basis of the received NRT service signaling data, and receives NRT service data for the selected NRT content, in order to provide NRT service.

First, once the receiver is turned on, a user selects a channel in operation S1000. Then, a physical transmission channel is turned according to the selected channel.

Then, VCT and PMT are obtained from a broadcast signal received through the tuned physical transmission channel in operation S1010. Then, it is confirmed in operation S1020 whether there is NRT service by parsing the obtained TVCT (VCT). This is confirmed by checking the service_type field value in a virtual loop of the VCT. For example, if a service_type field has 0x08, there is NRT service. Moreover, if not 0x08, since a corresponding virtual channel does not transmit the NRT service, a proper operation such as general A/V service may be performed according to information in the virtual channel in operation S1111.

Moreover, if it is determined that there is NRT service, since a corresponding virtual channel transmits NRT service, PID(PID=PID_NST) matching to a specific PID (PID_NST) of stream including a well known IP address for NRT service signaling channel address is obtained in operation S1030.

Moreover, the receiver receives a Transport Packet (TP) having the same PID as the obtained PID value (PID_NST) in operation S1040.

Then, the receiver extracts NRT service signaling data including a NRT service table (NST) from the received TP, or extracts an IP address for the NRT service signaling channel access from the received TP, in order to receive NRT service signaling data transmitted in another format through an IP layer in operation S1050.

Then, the receiver obtains channel information on NRT service data transmission by each NRT service from NST in operation S1060.

Then, the receiver obtains an NRT content table (NCT) including an NRT_channel_id field value identical to a value of Channel_id, an identifier of the obtained channel information, from the NRT service signaling data in operation S1070.

Then, the receiver obtains content information on NRT content constituting each NRT service from each field of the obtained NCT in operation S1080. For example, the content information may include at least one of content_delivery_bit_rate, content_available_start_time, content_available_end_time and content_title_text( ) fields according to an embodiment of the NCT.

Then, the receiver displays NRT guide information by using content information in operation S1090. A user may select NRT content to use or be received, from the displayed NRT guide information.

Then, the receiver obtains NRT service access information having the selected NRT content from NST in operation S1100. The NRT service access information may include channel information or IP address information for receiving NRT service data, for example.

Moreover, the receiver receives a corresponding NRT content in operation S1110 by using the obtained NRT service access information after accessing a channel or server for transmitting NRT service, and performs a proper operation according to the NRT content.

Figure 22:
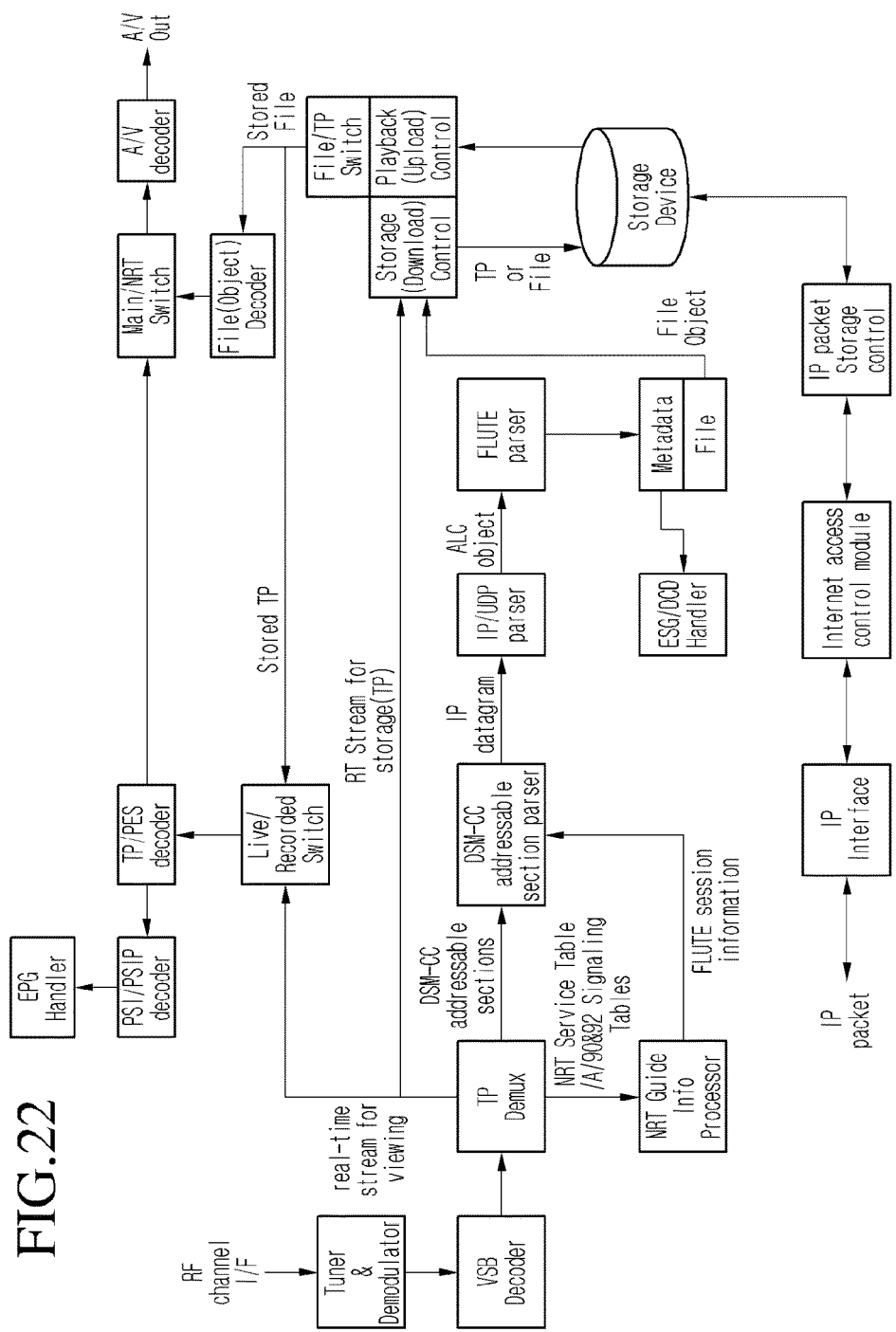
FIGS. 22 and 23 are views illustrating a receiving system receiving, storing, and playing an NRT content for NRT service according to another embodiment.
Figure 23:
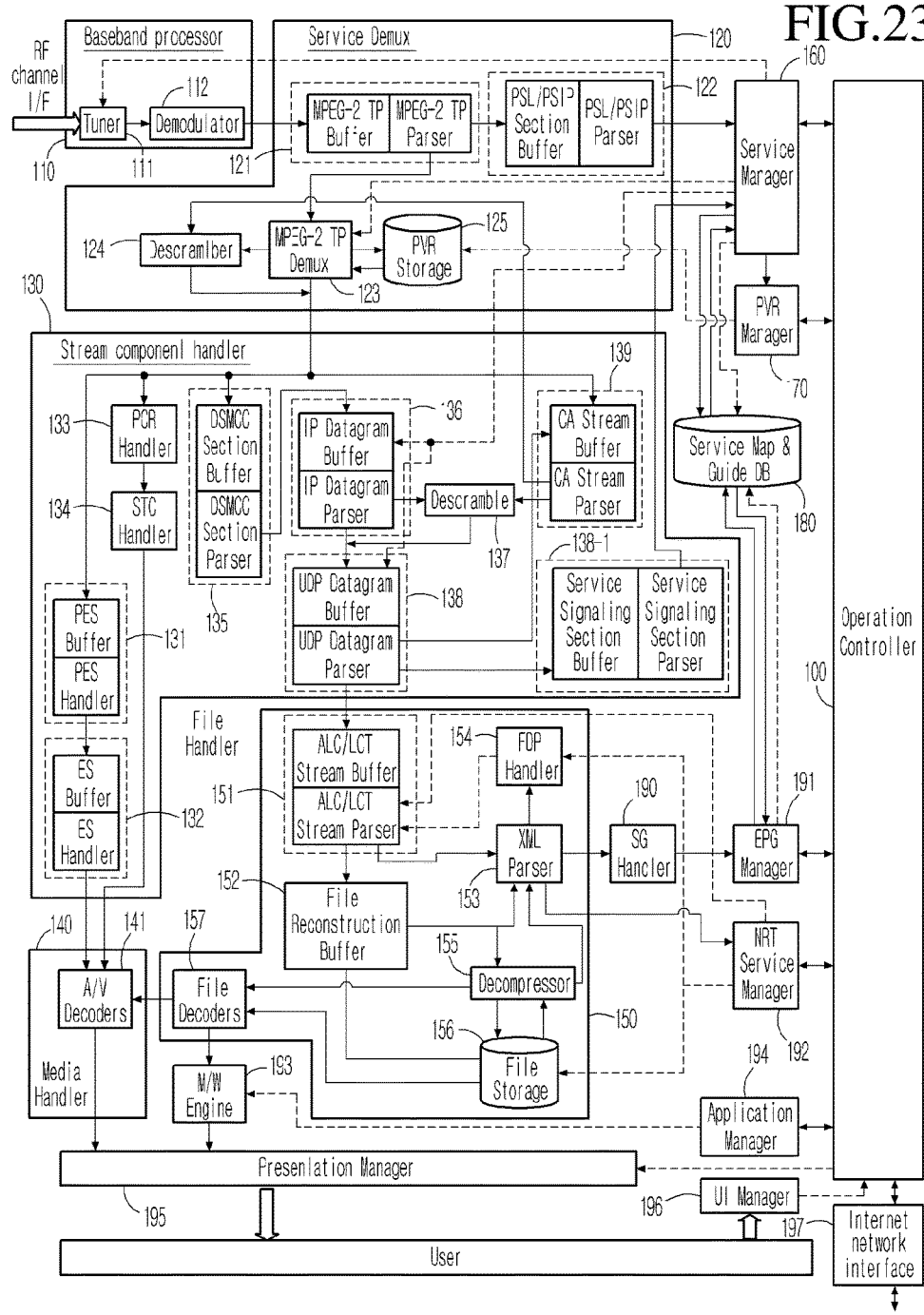

FIGS. 22 and 23 are views illustrating a receiving system receiving, storing, and playing an NRT content for NRT service according to another embodiment.

The receiver of FIG. 23 may include an operation controlling unit 100, a baseband processing unit 110, a service demultiplexer 120, a stream component handler 130, a media handler 140, a file handler 150, a service manager 160, a PVR manager 170, a first storage unit 180, an SG handler 190, an EPG manager 191, an NRT service manager 192, an application manager 194, a middleware engine 193, a presentation manager 195, and a User Interface (UI) manager 196.

The baseband processing unit 110 may include a tuner 111 and a demodulator. The service demultiplexer 120 may include an MPEG-2 TP handler 121, a PSI/PSIP handler 122, an MPEG-2 TP demultiplexer 123, a descrambler 124, and a second storage unit 125.

The stream component handler 130 may include a Packetized Elementary Stream (PES) demodulator 131, an Elementary Stream (ES) demodulator 132, a PCR handler 133, a STC handler 134, a DSM-CC addressable section handler 135, an IP datagram handler 136, a descrambler 137, a UDP handler 138, a service signaling section handler 138-1, and a Conditional Access System (CAS) 139.

The media handler 140 may include an A/V demodulator 141. The file handler 150 may include an ALC/LCT stream handler 151, a file reconstruction buffer 152, an XML parser 153, an FDT handler 154, a decompressor 155, a third storage unit 156, and a file decoder 157.

In FIG. 23, the tuner 111 tunes a broadcast signal of a desired channel among broadcast signals received through a terrestrial wave according to a control of the service manager 160, and then down-converts the tuned broadcast signal into an Intermediate Frequency (IF) signal to output it to the demodulator 112. The tuner 111 may receive real-time stream and non-real-time stream. The non-real-time stream is called an NRT stream in the present invention.

The demodulator 112 performs automatic gain control, carrier recovery, and timing recovery on a digital IF signal of a pass band inputted from the tuner 111, converts the digital IF signal into a baseband signal, and performs channel equalization. For example, when the broadcast signal is a VSB modulation signal, a VSB demodulation process is performed for automatic gain control, carrier recovery, and timing recovery.

The demodulated and channel-equalized data in the demodulator 112 is outputted to the MPEG-2 TP handler 121 in an MPEG-2 Transport Stream (TS) packet format.

The MPEG-2 TP handler 121 includes an MPEG-2 TP buffer and an MPEG-2 TP parser, and analyzes a TS header after temporarily storing an output of the demodulator 112. Then, if an output of the demodulator 112 is an A/V TS packet for real time or an NRT TS packet, it is outputted to the demultiplexer 123, and if it is a TS packet for PSI/PSIP table, it is outputted to the PSI/PSIP handler 122.

The PSI/PSIP handler 122 includes a PSI/PSIP section buffer and a PSI/PSIP parser, and after temporarily storing a TS packet outputted from the MPEG-2 TP handler 121, restores and parses a corresponding table from PSI/PSIP section data in a payload of the TS packet, with reference to a table identifier. At this point, it is determined whether one table includes one section or a plurality of sections through a table_id field, a section_number field, and a last_section_number field in a corresponding section. Also, sections having the same table identifier are collected to complete a corresponding table. For example, sections having a table identifier allocated to VCT are collected to complete VCT. Moreover, the parsed information of each table is collected by the service manager 160 to be stored in the first storage unit 180. Table information such as VCT, PAT, PMT, and DST are stored in the first storage unit through the above processes. The service manager 160 stores the table information in the first storage unit 180 in a service map and guide data format.

The demultiplexer 123, if the inputted TS packet is an A/V TS packet in real time, divides the TS packet into an audio TS packet and a video TS packet, and then outputs them into the PES decoder 131. If the inputted TS packet is an NRT TS packet, it is outputted to the DSM-CC handler 135. Additionally, the demultiplexer 123, if the TS packet includes a Program Clock Reference (PCR), outputs it to the PCR handler 133, and if it includes Conditional Access (CA) information, outputs it to the CAS 139. An NRT TS packet includes a TS packet having NRT service data and a TS packet having NRT service signaling channel. A unique PID for identifying the NRT service is allocated to a TS packet of the NRT service data, and PID of a TS packet including the NRT service signaling channel is extracted using DST and PMT.

The demultiplexer 123, if a payload of the inputted TS packet is scrambled, outputs it to the descrambler 124, and then, the descrambler 124 receives information (control words used for scramble) necessary for descramble from the CAS 139, and performs descramble on the TS packet.

The demultiplexer 123 stores an A/V packet in real time, inputted at the one request of temporary recording, scheduled recording, and time shift, in the second storage unit 125. The second storage unit 125 is a mass storage medium and may include HDD, for example. The second storage unit 125 performs downloading (i.e., storing) and updating (i.e., playing) according to a control of the PVR manager 170.

The demultiplexer 123 separates an audio TS packet and a video TS packet from the A/V TS packet updated from the second storage unit and then outputs them to the PES decoder 131 at the playing request.

The demultiplexer 123 is controlled by the service manager 160 and/or the PVR manager 170 to perform the above processes.

That is, if a service_type field value in VCT indicates that NRT service is transmitted, the service manger 160 extracts identification information of each NRT service from NRT_service_descriptor( ) received from a virtual channel loop of the VCT and stores it, and then extracts DST PID from a service location descriptor (or an ES loop of PMT) of the VCT to receive DST.

Then, NRT service is identified from the received DST, and PID of an MPEG-2 TS packet including the NRT service signaling channel is extracted to receive the identified NRT service by using DST and PMT. The extracted PID is outputted to the demultiplexer 123. The demultiplexer 123 outputs MPEG-2 TS packets corresponding to PID, outputted from the service manager 160, to the addressable section handler 135.

The PCR is a time reference value used for time synchronization of audio ES and video ES in the A/V decoder 141. The PCR handler 133 restores PCR in the payload of the inputted TS packet and outputs it to the STC handler 134. The STC handler 134 restores System Time Clock (STC), i.e., a reference clock of a system, from the PCR, and outputs it to the A/V decoder 141.

The PES decoder 131 includes a PES buffer and a PES handler, and after temporarily storing an audio TS packet and a video TS packet, removes a TS header from the TS packet to restore audio PES and video PES. The restored audio PES and video PES are outputted to the ES decoder 132. The ES decoder 132 includes an ES buffer and an ES handler, and removes each PES header from audio PES and video PES to restore audio ES and video ES, i.e., pure data. The restored audio ES and video ES are outputted to the A/V decoder 141.

The A/V decoder 141 decodes the audio ES and video ES through each decoding algorithm to restore a previous state of compression, and then outputs it to the presentation manager 195. At this point, time synchronization is performed when audio ES and video ES are decoded according to the STC. As one example, an audio decoding algorithm includes at least one an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm. A video decoding algorithm includes at least one of an MPEG 2 video decoding algorithm, an MPEG 4 video decoding algorithm, an H.264 decoding algorithm, an SVC decoding algorithm, and a VC-1 decoding algorithm.

The CAS 139 includes a CA stream buffer and a CA stream handler, and after temporarily storing a TS packet outputted from the MPEG-2 TP handler or service protection data restored and outputted from a UDP datagram handler 138, restores information (for example, control words used for scramble) necessary for descramble from the stored TS packet or service protection data. That is, Entitlement Management Message (EMM) and Entitlement Control Message (ECM) in the payload of the TS packet are extracted and information necessary for descramble is obtained by analyzing the extracted EMM and ECM. The ECM may include a control word (CW) used in scramble. At this point, the control word may be encrypted using an encryption key. The EMM may include an encryption key and qualification information of corresponding data. Information necessary for descramble obtained from the CAS 139 is outputted to the descrambler 124 and 137.

The DSM-CC section handler 135 includes a DSM-CC section buffer and a DSM-CC section parser, and after temporarily storing a TS packet outputted from the demultiplexer 123, restores an addressable section in the payload of the TS packet. After restoring IP datagram by removing a header and CRC checksum of the addressable section, the restored IP datagram is outputted to the IP datagram handler 136.

The IP datagram handler 136 includes an IP datagram buffer and an IP datagram parser. After buffering IP datagram delivered from the DSM-CC section handler 135, the IP datagram handler 136 extracts and analyzes a header of the buffered IP datagram to restore UDP datagram from the payload of the IP datagram, and then, outputs it to the UDP datagram handler 138.

At this point, if the IP datagram is scrambled, the scrambled UDP datagram is descrambled in the descrambler 137 and then is outputted to the UDP datagram handler 138. As one example, the descrambler 137 receives information (e.g., a control word used for scramble) necessary for descramble from the CAS 138 and performs descramble on the UDP datagram to output it to the UDP datagram handler 138.

The UDP datagram handler 138 includes an UDP datagram buffer and a UDP datagram parser. After buffering IP datagram delivered from the IP datagram handler 136 or the descrambler 137, the UDP datagram handler 138 extracts and analyzes a header of the buffered UDP datagram to restore the data included in the payload of the UDP datagram. At this point, if the restored data is service protection data, it is outputted to the CAS 139; if the restored data is NRT service signaling data, it is outputted to the service signaling section handler 138-1; and if the restored data is NRT service data, it is outputted to the ALC/LCT stream handler 151.

That is, access information on the IP datagram transmitting the NRT service signaling channel is a well-known destination IP address and a well-known destination UDP port number.

Accordingly, the IP datagram handler 136 and the UDP datagram handler 138 include a well-known destination IP multicast address and a well-known destination UDP port number, and extracts an IP multicast stream transmitting an NRT service signaling channel, i.e., NRT service signaling data, to output it to the service signaling section handler 138-1.

Moreover, the service signaling section handler 138-1 includes a service signaling section buffer and a service signaling section parser, and restores and parses NST from the NRT service signaling data to output it to the service manager 160. When the NST is parsed, access information of the FLUTE session that transmits content/files constituting NRT service and signaling information necessary for rendering the NRT service may be extracted. For example, information necessary for rendering content/files of the NRT service, transmitted from the NST to each FLUTE session, may be extracted. Information necessary for rendering the content/files of the NRT service may include container information, encoding information, or decoding parameters of a media object.

The parsed information from the NST is collected by the service manager 160, and then, stored in the first storage unit 180. The service manager 160 stores the extracted information from the NST in the first storage unit 180 in a service map and guide data format. As another example, the NRT service manager 182 may serve as the service manager 160. That is, the parsed information from the NST is collected by the NRT service manager 192, and then, stored in the first storage unit 180.

The ALC/LCT stream hander 151 includes an ALC/LCT stream buffer and an ALC/LCT stream parser, and after buffering data having an ALC/LCT structure outputted from the UDP datagram handler 138, analyzes a header and header extension of an ALC/LCT session from the buffer data. On the basis of the analysis result of the header and header extension of the ALC/LCT session, if data transmitted to the ALC/LCT session has an XML structure, it is outputted to the XML parser 153. If the data has a file structure, after being temporarily stored in the file reconstruction buffer 152, it is outputted to the file decoder 157 or stored in the third storage unit 156. The ALC/LCT stream handler 151 is controlled by the NRT service manager 192 if data transmitted to the ALC/LCT session is data for NRT service. At this point, if data transmitted to the ALC/LCT session is compressed, after decompressed in the decompressor 155, it is outputted to at least one of the XML parser 153, the file decoder 157, and the third storage unit 156.

The XML parser 153 analyzes XML data transmitted through the ALC/LCT session, and if the analyzed data is for a file based service, it is outputted to the FDT handler 154. If the analyzed data is for service guide, it is outputted to the SG handler 190.

The FDT handler 154 analyzes and processes a file description table of the FLUTE protocol through an ALC/LCT session. The FDT handler 154 is controlled by the NRT service manager 192 if the received file is for NRT service.

The SG handler 190 collects and analyzes data for service guide transmitted in the XML structure and then output it to the EPG manager 191.

The file decoder 157 decodes a file outputted from the file reconstruction buffer 152, a file outputted from the decompressor 155, or a file uploaded from the third storage unit 156 through a predetermined algorithm, thereby outputting it to the middleware engine 193 or the A/V decoder 141.

The middleware engine 193 interprets and executes data having a file structure, i.e., application. Moreover, the application may be outputted to a screen or speaker through the presentation manager 195. The middleware engine 193 is a JAVA based middleware engine according to an embodiment.

The EPG manager 191 receives service guide data from the SG handler 190 according to a user input, and then, converts the received service guide data into a display format to output it to the presentation manager 195. The application manager 194 performs general managements on processing application data received in the format such as a file.

The service manager 160 collects and analyzes PSI/PSIP table data or NRT service signaling data transmitted to an NRT service signaling channel to create a service map, and then stores it in the first storage unit 125. Additionally, the service manager 160 controls access information on NRT service that a user wants, and also controls the tuner 111, the demodulator 112, and the IP datagram handler 136.

The operation controller 100 controls at least one of the service manager 160, the PVR manger 170, the EPG manager 191, the NRT service manager 192, the application manager 194, and the presentation manager 195 according to a user command, and thus, performs a function that a user wants.

The NRT service manager 192 performs general management on NRT service transmitted in a content/file format through the FLUTE session on an IP layer.

The UI manager 196 delivers a user input to the operation controller 100 through UI.

The presentation manager 195 provides to a user through at least one of a speaker and a screen at least one of audio/video data outputted from the A/V decoder 141, file data outputted from the middleware engine 193, and service guide data outputted from the EPG manager 191.

Moreover, one of the service signaling section handler 138-1, the service manager 160, and the NRT service manager 192 obtains content constituting the NRT service or IP access information on the FLUTE session transmitting a file, from a FLUTE session loop of NST (or an a component loop of NST). Additionally, the one obtains FLUTE level access information from component_descriptor( ) received in the component loop of the NST.

Then, the ALC/LCT stream handler and the file decoder 157 access the FLUTE file delivery session by using the obtained FLUTE level access information to collect files in the session. Once the files are collected, they constitute one NRT service. This NRT service may be stored in the third storage unit 156, or outputted to the middleware engine 193 or the A/V decoder 141 to be displayed on a display device.

The third storage unit 158, i.e., a storage medium storing a file such as NRT service data, may be shared with the second storage unit 125, or may be separately used.

Figure 24:
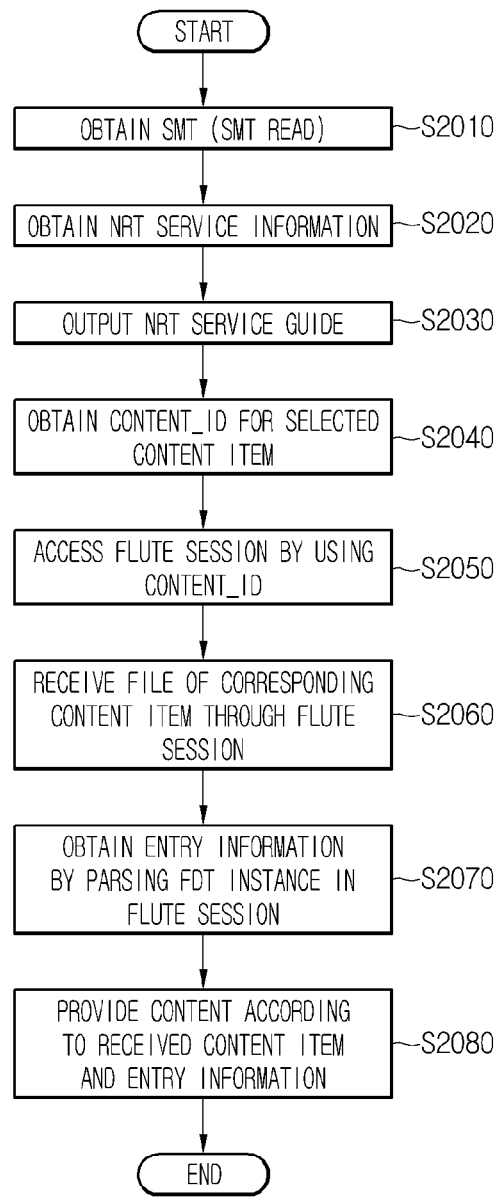
FIG. 24 is a flowchart illustrating a method of a receiver to receive and provide NRT service according to an embodiment.

FIG. 24 is a flowchart illustrating a method of a receiver to receive and provide NRT service according to an embodiment.

The receiver may obtain NRT service signaling information through an NRT service signaling channel or by receiving IP datagram in the case of mobile NRT service, and obtains SMT from the NRT service signaling information in operation S2010.

Then, the receiver obtains NRT service information from SMT in operation S2020. The NRT service information may be obtained by parsing NRT_service_info_descriptor in a service level descriptor loop. The obtained NRT service information may include requirement information on an application type for each NRT service or other NRT services.

Later, the receiver outputs NRT service guide on the basis of the obtained NRT service information in operation S2030. The NRT service guide may include application and service category information on each service. Additionally, detailed information may be further displayed on the basis of each field of NRT service info descriptor. The detailed information may include capacity information on corresponding NRT service according to a storage_requirement field or audio or video codec information on corresponding NRT service according to an audio_codec_type or video_codec_type field. A user may select NRT service to receive and use it on the basis of the information in the service guide.

Then, the receiver obtains identifier (content_id) for content items constituting the selected NRT service from NCT in operation S2040. The receiver obtains NRT_service_id corresponding to the selected NRT service from SMT, obtains NCT having the same NRT_channel_id value as the obtained NRT_service_id, and obtains an identifier (content_id) for content items constituting a corresponding NRT service through the obtained NCT.

Then, the receiver accesses the FLUTE session to receive a file constituting the corresponding content item by using the obtained content item identifier (content_id) in operation S2050. Since each file constituting the content item is matched to TOI or a content location field of FDT in the FLUTE session, the receiver receives a file of a corresponding content item by using the FLUTE session in operation S2060. The receiving of the file may include receiving a corresponding file or object when a Content-ID attribute field for a corresponding file is identical to the obtained content_id after reading FDT in a corresponding FLUTE session.

Additionally, the receiver parses FDT instances in a corresponding FLUTE session to obtain a list of files corresponding to the content item. Moreover, the receiver obtains entry information including a list of files serving as an entry among lists of files.

Lastly, the receiver provides NRT service to a user on the basis of the receiver content item and the list of files corresponding thereto or entry information in operation S2080.

The content downloaded through the NRT service may be used at the timing that a user wants, being separated from real-time broadcasting.

Additionally, after transmitting NRT service in advance and storing it in a receiver, a broadcasting station may designate a content item of the corresponding NRT service, which is executed at the timing of when a specific real-time broadcasting is transmitted or the NRT service is displayed. According to an embodiment of the present invention, the NRT service may include content, which is downloaded in advance linking with real-time broadcasting and executed at the specific timing. Additionally, according to an embodiment of the present invention, the NRT service may include content, which is prepared in advance to execute specific NRT service at the specific timing. An NRT service content triggered at the specific timing linked with real-time broadcasting to execute a specific action for a specific NRT service is called a Triggered Declarative Object (TDO). Accordingly, an NRT service application is classified as a non-real time declarative object (NDO) or a triggered declarative object (TDO) according to whether it is executed at the specific timing.

According to an embodiment of the present invention, a broadcasting station may transmit trigger information on triggering the TDO. The trigger information may include information on performing a specific action for a specific TDO at the specific timing.

Additionally, the trigger information may include trigger signaling data (trigger signaling information) for signaling a trigger, and trigger data constituting a trigger. Additionally, data stream transmitting trigger data may be designated as trigger stream. Also, the trigger data may mean itself.

Such a trigger may include at least one of a trigger identifier for identifying a trigger, a TDO identifier for identifying NRT service for trigger, and action information and trigger time on TDO.

The trigger identifier may be an identifier uniquely identifying a trigger. For example, a broadcasting station may include at least one trigger in broadcasting program information of a predetermined time provided through EIT. In this case, the receiver may perform an action on the trigger target TDO at the timing designated for each trigger on the basis of at least one trigger. At this point, the receiver may identify each trigger by using a trigger identifier.

A TDO identifier may be an identifier for identifying an NRT service content, i.e., a target of trigger. Accordingly, the TDO identifier may include at least one of a trigger NRT service identifier (NRT_service_id), content linkage (content_linkage), and URI or URL of an NRT content item entry. Moreover, the TDO identifier may include a target identifier (target_service_id) for identifying a trigger target TDO described later.

Additionally, TDO action information may include information on action for TDO of a trigger target. The action information may be at least one of execution, termination, and extension commands of the target TDO. Additionally, the action information may include commands for generating a specific function or event in the target TDO. For example, if the action information includes the execution command of the target TDO, a trigger may request the activation of the target TDO to the receiver.

Additionally, if the action information includes the extension command of the target TDO, a trigger may notify the receiver that the target TDO would extend. Additionally, if the action information includes the termination command of the target TDO, a trigger may notify the receiver that the target TDO would terminate. Thus, the broadcasting station may control a TDO operation in the receiver according to a real-time content through trigger.

Moreover, a trigger time may mean a time designated for performing (triggering) an action designated for the target TDO. Additionally, the trigger time may be synchronized with video stream in a specific virtual channel in order to link NRT service with real-time broadcasting. Accordingly, the broadcasting station may designate a trigger time with reference to PCR that video stream refers. Accordingly, the receiver may trigger TDO at the timing that the broadcasting station designates with reference to PCR that video stream refers. Moreover, the broadcasting station may signal a trigger with a trigger identifier in a header of video stream in order to transmit accurate trigger time.

Additionally, the trigger time may be designated with UTC time. In the case of UTC time, the trigger time is not a relative time but an absolute time.

The trigger time may be accurate trigger timing or may include an approximate start time. Moreover, the receiver may prepare an action for target TDO in advance before accurate trigger timing by receiving approximate time. For example, the receiver may prepare TDO execution in advance so that TDO operates smoothly at the trigger time.

FIG. 25 is a view illustrating a bit stream syntax of a trigger according to an embodiment.

Here, trigger or trigger data is in a trigger table form, and a corresponding syntax is in an MPEG-2 private section form to help understanding. However, the format of corresponding data may vary. For example, the corresponding data may be expressed in a Session Description Protocol (SDP) format and signaled through a Session Announcement Protocol (SAP) according to another method.

A table_id field is set with 0XTBD arbitrarily, and identifies that a corresponding table section is a table section constituting a trigger.

A section_syntax_indicator field is set with 1 and indicates that the section follows a general section syntax.

A private_indicator field is set with 1.

A section_length field describes that the number of bits remaining in the section to the last of the section from immediately after the section_length field.

A source_id field represents the source of a program related to a virtual channel.

A TTT_version_number field represents version information of a trigger. Additionally, the version information of a trigger represents the version of a trigger protocol. The trigger version information may be used for determining where there is change in a trigger structure or a trigger itself. For example, the receiver determines that there is no trigger change if the trigger version information is identical. Additionally, the receiver determines that there a trigger change if the trigger version information is different. For example, the trigger version information may include a plurality of version numbers, and the receiver may determine whether there is a trigger change on the basis of some of the plurality of version numbers.

A current_next_indicator field represents that a corresponding table section is applicable currently if set with 1.

A section_number field indicates a number of a corresponding table section.

A last_section_number field means a table section of the last and highest number among sections.

A num_triggers_in_section field means the number of triggers in a corresponding table section. The number of triggers in one session may be one or in plurality. Additionally, the next 'for' loop is performed as many times as the number of triggers.

A trigger_id field represents an identifier uniquely identifying a trigger.

A trigger_time field represents a time for which a trigger is performed. Moreover, this field may not be included in the session, and in this case, the trigger time may be a time designated from broadcasting stream as mentioned above.

A trigger_action field represents action information of a trigger performed at the trigger time. A trigger action may include at least one of a preparation command for target TDO, a target TDO execution command, a target TDO extension command, and a target TDO termination command. The trigger action may further include a command generating a specific command or event.

A trigger_description_length field represents the length of trigger_description_text.

A trigger_description_text field represents description for a corresponding trigger in a text format.

A service_id_ref field represents an identifier identifying a target TDO of a trigger. Accordingly, for example, a service_id_ref field may indicate an NRT_service_id field of SMT or NST to identify NRT service of a trigger target TDO.

A content_linkage field represents an identifier identifying a target TDO content item of a trigger. For example, a content_linkage field may indicate a content_linkage field of NRT-IT or NCT to identify a target TDO content item of a trigger. Additionally, a service_id_ref field and a content_linkage field may be included in a class for indicating one target TDO.

A num_trigger_descriptors field represents the number of trigger descriptors.

A trigger_descriptor( ) field represents a descriptor including information on a trigger.

When a trigger is in a table format of the MPEG-2 private section, a broadcasting station may transmit one trigger according to a virtual channel.

A first method of a broadcasting station to transmit a trigger may include transmitting 0X1FF stream including the trigger table, i.e., PSIP basic PID. The first method may distinguish the trigger table from other tables by allocating table_id of the trigger table.

Moreover, a second method of transmitting a trigger includes allocating PID corresponding to a trigger table to a Master Guide Table (MGT) and transmitting a corresponding PID stream having the trigger table. The second method processes all tables in a corresponding PID stream by using the trigger table.

Moreover, according to an embodiment, at least one of trigger and trigger signaling information is transmitted through an MPEG-2 Packetized Elementary Stream (PES) in order to designate the accurate timing synchronized with video and audio as a trigger time.

Here, the video and audio synchronization of MPEG-2 PES will be described as follows. A receiver decoder operates in synchronization with a time stamp of a transmitter encoder. The encoder has a main oscillator, called a System Time Clock (STC), and a counter. The STC is included in a specific program and a main clock of program for video and audio encoders.

Moreover, if a video frame or an audio block occurs in an encoder input, STC is sampled. A sampling value and a constant value as much as delay of the encoder and decoder buffers are added to generate display time information, i.e., Presentation Time Stamp (PTS) and then are inserted into the first portion of a picture or audio block. When frame reordering occurs, Decode Time Stamp (DTS) representing a time at which data needs to be decoded in a decoder is inserted. Except for the frame reordering of the B picture, DTS and PTS are same. DTS is additionally required in the case of the frame reordering. When DTS is used, there is PTS always. They may be inserted at an interval of less than about 700 msec. Additionally, it is defined in ATSC that PTS and DTS are inserted at the starting portion of each picture.

Moreover, an output of an encoder buffer includes a time stamp such as Program Clock Reference (PCR) in a transport packet level. Moreover, a PCT time stamp occurs at an interval of less than 100 msec, and is used for synchronizing STC of a decoder and STC of an encoder.

Moreover, video stream and audio stream may have each PTS or DTS corresponding to a common STC, for synchronization of audio stream and the decoder. Accordingly, PTS and DTS indicate when audio stream and video stream are played at each decoding unit, and are used to synchronize audio and video.

For example, a decoder of receiver outputs a PES packet in the received TS stream as a video PES depacketizer, and outputs a PCR value inserted in a TS packet header to a PCR counter. The PCR counter counts 100 of the PCR value and outputs it to a comparison unit. Moreover, the video PES depacketizer outputs a header of a PES packet to a DTS/PTS extractor, buffers Elementary Stream, i.e., image data to be displayed, in an Elementary Stream Buffer&Decoder. The DTS/PTS extraction unit extracts DTS and PTS values from the PES packet header and outputs them to the comparison unit. The comparison unit, if the PCR value inputted from the PCR counter becomes a DTS value or the PCR value of 100 becomes a PTS value, outputs each signal for that to a decoding/display control unit. The decoding/display control unit receives a signal that the PCR value becomes the DTS value from the comparison unit, and decodes the image data buffered in the elementary stream buffer & decoder to store them in a decoded stream memory. Additionally, the decoding/display control unit displays the decoded image data stored in the decoded stream memory through a display unit when receiving the signal that the PCR value becomes the PTS value from the comparison unit.

Accordingly, MPEG-2 PES includes PTS and DTS in its header, which synchronize data transmitted during data transmission with one elementary stream (ES) or presentation time between a plurality of ES. This is called a synchronized data stream method.

That is, according to an embodiment, a broadcasting station includes trigger data or trigger stream in the payload of PES and designates trigger time as a PTS value of the PES packet header by using the above synchronized data stream method. In this case, the receiver may trigger a target TDO at the accurate timing according to the PCR value that PTS of PES including a trigger refers. Accordingly, a broadcasting station may synchronize a trigger at the accurate timing of audio and video presentation that the broadcasting station is to trigger by using the PTS of the PES packet header designated as a trigger time and the PTS of the audio and video PES packet header.

Moreover, in relation to the header of the PES stream packet including a trigger, a stream_type value may be 0x06 to indicate a synchronized data stream method, stream_id may indicate a identifier of a predetermined stream, and PES_packet_length may indicate the length of PES stream including the payload of PES stream.

FIG. 26 is a view illustrating a PES structure according to a synchronized data stream method including a trigger according to an embodiment.

As shown in FIG. 26, PES of the synchronized data stream method may include a PES header and PES payload. The PES payload may include a synchronized data packet structure. As mentioned above, the trigger including a trigger table or another type of data may be included in the PES payload of FIG. 26 and then transmitted. Additionally, a broadcasting station may packetize the trigger in an IP datagram format, and may include and transmit the packetized trigger in an IP data area.

FIG. 27 is a view illustrating a synchronized data packet structure of PES payload for transmitting trigger as bit stream syntax according to an embodiment.

As shown in FIGS. 26 and 27, the trigger may be included in the synchronized data packet structure and then transmitted. Detailed description of each field in the structure is as follows.

A data_identifier field is an identifier identifying a type of data included in a PES data packet. This may be set with 0X22 according to a type.

A sub_stream_id field is an identifier (user private) settable by a user.

A PTS_extension_flag field indicates whether there is a PTS_extension field. If this field value is 1, the PTS_extension field may be in the PES data packet field. Additionally, this field may be 0 when there is no PTS_extension field.

An output_data_rate_flag field may be set with 0.

A synchronized_data_packet_header_length field represents the length of an optical field in the PES packet header. This field may be included If the PTS_extension_flag field is 1, and represents the length including synchronized_data_private_data_byte(s).

A PTS_extension field extends PTS delivered from the header of a corresponding PES packet. This field may include 9 bit Program Clock Reference (PCR) extension information. Additionally, a receiver may extend the PTS resolution of synchronized data from 11.1 ρs (90 kHz), i.e., the MPEG-2 standard, to 37 ns (27 MHz).

A synchronized_data_private_data_byte field represents a payload byte of a synchronized PES packet. If the protocol_encapsulation of DST represents one of synchronized datagram, IP datagram not including LLC/SNAP, and multiprotocol including LLS/SNAP, the synchronized_data_byte field may include one unique datagram. Accordingly, when LLC/SNAP is used, an 8 byte LLC/SNAP header may be shown in only the first 8 byte synchronized_data_byte of the PES packet.

Accordingly, if a broadcasting station includes a trigger in a synchronized data stream (stream_type) of PES and transmits it, a receiver may extract trigger stream from the payload of PES. Additionally, the receiver may perform an action on a target TDO by using the PTS value of the PES header as a trigger time. Accordingly, TDO may be trigged at the accurate timing of a frame unit by synchronizing a trigger on the basis of PTS, i.e., a reference time for presentation synchronization of video and audio. Additionally, when a trigger time is designated with PTS, video and audio synchronization may be easily obtained.

Moreover, trigger signaling information on obtaining trigger stream is transmitted according to an embodiment. A receiver receives trigger signaling information and obtains trigger stream in the synchronized data stream of PES on the basis of the received trigger signaling information.

A method of transmitting trigger signaling information to obtain trigger stream transmitted using synchronized data streaming may vary. One of the following methods is used to transmit trigger signaling information: 1. a transmission method through DST; 2. a transmission method through a service id descriptor; 3. a transmission method through a trigger stream descriptor; and 4. a transmission method by defining a stream type of trigger stream.

According to an embodiment, trigger signaling information may be transmitted through DST for NRT service. DST is a table session for transmitting data service. Since its description and description for its data_service_bytes( ) are identical to those of FIG. 8, overlapping description will be omitted.

The DST may include signaling data for receiving each Elementary Stream (ES) constituting data service. Accordingly, trigger signaling data for receiving trigger stream may be included in DST.

Moreover, each data service may include at least one application, and each application may in an application identification structure including an application identifier such as app_id. Moreover, each application may include at least one data element constituting a corresponding application or data stream.

Accordingly, in order to transmit trigger stream through data service, a broadcasting station includes one trigger stream in a specific virtual channel and transmits it. Moreover, the broadcasting station may include one trigger stream in each application and transmit it. Accordingly, embodiments for transmitting trigger signaling information will be described according to two methods.

When one trigger stream is included a virtual channel, a data service for transmitting trigger stream is called a trigger service. In this case, a broadcasting station may allocate a fixed service identifier (service ID) to a trigger service.

Accordingly, a receiver may identify that one trigger stream is transmitted to a virtual channel when the service identifier has 0X01 as a fixed value.

Here, the broadcasting station may include trigger signaling information in an application identification structure in DST and transmit it.

For example, the broadcasting station adds 0x0001 as an App_id_description field value of DST to set a value that means interactive application for linking NT service such as TDO with a real-time broadcast Additionally, app_id_byte_length may use 3 bytes (0x0003) and app_id_byte may be allocated with 0x01 to indicate that corresponding data service includes trigger stream signaling information.

Accordingly, the receiver receives DST through the above method, and may identify tap( ) including trigger signaling information when app_id_byte_length is 0x0003, app_id_description is 0x0001, and app_id_byte is 0x01. The receiver extracts trigger signaling information including an association_tag value from the identified tap( ) structure, and association_tag_descriptor receives stream having the same PID as the extracted association_tag from data elementary stream (ES) listed in PMT extracted from broadcasting stream in order to receive trigger stream.

As mentioned above, NRT service is signaled through SMR or NST, and may be uniquely identified through 16 bit service identifier (service_id). Additionally, content items constituting NRT service may be identified through conent_lengate or a content identifier in NCT or NRT-IT. Accordingly, trigger service may be transmitted like NRT service by extending app_id_byte through DST. For example, app_id_byte may include data combining a service identifier (service id) field of trigger service and a content_linkage field. Accordingly, the first 16 bits of app_id_byte correspond to a service id field in SMT or NST, and the later 32 bits correspond to a content linkage field in NCT or NRT-IT.

As above, the broadcasting station may include trigger signaling information in tap( ) and transmits it through an application identification structure of DST when one stream is included in each channel.

Moreover, according to an embodiment, trigger signaling information may be transmitted through a protocol_encapsulation field of DST. For example, if app_id_byte_length in DST is set with 0x0000, app id is not allocated. If protocol_encapsulation has 0x0F, it indicates that trigger signaling information is included in a corresponding tap( ) structure. Accordingly, a receiver may receive trigger signaling information from the corresponding tap( ) structure if app_id_byte_length is 0x0000 and protocol_encapsulation is 0x0F. Through this, a PID value on PMT indicating trigger stream is obtained and trigger stream is received as mentioned above.

Moreover, according to another embodiment, trigger signaling information may be transmitted through a content type descriptor field of DST.

As shown in FIG. 28, a content type descriptor structure in tap( ) on DST according to an embodiment is as follows.

A descriptorTag may have 0x72 to represent contentTypeDescriptor.

A descriptorLenth field represents the total length of a descriptor in a byte unit.

A contentTypeByte field represents a MIME media type value of data referenced by tap connected to the descriptor. The MIME media type is defined in 5 of RFC2045 section [8].

Accordingly, a content type descriptor may be added to a tap( ) structure including trigger signaling information according to an embodiment. Accordingly, a receiver may receive trigger signaling information from the corresponding tap( ) structure if app_id_byte_length is 0x0000 and content type descriptor of the tap( ) structure corresponds to the predetermined content. Through this, a PID value on PMT indicating trigger stream is obtained and trigger stream is received as mentioned above. The MIME media type may be designated with a specific type to identify that there is trigger service signaling information through a content type descriptor.

As mentioned above, one NRT service may be a trigger service for transmitting trigger stream and may transmit respectively different stream to content items in the trigger service. In this case, each application may include one trigger stream.

Accordingly, an embodiment may include trigger stream in each content item of NRT service and may transmit it. In this case, the above-mentioned application identification structure may be used. For example, if app_id_byte_length is 0x0003, it indicates that trigger stream is transmitted through one NRT service by using one service identifier. If app_id_byte_length is 0x0007, it indicates that trigger stream is transmitted by each content item by using a service identifier and content linkage. If defined as above, each trigger stream may be transmitted in correspondence to each NRT service or content item. Since the next stage of a method of transmitting and receiving trigger stream is identical to that of transmitting one trigger stream for each virtual channel, overlapping description will be omitted.

FIG. 29 is a view illustrating a syntax of PMT and service identifier descriptor according to an embodiment.

As shown in FIG. 29, a Program Map Table (PMT) represents information of a program broadcasted in each channel. A Program AssociationTable (PAT), in which 'packet ID' is defined as '0x00' and transmitted, may receive PMT by parsing 'packet ID' of PMT.

Moreover, a service identifier descriptor may be included in a descriptor loop for each ES of PMT. Then, it may include list information of services in each program element.

A structure of the service identifier descriptor will be described as follows.

A descriptor_tag field indicates that the descriptor is service_id_descriptor( ) and may have 0xC2.

A descriptor_length field represents a byte unit length from this field to the termination of the descriptor.

A service_count field indicates the number of services in a program element having the descriptor.

A service_id field indicates a service identifier in a program element having the descriptor.

According to an embodiment, trigger stream may be transmitted through a well-known IP address. Moreover, in order to signal a trigger, a broadcasting station may include a specific service identifier (service id, for example, 0x01) corresponding trigger stream in a service identifier descriptor and may transmit it. That is, trigger signaling information on receiving trigger stream may be transmitted through a service identifier descriptor. Accordingly, if a service identifier of service_id_descriptor in an ES descriptor loop in an ES loop of PMT is 0x01, the receiver determines that elementary_PID in the ES loop is PID indicating trigger stream and receives the trigger stream through the PID.

FIG. 30 is a view illustrating a trigger stream descriptor according to an embodiment. According to an embodiment, a trigger may be signaled using a trigger stream descriptor. Like the above service identifier descriptor, the trigger stream descriptor may be included in an ES descriptor loop in an ES loop of PMT. Accordingly, if there is trigger stream, a trigger stream descriptor may exist in an ES descriptor loop. If identifying a trigger stream descriptor, a receiver may receive trigger stream by obtaining PID of the trigger stream from elementary_PID in a corresponding ES loop.

Like this, a trigger stream descriptor for transmitting trigger signaling information may include at least one of a service identifier (target service id) of TDO, a trigger target in trigger stream, and an IP address list transmitting trigger stream. The trigger stream descriptor of FIG. 30 is provided according to an embodiment and its structure will be described as follows.

A descriptor_tag field indicates a trigger_stream_descriptor if set with a predetermined value.

A descriptor_length field represents a byte unit length from this field to the termination of the descriptor.

A target_service_count field represents the number of target NRT service (TOD) of at least one trigger in trigger stream.

A target_service_id field represents a service identifier (service_id) of target NRT service (TOD) of at least one trigger in trigger stream. A receiver may identify a service identifier (service_id) before receiving trigger stream by using the target_service_id field.

A target_content_item_count field represents the number of target NRT service content items of at least one trigger in trigger stream.

A target_content_linkage field represents a target NRT service content item linkage (content_linkage) of at least one trigger in trigger stream.

Moreover, a trigger stream descriptor is provided according to an embodiment, and thus, it is apparent that it may include additional information or have another configuration. For example, when one trigger stream is transmitted for each channel, a content item field may be omitted. Additionally, at least one of a trigger stream identification information field and a profile information field may be added to identify trigger stream.

A broadcasting station may transmit list information of trigger target NRT service such as TDO by using the trigger stream descriptor. Additionally, the broadcasting station may transmit trigger signaling information by using the target_service_id and target_content_linkage fields if there is another trigger according to a content item. Additionally, a trigger stream descriptor may further include a list of IP address information or port numbers transmitting trigger stream.

According to an embodiment, a broadcasting station designates a stream type and transmits trigger signaling information. A receiver extracts trigger signaling information by using a stream type from PMT and receives trigger stream through the trigger signaling information. For example, 0x96, one of stream types set preliminarily at the present, may be designated as trigger stream. In this case, a typical receiver has no information that a stream type is 0x96 and thus may not process trigger stream and disregard it. Accordingly, backwards compatibility for sub model receiver is guaranteed.

According to an embodiment, a trigger may be included in an Application information Table (AIT) for transmitting application information in data broadcasting such as Multimedia Home Platform (MHP) or Advanced Common application platform (ACAP), and may be transmitted. FIG. 31 is a view of AIT according to an embodiment.

Moreover, according to another embodiment a trigger may be included in a descriptor of STT to refer to a System Time Table (STT) as a trigger time, and then transmitted. FIG. 32 is a view of STT according to an embodiment.

Figure 33:
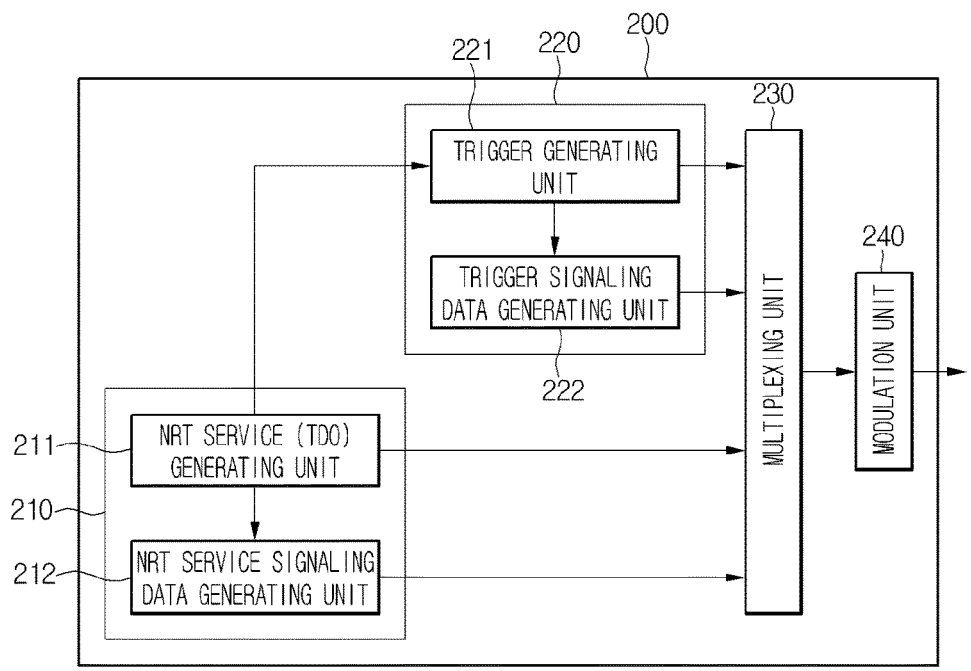
FIG. 33 is a block diagram illustrating a transmitter for transmitting TDO and a trigger according to an embodiment.

FIG. 33 is a block diagram illustrating a transmitter for transmitting TDO and a trigger according to an embodiment.

Referring to FIG. 33, the transmitter 200 includes an NRT service transmitting unit 210, a trigger transmitting unit 220, a multiplexing unit 230, and a demodulation unit 240. The NRT service transmitting unit 210 includes an NRT service (TDO) generating unit 211 and an NRT service signaling data generating unit 212. The trigger transmitting unit 220 includes a trigger generating unit 221 and a trigger signaling data generating unit 222.

The NRT service (TDO) generating unit 211 receives data for NRT service generation from a service provider to generate the NRT service, packetizes the generated NRT service into IP datagram, and then packetized the packetized IP datagram into a transmission packet (TP). The packetized NRT service data is transmitted to the multiplexing unit 230.

The NRT service generating unit 211 transmits metadata including channel information about NRT service in transmission and service_id, to the NRT service signaling data generating unit 212. Additionally, if the generated NRT service is TDO, the NRT service generating unit 211 extracts trigger information including a trigger time for triggering TDO, identification information, and trigger action information of a target TDO, and then transmits it to the trigger generating unit 221.

The NRT service signaling data generating unit 212 generates NRT service signaling data for receiving NRT service by using the NRT service metadata, and packetizes the generated NRT service signaling data to the transmission packet (TP) to transmit it to the multiplexing unit 230.

Additionally, the trigger generating unit 221 generates trigger data by using trigger information of the TDO received from the NRT service (TDO) generating unit. The generated trigger data is packetized into a transmission packet to transmit it to the multiplexing unit 230. Moreover, the trigger generating unit 221 transmits metadata for receiving a trigger such as the packet identifier (PID) of the transmitted trigger data to the trigger signaling data generating unit 222.

The trigger signaling data generating unit 22 generates trigger signaling data on the basis of the received metadata, and packetizes the trigger signal in data into a transmission packet to transmit it to the multiplexing unit 230.

The multiplexing unit 230 multiplexes the received transmission packets by each channel, and then transmits the multiplexed signal to the modulation unit 240.

The modulation unit 240 modulates the multiplexed signal and transmits it to the external. The modulation method may vary, and the present invention is not limited thereto.

Figure 34:
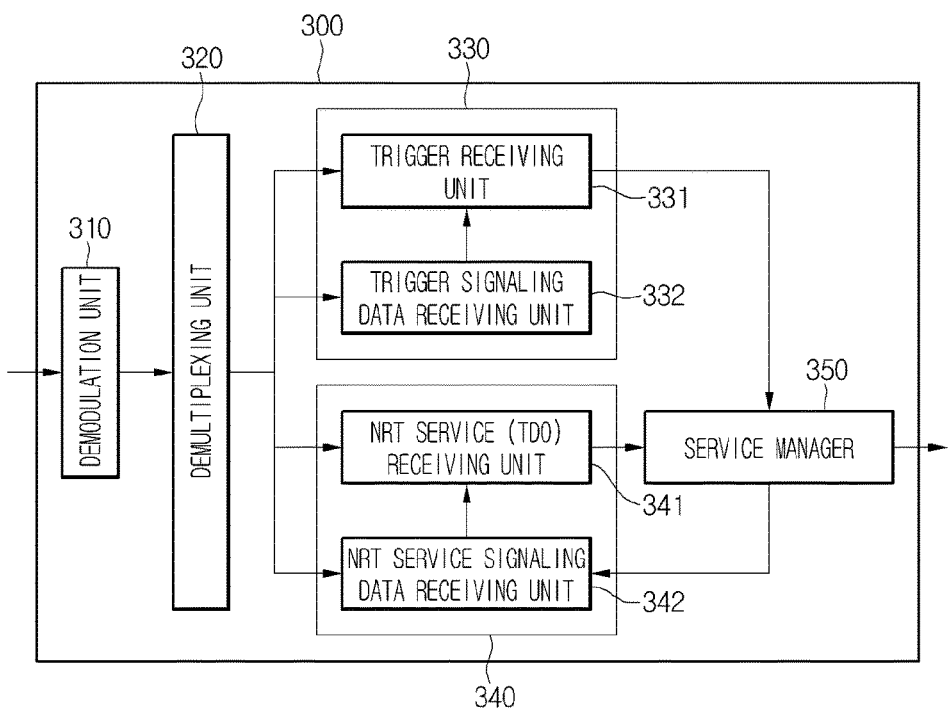
FIG. 34 is a block diagram illustrating a receiver for receiving TDO and a trigger according to an embodiment.

FIG. 34 is a block diagram illustrating a receiver for receiving TDO and a trigger according to an embodiment.

Referring to FIG. 34, the receiver 300 includes a demodulation unit 310, a demultiplexing unit 320, a trigger processing unit 330, an NRT service processing unit 340, and a service manager 350. The trigger processing unit 330 includes a trigger receiving unit 331 and a trigger signaling data receiving unit 332. The NRT service processing unit 340 includes an NRT service (TDO) receiving unit 341 and an NRT service signaling data receiving unit 342.

The demodulation unit 310 receives a modulated signal from the transmitter 200, and demodulates the received signal according to a predetermined demodulation method to transmit it to the demultiplexing unit 320.

The demultiplexing unit 320 demultiplexes the demodulated signal to restore an original transmission packet for each channel to transmit them to each receiving unit of the trigger processing unit 330 or the NRT service processing unit 340.

The NRT service signaling data receiving unit 342 receives and restores the packetized NRT service signaling data from the multiplexing unit 320 to extract information on NRT service, and then transmits it to the NRT service (TDO) receiving unit 341. The NRT service (TDO) receiving unit 341 receives transmission packets of NRT service from the multiplexing unit 320 by using information on receiving NRT service, and restores it as service data to transmit it to the service manager 350.

Moreover, the NRT service signaling data receiving unit 332 receives and restores the packetized trigger signaling data from the multiplexing unit 320, extract information on receiving a trigger, and then, transmits it to the trigger receiving unit 331. The trigger receiving unit 331 receives transmission packets including a trigger from the multiplexing unit 32 by using information on receiving a trigger, and restores trigger data to transmit it to the service manager 350.

The service manager 350 receives at least one of trigger data or NRT service (TDO) data from the trigger processing unit 330 or the NRT processing unit 340. Moreover, the service manager 350 performs and applies a trigger action on a trigger target TDO at the trigger timing, so that a trigger action on TDO is performed.

Figure 35:
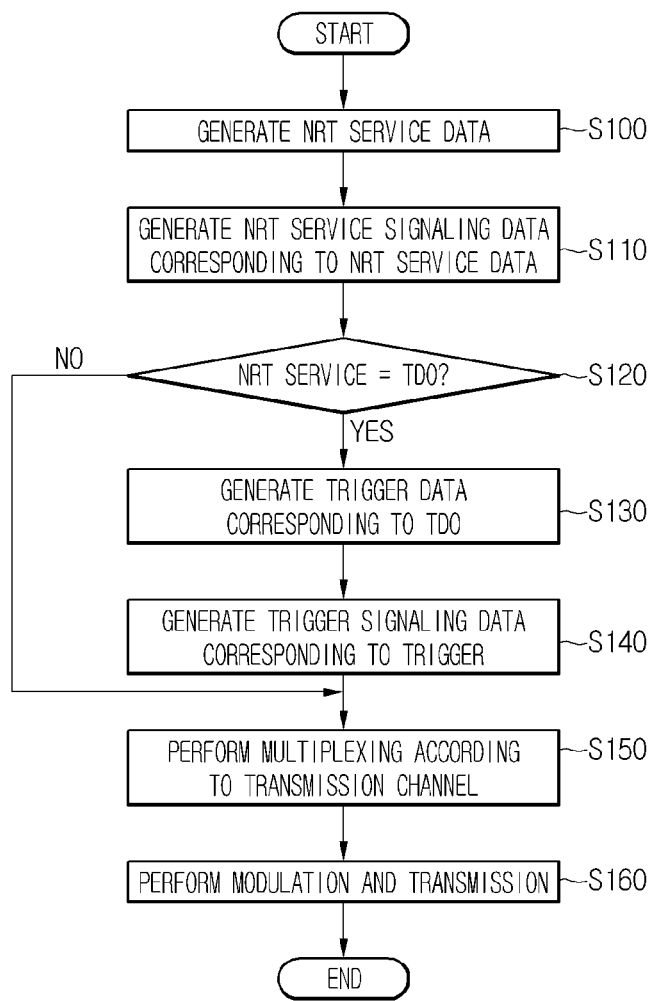
FIG. 35 is a flowchart illustrating a trigger transmitting method according to an embodiment.

FIG. 35 is a flowchart illustrating a trigger transmitting method according to an embodiment.

Referring to FIG. 35, the NRT service generating unit 211 generates NRT service data by receiving NRT service data from external or on the basis of data received from the NRT service provider in operation S100. Moreover, the NRT service generating unit 211 packets the generated data into a transmission packet. Additionally, the NRT service generating unit 211 transmits information on receiving transmission packets including NRT service to the NRT service signaling data generating unit 212.

Then, the NRT service signaling data generating unit 212 generates the above described NRT service signaling data and packetizes it into a transmission packet in operation S110.

Moreover, the NRT service generating unit 211 determines whether the generated NRT service is a trigger declarative object, i.e., TDO in operation S120.

Additionally, if the generated NRT service is TDO, the NRT service generating unit 211 transmits trigger information including a trigger time for triggering TDO, trigger action, target TDO identification information, to the trigger generating unit 221, and the trigger generating unit 211 generates trigger data by using the received triggered information in operation S130. The generated trigger data is packetized into a transmission packet and transmitted to the multiplexing unit. For example, a target service identifier for target TDO and trigger action information applied to a target service may be inserted into a packetized stream, i.e., the payload of PES, and then transmitted. Additionally, trigger time information is designated into a PTS or DTS format, inserted into the payload or header of PES, and then is transmitted. When the synchronized data streaming method is used, PTS of trigger stream and PTS of video and audio stream are synchronized to set the accurate play timing.

Moreover, the trigger signaling data generating unit 222 generates trigger signaling data for identifying and receiving a trigger transmitted from the trigger generating unit 221 and packetized the generated trigger signaling data into a transmission packet to transmit it to the multiplexing unit in operation S140. Here, the trigger signaling data may include a trigger stream descriptor or a service identifier descriptor, inserted in a program map table, and may include a packet identifier of trigger stream corresponding to each descriptor. Additionally, trigger signaling data may include a packet identifier of trigger stream in a TAP structure of DST.

Later, the multiplexing unit 230 multiplexes at least one of transmission-packetized NRT service data, NRT service signaling data, trigger data, and trigger signaling data by each transmission channel and then transmits it to the modulation unit 240.

Moreover, the modulation unit 240 performs modulation to transmit the multiplexed signal and transmits it to external receiver or a broadcasting network in operation S160.

Figure 36:
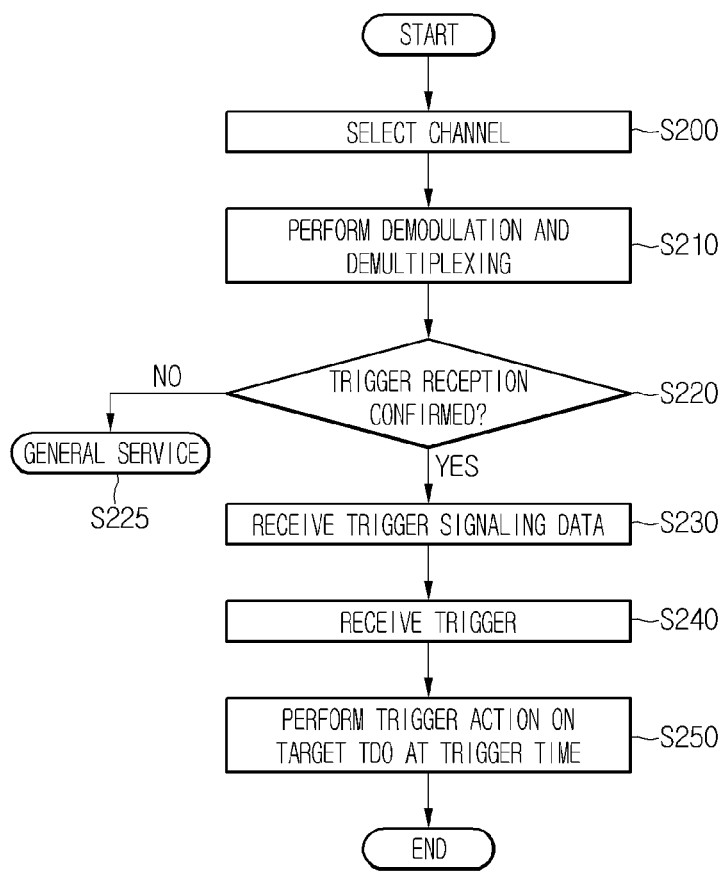
FIG. 36 is a flowchart illustrating an operation of a receiver 300 according to an embodiment.

FIG. 36 is a flowchart illustrating an operation of a receiver 300 according to an embodiment.

First, when the receiver 300 is turned on, a channel is selected by a user or a predetermined channel is selected in operation S200. The demodulation unit 310 demodulates the received signal from the selected channel, and the demultiplexing unit 320 demultiplexes the demodulated signal by each transmission channel. Also, the NRT service receiving unit 341 and the NRT service signaling data receiving unit 342 receive NRT service data and transmit it to the service manager 350 as described above.

Then, the trigger signaling data receiving unit 332 or the NRT service signaling data receiving unit 342 confirms whether trigger reception is possible in operation s220. The trigger reception confirmation may use one of the above-mentioned methods. That is, the trigger signaling data receiving unit 332 or the NRT service signaling data receiving unit 342 uses one of a method of confirming PID corresponding to a trigger in MGT or PSIP based PID, a method of using a tap structure of DST, a method of using a service identifier descriptor or a trigger stream descriptor, a method of using a trigger stream type, and a method of using AIT or STT, in order to confirm whether trigger reception is possible.

Moreover, when it is confirmed that trigger reception is possible, the trigger signaling data receiving unit 332 receives a transmission packet including trigger signaling data to restore the trigger signaling data, and then transmits it to the trigger receiving unit 331 in operation S230.

Later, the trigger receiving unit 331 extracts trigger data from the received transmission packet by using the trigger signaling data, and transmits it to the service manager 350 in operation S240. For example, the trigger receiving unit 331 may receive trigger stream by using a packet identifier corresponding to the trigger stream descriptor. Additionally, the trigger receiving unit 331 extracts trigger information from trigger stream and transmits it to the service manager 350. Additionally, if the received trigger stream is PES, PTS in the header of PES is extracted as a trigger time, and a target service identifier and trigger action in the payload of PES are extracted, in order to transmit them to the service manager 350.

Moreover, the service manager 350 performs a trigger action on a target TDO at the trigger timing, so that a trigger action on TDO is performed in operation S250. Especially, if the PTS of PES is a trigger time, the PTS of trigger stream is synchronized with the PTS in the header of audio and video stream, to satisfy the accurate play timing.

Figure 37:
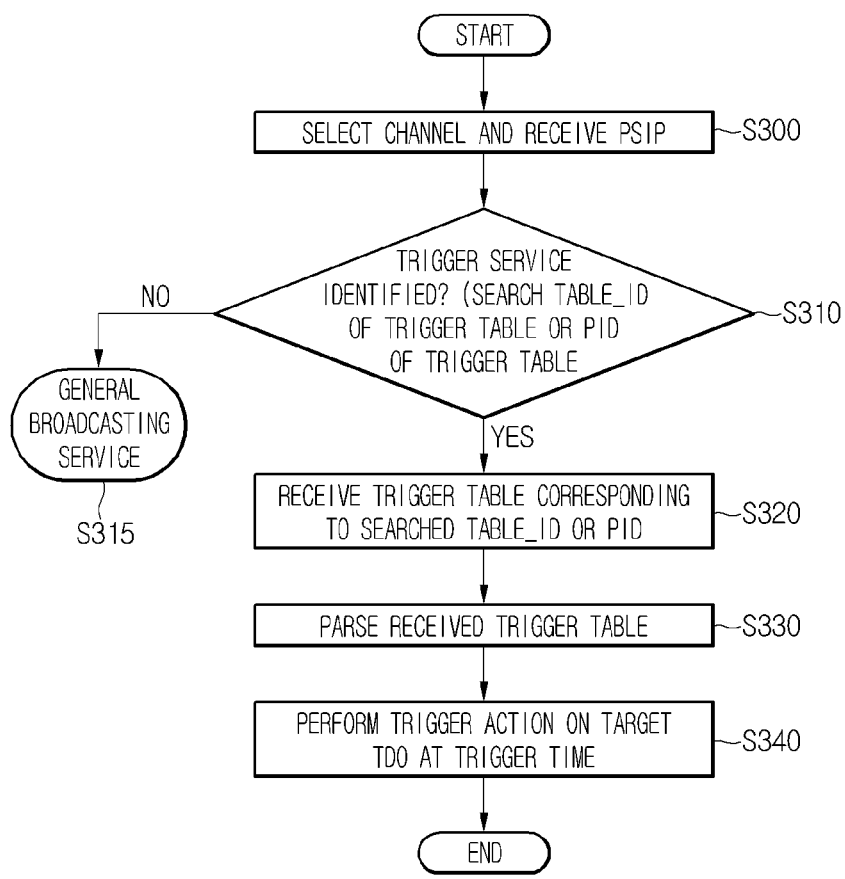
FIG. 37 is a flowchart illustrating a trigger receiving method by using a trigger table according to an embodiment.

FIG. 37 is a flowchart illustrating a trigger receiving method by using a trigger table according to an embodiment.

The demodulation unit 310 receives and demodulates a broadcast signal for selected channel. Moreover, the trigger signaling data receiving unit 332 receives a PSIP table through the demultiplexing unit 320 and determines whether there is a trigger table in the received table to identify a trigger service in operation S310. The trigger signaling data receiving unit 332 searches PID allocated to a trigger table from an MGT or PSIP based table, or searches a table corresponding to Table_id allocated to a trigger table to identify a trigger service.

If the trigger service is not identified, the receiver 300 provides general broadcasting services.

Moreover, if the trigger service is identified, the trigger receiving unit 331 receives the searched trigger table and parses it in operations S320 and S330.

Then, the service manger 350 receives trigger information including trigger time, trigger action, and target TDO identification information parsed in the trigger table, and performs a corresponding trigger action on a corresponding TDO at the corresponding trigger timing in operation S340.

Figure 38:
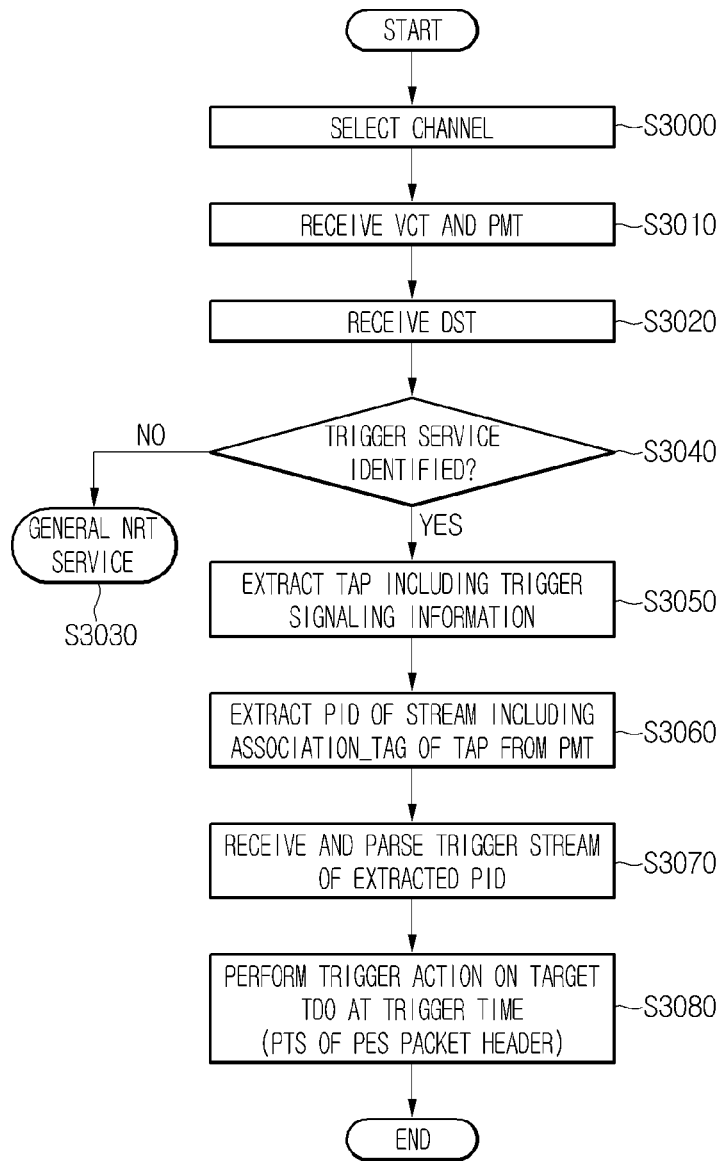
FIG. 38 is a flowchart illustrating an operation of a receiver when trigger signaling information and trigger are transmitted using DST according to an embodiment.

FIG. 38 is a flowchart illustrating an operation of a receiver 300 when trigger signaling information and trigger are transmitted using DST according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S3010. Then, the PSI/PSIP section handler or the trigger signaling data receiving unit 332 or the NRT service signaling data receiving unit 342 parses the obtained VCT and PMT to confirm whether there is NRT service.

For example, when the service_type field value of VCT is not 0x04 or 0x08, since the corresponding virtual channel does not transmit NRT only service, the receiver 300 operates properly according to information in the virtual channel. However, even though the service_type field value does not mean NRT only service, the corresponding virtual channel may include NRT service. This case is called adjunct NRT service included in the corresponding virtual channel, and the receiver 300 may perform the same process as the case of receiving NRT service.

Then, the NRT service signaling data receiving unit 342 or the trigger signaling data receiving unit 332 determines that NRT service is received through a corresponding virtual channel if a service_type field value is 0x04 or 0x08. In this case, if a stream_type field value in a service location descriptor of VCT (or an ES loop of PMT) is 0x95 (i.e., DST transmission), DST is received using an Elementary_PID field value in operation S3020. This may be performed in the demultiplexing unit 320 according to a control of the service manager 350.

Also, the trigger signaling data receiving unit 342 identifies a trigger service from the received DST in operation S3040. A method of identifying a trigger service uses one of a method of identifying a specific value allocated to app_id_description and app_id_byte by using an application identification structure, a method of identifying a specific value allocated to a protocol_encapsulation field, and a method of identifying tap including a content type descriptor.

If the trigger service is not identified from the received DST, since trigger data transmits general NRT service through a corresponding virtual channel, the receiver 300 operates properly according to NRT service in the corresponding virtual channel in operation S3030.

Moreover, when the trigger service is identified from DST, the trigger signaling data receiving unit 332 extracts tap from DST including trigger signaling information (PID of trigger stream) in operation S3060.

Then, the trigger signaling data receiving unit 332 extracts stream PID from PMT including association_tag of the extracted Tap in operation S3070.

The trigger receiving unit 331 receives MPEG-2 TS packets corresponding to the extracted stream PID, and removes decapsulation, i.e., TS header, to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S3070.

Then, the service manager 350 performs an action on the target TDO at the trigger timing by using the PTS of the PES packet header including a trigger as the trigger timing in operation S3080. Here, the target TDO may be NRT service indicated by the parsed target TDO identifier. Additionally, the action may be one of preparation, execution, extension, and termination commands provided from the parsed trigger action information.

Figure 39:
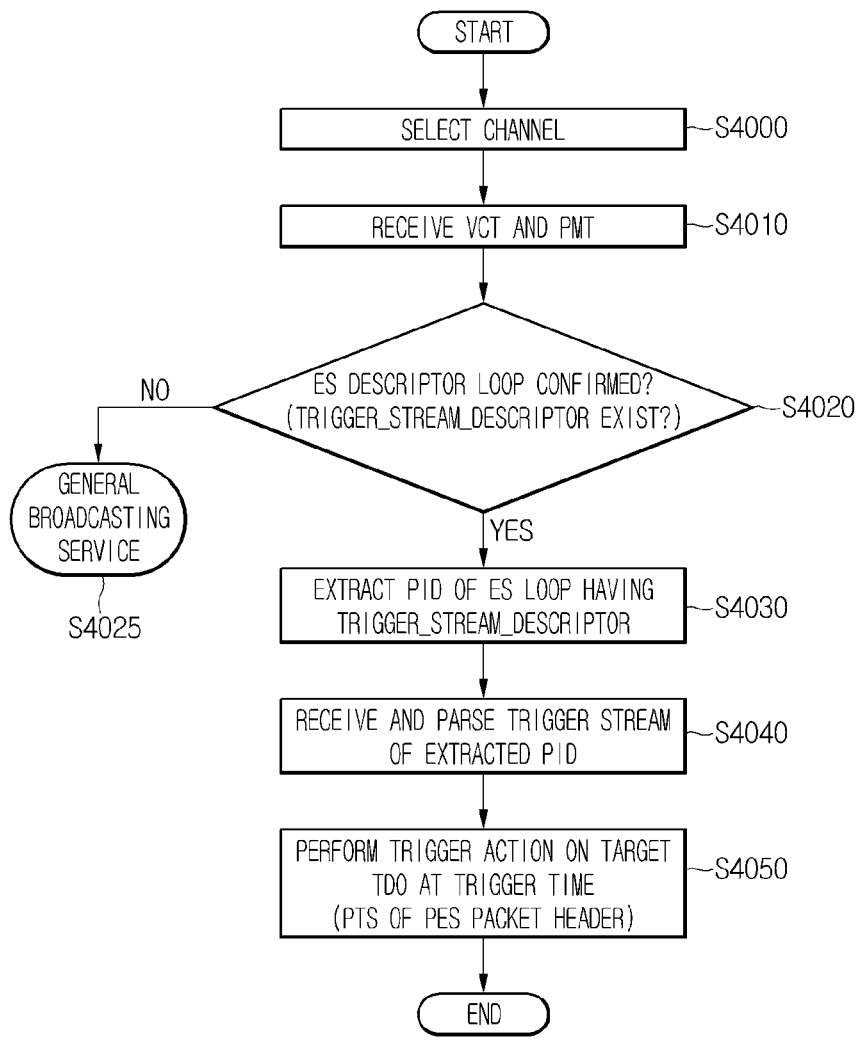
FIG. 39 is a flowchart illustrating an operation of a receiver when a trigger is transmitted using a trigger stream descriptor according to an embodiment.

FIG. 39 is a flowchart illustrating an operation of a receiver 300 when a trigger is transmitted using a trigger stream descriptor according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S4000. The broadcast signal includes VCT and PMT, and the trigger signaling data receiving unit 332 or the PSI/PSIP section handler parses the obtained VCT and PMT.

Also, the trigger signaling data receiving unit 332 confirms whether a trigger is transmitted from the VCT and PMT to a corresponding virtual channel. For this, the trigger signaling data receiving unit 332 determines whether there is the Trigger_stream_descriptor in the ES descriptor loop corresponding to a corresponding virtual channel in operation S4020. Whether there is Trigger_stream_descriptor is determined by using whether a stream_type value is 0x06 (synchronized data streaming) and a descriptor_tag field of a corresponding descriptor is identical to a value set to correspond to a trigger stream descriptor after searching descriptors in an ES descriptor loop.

If it is determined that Trigger_stream_descriptor is not identified from PMT and thus there is no Trigger_stream_ descriptor, since a corresponding virtual channel does no transmit a trigger, the receiver 300 operates properly according to broadcast service in the corresponding virtual channel in operation S4025.

Then, if there is Trigger_stream_descriptor, the trigger signaling data receiving unit 332 extracts Elementary_PID in the corresponding ES loop of PMT in operation S4030. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The stream type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S4040.

Then, the service manager 350 performs an action on the target TDO at the trigger timing by using the PTS of the PES packet header including a trigger as the trigger timing in operation S4050. Here, the target TDO may be NRT service indicated by the parsed target TDO identifier. Additionally, the action may be one of preparation, execution, extension, and termination commands provided from the parsed trigger action information.

Figure 40:
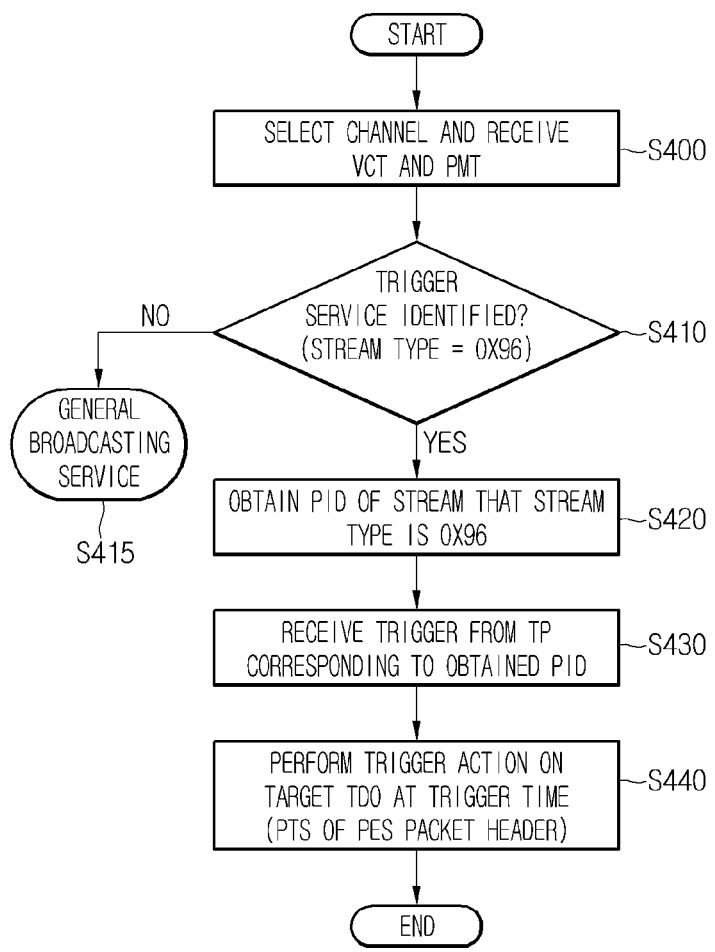
FIG. 40 is a flowchart illustrating an operation of a receiver when a trigger is transmitted using a stream type according to an embodiment.

FIG. 40 is a flowchart illustrating an operation of a receiver when a trigger is transmitted using a stream type according to an embodiment.

When a physical transmission channel is selected and a channel selected by a tuner is tuned, the receiver 300 obtains VCT and PMT from a broadcast signal received through the tuned physical transmission channel by using the demodulation unit 310 and the demultiplexing unit 320. The broadcast signal includes VCT and PMT, and the trigger signaling data receiving unit 332 or the PSI/PSIP section handler parses the obtained VCT and PMT in operation S400.

Also, the trigger signaling data receiving unit 332 confirms whether a trigger is transmitted from the VCT and PMT to a corresponding virtual channel. For this, the trigger signaling data receiving unit 332 determines whether there is 0x96, i.e., the specific stream type in the ES descriptor loop corresponding to a corresponding virtual channel in operation S410.

If it is determined that 0x96 is not identified from stream type and thus there is no stream type, since a corresponding virtual channel does no transmit a trigger, the receiver 300 operates properly according to broadcast service in the corresponding virtual channel in operation S415.

Then, if the stream type is 0x96, the trigger signaling data receiving unit 332 extracts Elementary_PID in the corresponding ES loop of PMT in operation S420. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The trigger receiving unit 331 parses at least one of PTS of a PES packet header from the restored PES stream, a target TDO identifier in trigger stream, a trigger identifier, or trigger action information in operation S430.

Then, the service manager 350 performs an action on the target TDO at the trigger timing by using the PTS of the PES packet header including a trigger as the trigger timing in operation S440. Here, the target TDO may be NRT service indicated by the parsed target TDO identifier. Additionally, the action may be one of preparation, execution, extension, and termination commands provided from the parsed trigger action information.

Figure 41:
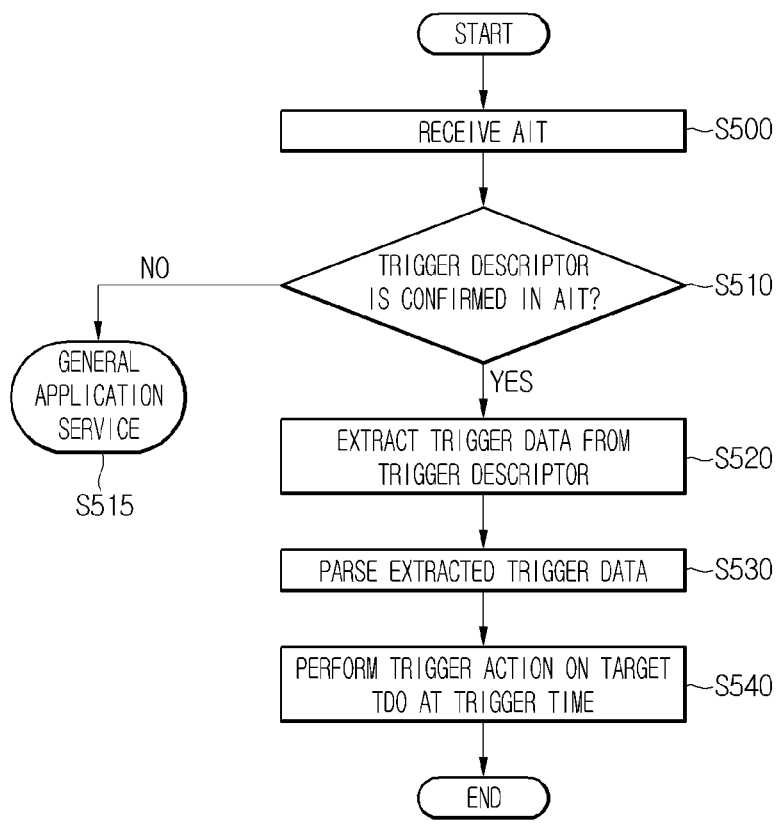
FIG. 41 is a flowchart illustrating an operation of a receiver when a trigger is transmitted using AIT according to an embodiment.

FIG. 41 is a flowchart illustrating an operation of a receiver when a trigger is transmitted using AIT according to an embodiment.

The trigger signaling data receiving unit 332 receives AIT by using the demodulation unit 310 and the demultiplexing unit 320 in operation S500.

Also, the trigger signaling data receiving unit 332 confirms whether a trigger is transmitted from AIT. For this, the trigger signaling data receiving unit 332 confirms whether there is a trigger descriptor in AIT in operation S510.

If it is determined that there is no trigger descriptor, since a corresponding application does not include a trigger, the receiver 300 operates properly according to corresponding application service in operation S515.

Also, if there is a trigger descriptor, the trigger receiving unit 332 extracts trigger data from the trigger descriptor and parses the extracted trigger data to transmit it to the service manager 350 in operation S530.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Figures 42, 43:
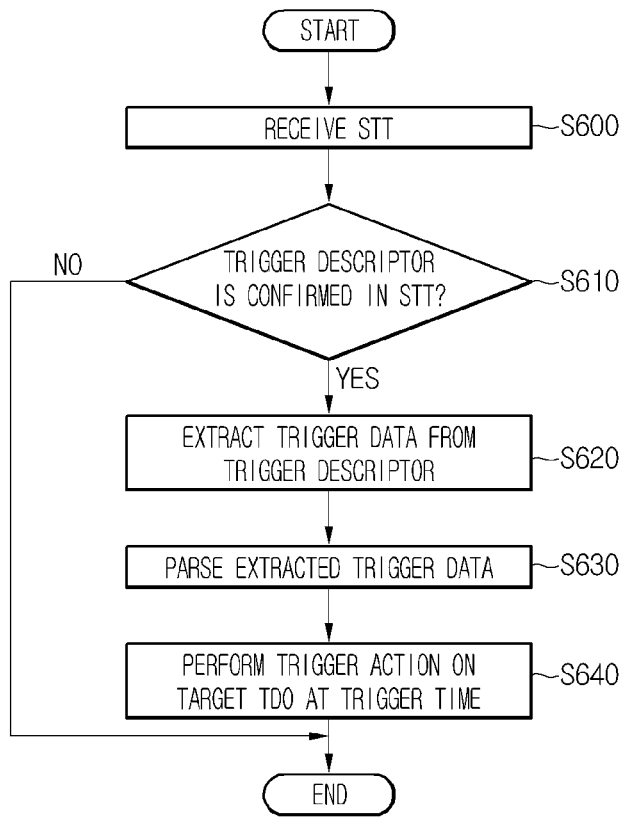
FIG. 42 is a flowchart illustrating an operation of a receiver when a trigger is transmitted using STT according to an embodiment.
FIG. 43 is a view illustrating a syntax of a linkage descriptor (link_descriptor) according to an embodiment of the present invention.

FIG. 42 is a flowchart illustrating an operation of a receiver when a trigger is transmitted using STT according to an embodiment.

The trigger signaling data receiving unit 332 receives STT by using the demodulation unit 310 and the demultiplexing unit 320 in operation S600.

Also, the trigger signaling data receiving unit 332 confirms whether a trigger is transmitted from STT. For this, the trigger signaling data receiving unit 332 confirms whether there is a trigger descriptor in STT in operation S610.

If it is determined that there is no trigger descriptor, since a corresponding STT does not include a trigger, the receiver 300 operates properly according to a broadcast signal in operation S615.

Also, if there is a trigger descriptor, the trigger receiving unit 332 extracts trigger data from the trigger descriptor and parses the extracted trigger data to transmit it to the service manager 350 in operation S630.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Hereinafter, according to an embodiment of the present invention, a method of providing information on NRT service in linkage with NRT service, real-time broadcast, and an internet network will be described.

As mentioned above, in an actual broadcast system, one broadcast program may include at least one application executed in linkage with a corresponding program, and such an application may be stored in the receiver 300 and launched through the above-mentioned NRT service receiving method.

However, since a PSIP table does not include information on an NRT service linked with a broadcast program, when the receiver 300 is to receive an NRT service linked with a broadcast program, an NRT-IT of a channel including a specific broadcast program all needs to be parsed. Also, even when the receiver 300 receives the NRT-IT first to receive a content item of NRT service, it is difficult to identify a broadcast program linked with the content item. Additionally, since the PISP table does not include information on an internet network, the receiver 300 receives only a real-time broadcast program, so that it is difficult to recognize related service transmitted through an internet network. Additionally, for the same reason as above, it is difficult for the receiver 300 to receive extended EPG on a specific real-time broadcast program, which is transmitted through an internet network. Accordingly, a systematic linkage between a real-time broadcast program, NRT service, and an internet network is required.

According to an embodiment of the present invention, the transmitter 200 may include information, which is necessary for linking to NRT service information such as an NRT or a TDO or an internet network, in a PSIP table corresponding to a specific channel or program, and then transmit it. Moreover, PSIP table information corresponding to specific real-time broadcast channel information or program information is included in NRT service, and then transmitted.

Accordingly, the receiver 300 receives a real-time broadcast channel or program, and parses the PSIP table, so that it may selectively receive an NRT service linked with a specific broadcast program. Furthermore, the receiver 300 receives a real-time broadcast channel or program, and parses the PSIP table, so that it may receive an NRT service linked with a specific broadcast channel or program, through an internet network. Then, the receiver 300 receives NRT service to obtain PSIP table information on a broadcast program linkable with the NRT service, and then provides it to a user.

According to an embodiment of the present invention, a descriptor providing information linked with real-time broadcast, for example, one of NRT service, preview information, extended EPG information, highlight information, and related internet portal information, may be included in one of PSIP tables and then, transmitted. According to an embodiment of the present invention, such a descriptor may be referred to as a link descriptor.

Additionally, according to an embodiment of the present invention, information on a broadcast program linkable with NRT service, for example, broadcast channel information or program information, may be included in one of an SMT and an NRT such as an NRT-IT and then, transmitted. According to an embodiment of the present invention, such a descriptor may be referred to as an event descriptor.

FIG. 43 is a view illustrating a syntax of a link descriptor (link_descriptor) according to an embodiment of the present invention. FIGS. 44 and 45 are views illustrating the contents of fields included in a link descriptor.

As shown in FIG. 43, the link descriptor includes a descriptor_tag field, a descriptor_length field, a number_of_links field, and a plurality of link data items. Each of the plurality of link data items includes a link_type field, a link_media field, a mime_type_length field, a mime_type field, a description_length field, a description, link_length field, and a link_byte field.

The descriptor_tag field may be an 8-bit unsigned integer to distinguish this descriptor as a link descriptor. For example, this field may have a 0xe8 value.

The descriptor_length field may be an 8-bit unsigned integer to define the length from a field immediately following this field to the end of the link descriptor.

The number_of_links field may be an 8-bit unsigned integer to indicate the number of the plurality of link data items.

The link_type field indicates the type of related service receivable based on the link_byte field. For example, as shown in FIG. 44, the link_type field may indicate type information of specific service receivable based on the link_byte field included in a link data item.

For example, a link data item having a link_type field of 0X01 may relate to an HTML page of a broadcast program portal. For example, a link data item having a link_type field of 0X01 may relate to an HTML page of a broadcast program portal. A link data item having a link_type field of 0X03 may relate to a Preview Clip service of a broadcast program. A link data item having a link_type field of 0X04 may relate to a of an Extended EPG of a broadcast program. A link data item having a link_type field of 0X05 may relate to a highlight service of a broadcast program. A link data item having a link_type field of 0X06 may relate to a Multiview service of a broadcast program. Also, a link data item having a link_type field of 0X07 may relate to a TDO service linkable to a broadcast program.

The link_media field may be an 8-bit unsigned integer indicating a transmission medium to receive related service on the basis of a link data item. For example, as shown in FIG. 45, when the link_media field is 0x02, it indicates that related service receivable based on a link data item is receivable through NRT service. Additionally, when the link_media field is 0x03, it indicates that related service is receivable through internet service.

The MIME_type_length field may be an 8-bit unsigned integer indicating the length of MIME type information indicating the MIME protocol type of the link_byte field.

The MIME_type field may indicate the protocol type of the link_byte field. The MIME type may indicate one type of text, multipart, massage, application, image, audio, and video, for example.

The descriptor_length field may be an 8-bit unsigned integer to indicate a description field indicating detailed information of a corresponding link.

The description field may indicate detailed information of a corresponding link.

The link_length field may be an unsigned integer to indicate the length of the link_byte field.

The link_type field may be a field indicating data to receive the above-mentioned broadcast program related service. The link_byte field may include identification information of contents receivable through link medium. For example, as shown in FIG. 45, if the link medium is NRT service, the link_byte field may include service_id and content_linkage to receive NRT service. Additionally, if the link medium is internet service, the link_byte field may include an uniform resource identifier (URL), i.e., internet address information, or URL information.

Figure 46:
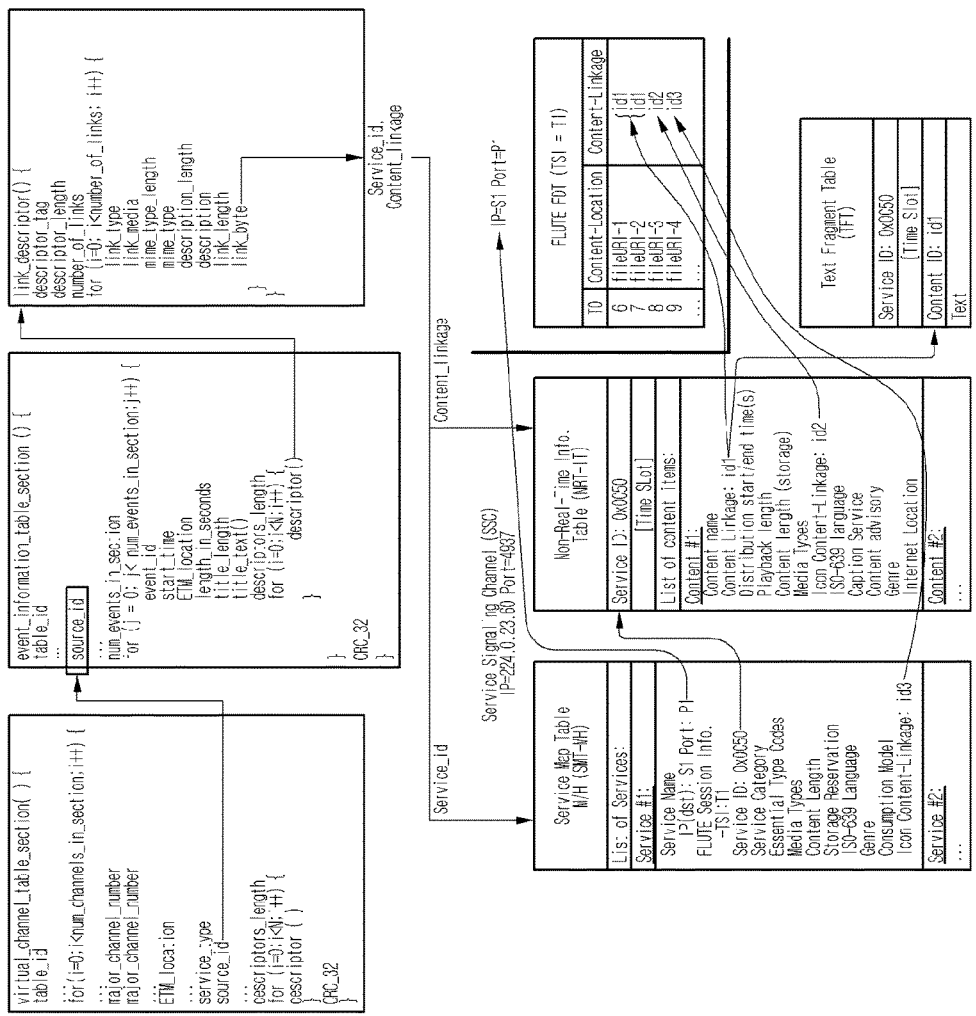
FIGS. 46 and 47 are views illustrating a linkage between each table when a link descriptor of FIG. 43 is included in a descriptor of an event information table (EIT) in a PSIP table according to an embodiment of the present invention.
Figure 47:
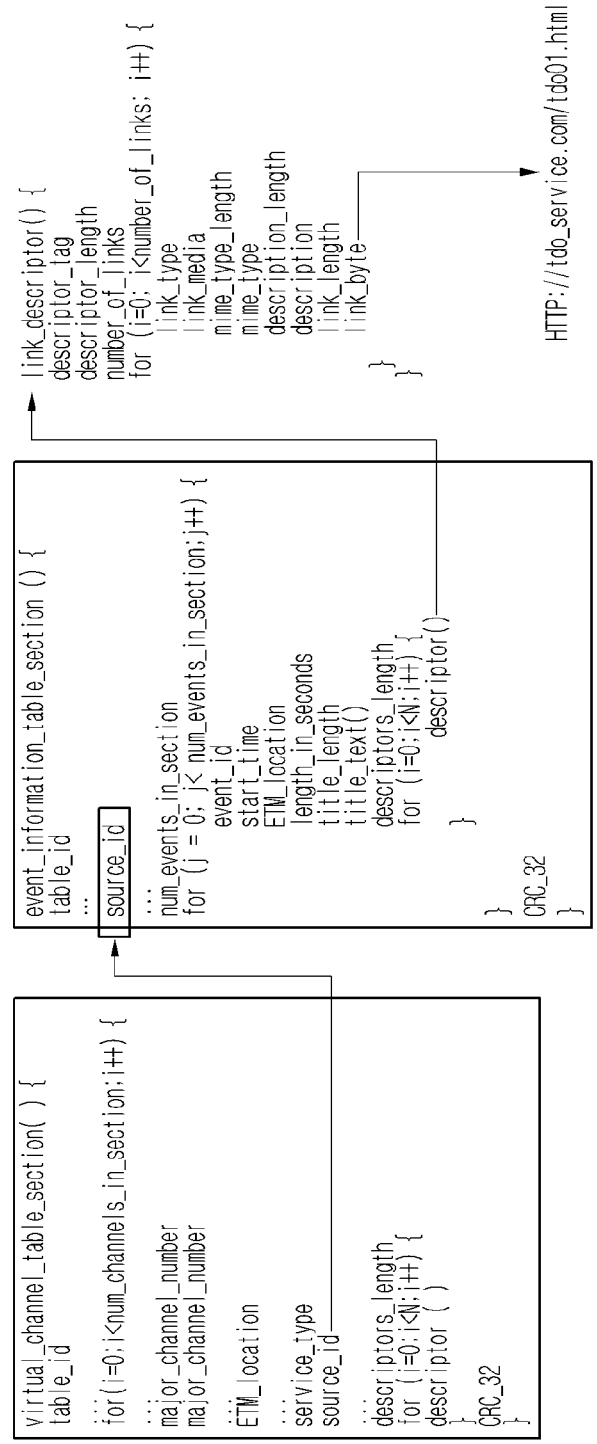

FIGS. 46 and 47 are views illustrating a relationship between each table when the link descriptor of FIG. 43 is included in a descriptor of an event information table (EIT) in a PSIP table.

As shown in FIG. 46, the link descriptor may be included in a descriptor loop of the EIT indicating broadcast program information and then, transmitted.

The EIT in addition to a VCT is included in a PSIP and then, transmitted. Since the VCT includes source_id corresponding to a selected virtual channel_number, the receiver 300 parses an EIT including same source_id as the VCT to obtain information on each broadcast program provided from each virtual channel. Each broadcast program is identified with event_id Accordingly, the receiver 300 extracts the link descriptor from a loop including event_id of a specific broadcast program in an event loop in the parsed EIT, and receives information linked with the specific broadcast program by using the extracted link descriptor through NRT service or an internet network.

For example, as shown in FIG. 46, if the link descriptor may include service_id and content_linkage of the NRT service linked with the specific broadcast program. In this case, the receiver 300 recognizes content item position information of the linked NRT service through an SMT, an NRT-IT, and an FDT, and downloads a content item through the recognized position information.

In more detail, the receiver 300 may obtain service signaling channel information corresponding to service_id included in a link_byte field of the link descriptor, from the SMT. At this point, the service signaling channel information may include an IP address and a port number. Moreover, the receiver 300 may obtain a list of content_id in a service corresponding to service_id included in a link_byte field of the link descriptor, from the NRT_IT. The receiver 300 may recognize the identifier of a content item to be downloaded corresponding to service_id in the NRT_IT through a content linkage field in a link_byte field of the link descriptor. Then, the receiver 300 may recognize the positions of content item files corresponding to content_id in NRT_IT from an FLUTE FDT received through the IP address and port number of the SMT. Accordingly, the receiver 300 receives files configuring a content item of NRT service linked with a corresponding broadcast program by using the FLUTE FDT through a FLUTE session. Moreover, the receiver 300 extracts URL information of content items, for example, a URL list of files, linked with a broadcast program from an internet location descriptor described later in the NRT-IT, and based on the extracted list, receives files configuring a content item of an NRT service linked with a broadcast program through a network.

Furthermore, the link descriptor may include at least one of portal HTML page access information linked with a broadcast, Thumbnail reception information, Preview Clip reception information, Extended EPG reception information, highlight reception information, Multiview reception information, and linkable TDO reception information, in addition to NRT service linked with a broadcast program. The link descriptor may include information to receive such reception information through NRT service or an internet network.

Additionally, as shown in FIG. 47, a link_byte field of a link data item in the link descriptor may include URL to receive a service linked with a specific broadcast program. In this case, the receiver 30 accesses an internet site according to internet address information in the link_byte field, and receives a broadcast program related service through an internet network. The broadcast program related service received through an internet network may include at least one of NRT service, thumbnail, preview clip, extended EPG, highlight, multiview, and TOD service.

In more detail, the receiver 300 obtains an EIT corresponding to a selected virtual channel, obtains the link descriptor from a descriptor loop of an event loop (i.e., a for loop including event_id) corresponding to a selected broadcast program in the obtained EIT, extracts an internet address from the obtained the link descriptor, and receives a service linked with a selected broadcast program in access to an internet network according to the extracted internet address. Accordingly, a broadcast service provider may provide a service linked with a specific broadcast program through real-time broadcast. Moreover, the receiver 300 may access an internet network by using internet address information, and may receive a service linked with a corresponding broadcast program through an internet network.

Figure 48:
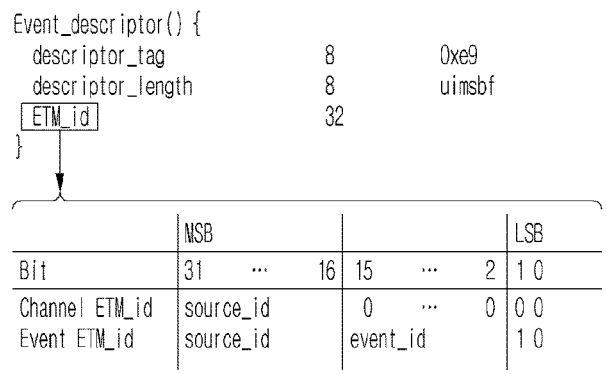
FIG. 48 is a view illustrating a syntax of an event descriptor (Event_descriptor) and contents of fields in the event descriptor according to an embodiment of the present invention.

FIG. 48 is a view illustrating a syntax of an event descriptor (Event_descriptor) and contents of fields in the event descriptor according to an embodiment of the present invention.

As shown in FIG. 48, the event descriptor includes a descriptor_tag field, a descriptor_length field, and an ETM_id field.

The descriptor_tag field may be an 8-bit unsigned integer to distinguish this descriptor as a link descriptor. For example, this field may have a 0xe8 value.

The descriptor_length field may be an 8-bit unsigned integer to define the length from a field immediately following this field to the end of the link descriptor.

The ETM_id field may be a 32-bit variable indicating broadcast channel information or broadcast program information linked with an NRT service including the event descriptor. The receiver 200 inserts a specific channel and program information into the event descriptor by using the ETM_id field, and includes the event descriptor in an NRT table signaling NRT service to transmit it. Additionally, the ETM_id field corresponds to ETM_id in an extended text table (ETT) providing additional information of a broadcast program and is used to provide additional information of a broadcast program.

In more detail, as shown in FIG. 48, when the ETM_id field includes broadcast channel information, it may be classified as channel ETM_id. In this case, the first 16 bits from the most significant bit (MSB) correspond to source_id of a corresponding virtual channel to identify a broadcast channel, and the remaining bits may be 0. Accordingly, the receiver 300 matches source_id with VCT of PSIP, so that it may identify a linkage channel of an NRT service including the event descriptor.

Additionally, when the ETM_id field includes all of broadcast program information and broadcast channel information, the least significant bit (LSB) is configured with 10. The first 16 bits from the MSB correspond to source_id of a corresponding channel and the 14 bits after that correspond to event_id of a corresponding program. Accordingly, the receiver 300 identifies a linkage channel of NRT service including the event descriptor and also identifies a broadcast program linked with NRT service by matching event_id with an EIT of PSIP.

Figure 49:
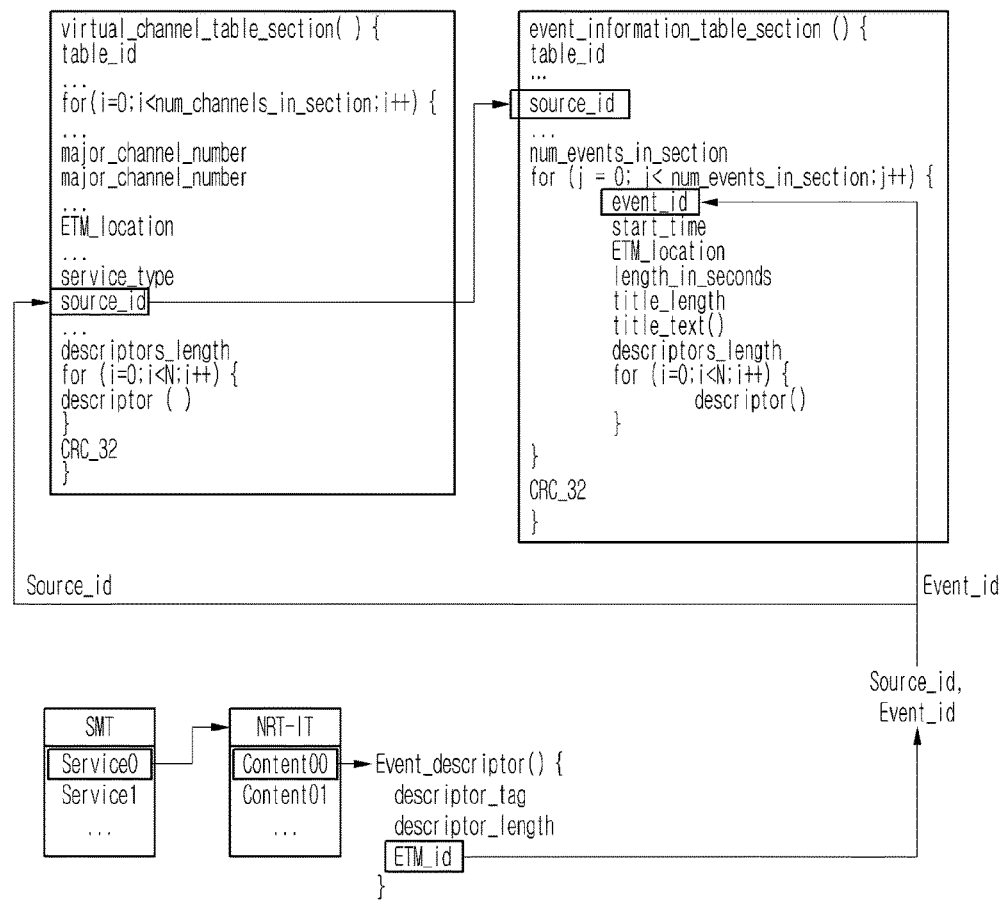
FIG. 49 is a view illustrating a method of identifying a linkage program through an event descriptor according to an embodiment of the present invention.

FIG. 49 is a view illustrating a method of identifying a linkage program through the event descriptor according to an embodiment of the present invention.

For example, as shown in FIG. 49, the service manager 350 of the receiver 300 identifies service_id through an SMT and receives and parses a content item of an NRT service corresponding to service_id identified by an NRT-IT.

Then, when the service manager 350 of the receiver 300 finds a specific part of the parsed NRT-IT, for example, the event descriptor (Event_descriptor) in a content loop, it may obtain ETM_id including broadcast program information linked with NRT service from the found event descriptor.

According to an embodiment of the present invention, the service manager 350 of the receiver 300 may obtain source_id of a channel including a broadcast program and event_id of a broadcast program from ETM_id. As mentioned above, the receiver 300 corresponds the first 16 bits of ETM_id to source_id, and 14 bits after that to event_id, so that it may obtain source_id and event_id.

Then, the service manager 350 of the receiver 300 may identify a virtual channel matching source_id from a VCT, and may identify an event loop of a broadcast program matching event_id from an EIT of a corresponding virtual channel. The service manager 350 of the receiver 300 receives NRT server related broadcast program information from the identified event loop and then, provides the information to a user. The broadcast program information may include at least one of a start time of a corresponding broadcast program, an ETT position, a broadcasting time, title information, and description information in the event loop of an EIT. Accordingly, the service manager 350 of the receiver 300 provides to a user the information on the received NRT service related broadcast program on the basis of the received broadcast program information.

Figure 50:
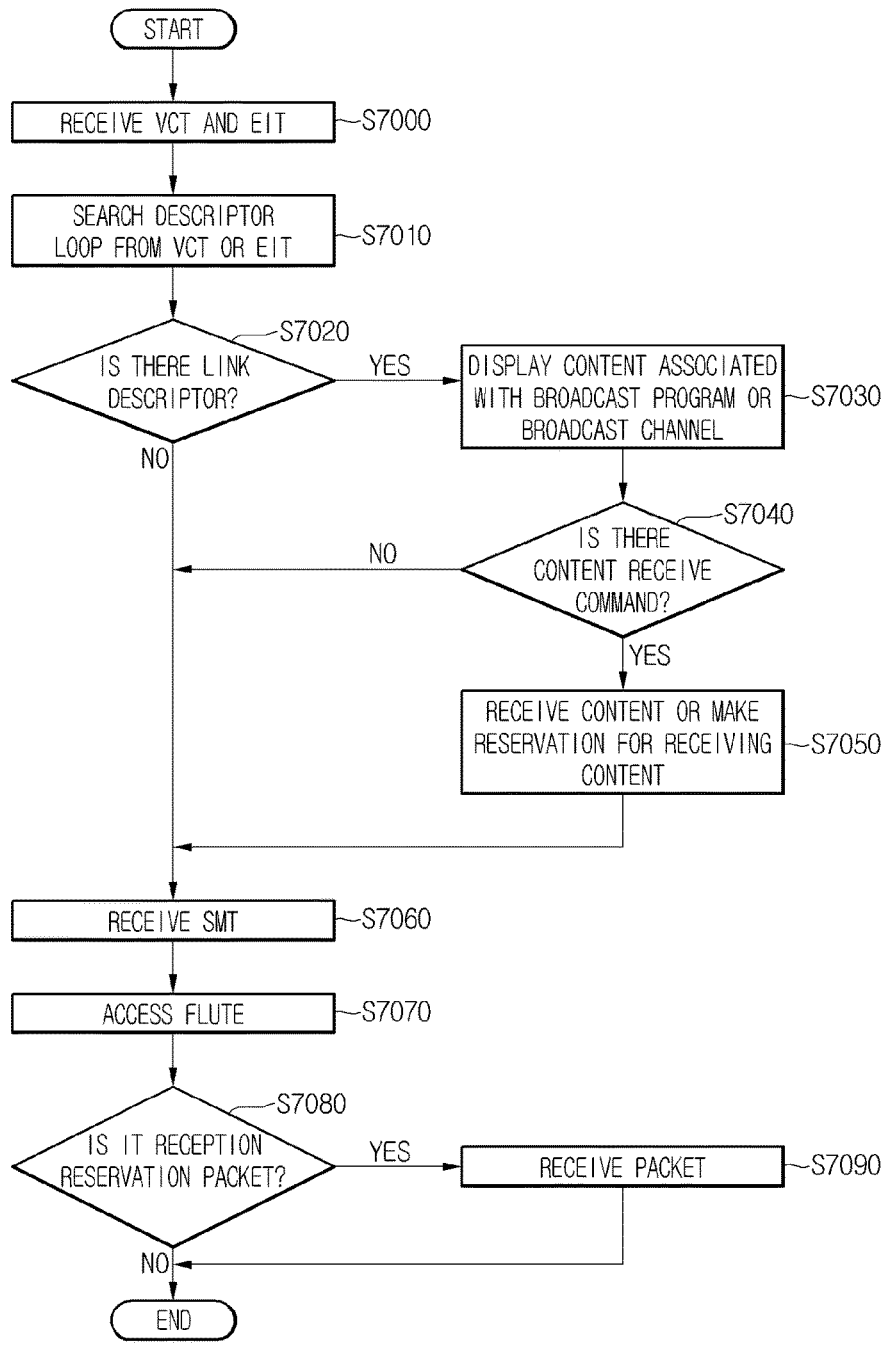
FIG. 50 is a flowchart illustrating an operation of receiving by the receiver 300 broadcast program or broadcast channel related contents by using a link descriptor according to an embodiment of the present invention.

FIG. 50 is a flowchart illustrating an operation of receiving by the receiver 300 broadcast program or broadcast channel related contents by using the link descriptor according to an embodiment of the present invention.

Referring to FIG. 50, when the receiver 300 is turned on, it receives a VCT or an EIT by receiving a PSIP table through a PSIP/PSI handler or service manager in operation S7000. The PSIP/PSI handler or service manager 350 of the receiver 300 parses each table of the PSIP table and obtains VCT or EIT from the parsed tables.

Also, the service manager 350 of the receiver 300 searches for a descriptor loop from the received VCT or EIT in operation S7010. Then, the service manager 350 of the receiver 300 determines whether there is a link descriptor through searching in operation S7020. The service manager 350 of the receiver 300 searches for descriptors in a descriptor loop and if a descriptor_tag field is identical to that of a predetermined link descriptor, it is determined that there is a link descriptor.

Also, when it is determined that there is a link descriptor, the service manager 350 of the receiver 300 extracts link information from the link descriptor, and based on the extracted link information, displays a broadcast program including the link descriptor or a broadcast channel related content list in operation S7030. Link information may include at least one of a link_type field, a link_media field, a mime_type field, a description field, and a link_byte field. The service manager 350 of the receiver 300 generates a list of contents linked with a specific broadcast channel or broadcast program on the basis of the extracted link information, for example, at least one of a related internet site address, thumbnail, a preview clip, extended EPG information, highlight information, multiview information, and TDO information, and then displays the list to a user. Therefore, a user may select content to be received from the displayed broadcast channel or broadcast program related content list.

Then, the service manager 350 of the receiver 300 determines whether content is selected and there is a receive instruction in operation S7040. The content may be selected by a user or a predetermined process. The selected content may be content displayed on the above-mentioned displayed broadcast channel or broadcast program related content list. Moreover, a user may input a receive instruction on the selected content, and also a receive instruction on the selected content may be performed by a predetermined process.

Then, when a receive instruction on the selected content is executed, the service manager 350 of the receiver 300 receives corresponding content immediately or perform reception reservation in operation S7050. The case that the reception reservation is performed includes the case that NRT service cannot be received because an SMT is not received, the case that a user sets to receive content after a predetermined time, or the case that NRT service to be received is TDO service that is real-time linked with a broadcast program.

Moreover, when the link information of content to be received includes a site address accessible through internet, the service manager 350 of the receiver 300 accesses a corresponding site and displays a broadcast channel or program related home page. Furthermore, when the content to be received is one of thumbnail, preview clip, extended EPG information, highlight information, and multiview information, the service manager 350 of the receiver 300 may download it through internet or another path and then, may display it.

Then, when contents reserved for reception is NRT service, the service manager 350 of the receiver 300 receives an SMT to identify corresponding NRT service in operation S7060. Then, the service manager 350 of the receiver 300 accesses a FLUTE session through the above-mentioned method in operation S7070 and identifies a packet for the content reserved for reception among packets of a content item file configuring NRT service in operation S7080. Then, the service manager 350 of the receiver 300 receives the identified packets for the content reserved for reception through FLUTE or an internet network in operation S7090.

In more detail, since the link information extracted from the link descriptor includes service_id and content_linkage information of NRT service, the service manager 350 of the receiver 300 receives and identifies the content reserved for reception, that is, a reserved packetized content item of NRT service, through the FLUTE session on the basis of the service_id and content_linkage information. The service manager 350 of the receiver 300, for example, extracts NRT service identification information from link_byte in the link descriptor as shown in FIG. 46, and receives an NRT service linked with a corresponding program through an SMT, an NRT-IT, and a FLUTE. Accordingly, the service manager 350 of the receiver 300 provides the information on content linked with a broadcast channel or broadcast program that is broadcasted currently or in the future through a VCT or an EIT. Moreover, the service manager 350 of the receiver 300 receives the selected content immediately through an internet network or NRT service or receives the content reserved for reception after a predetermined time. For example, as mentioned above, the receiver 300 obtains URL information of content items on the basis of NRT_IT and receives files configuring the selected content item of NRT service on the basis of the obtained URL information through an internet network.

Figure 51:
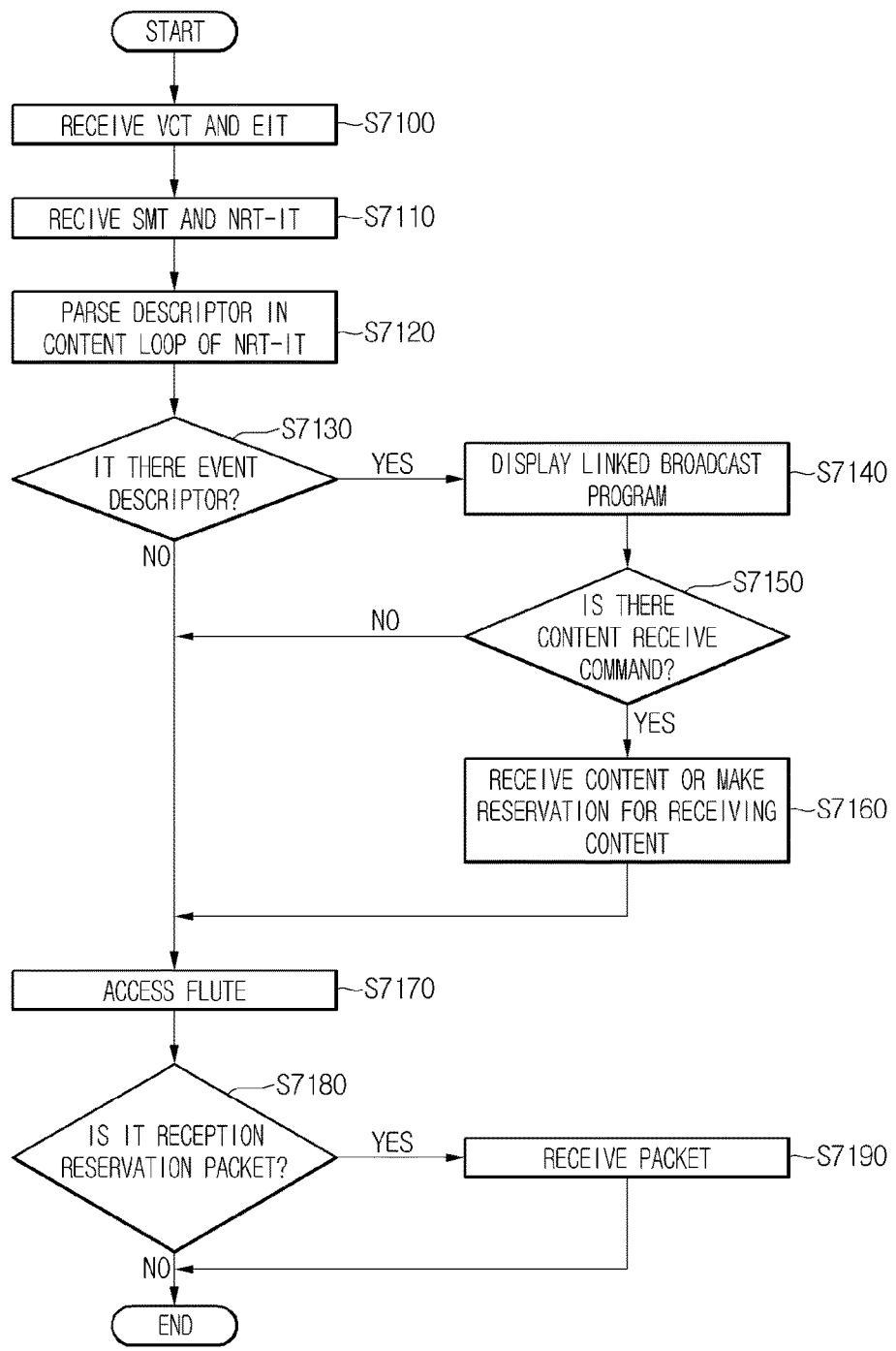
FIG. 51 is a flowchart illustrating an operation of providing by the receiver 300 broadcast program related content by using an event descriptor according to an embodiment of the present invention.

FIG. 51 is a flowchart illustrating an operation of providing by the receiver 300 broadcast program related content by using an event descriptor according to an embodiment of the present invention.

According to an embodiment of the present invention, as shown in FIG. 51, the transmitter 200 inserts broadcast program information linked with NRT service into the event descriptor and inserts the event descriptor into a content loop of NRT-IT to be transmitted to the receiver 300 through a broadcast channel or NRT service signaling channel.

When NRT-IT including the event descriptor is transmitted in such a way, a PSIP/PSI handler or service manager 350 of the receiver 300 parses a PSIP table to obtain a VCT and an EIT in operation S7100. The receiver 300 may provide information on a broadcast channel and broadcast program selected through a VCT and an EIT to a user.

Also, the service manager 350 of the receiver 300 determines whether NRT service is transmitted through an NRT service signaling channel or an internet network, and receives an SMT and an NRT-IT when NRT service is transmitted in operation S7120.

Then, the service manager 350 of the receiver 300 searches for a content loop of an NRT-IT and parses descriptor_tag of each descriptor to identify descriptors in the content loop in operation S7120. Then, the service manager 350 of the receiver 300 determines whether there is an event descriptor in the parsed descriptor in operation S7130.

If there is an event descriptor, the service manager 350 of the receiver 300 displays broadcast channel information or broadcast program information in the event descriptor (for example, a broadcast channel number based on source_id or broadcast program EPG information based on event_id) in operation S7140, and represents that the information is linked with receivable NRT service.

Then, the service manager 350 of the receiver 300 determines whether the content of NRT service linked with a broadcast program is selected and there is a receive instruction in operation S7150. The content may be selected by a user or a predetermined process. For example, when a broadcast program that a user wants to view is selected, a receive instruction on NRT service linked with a corresponding broadcast program is performed. Moreover, when an NRT service that a user wants to receive is selected, a content receiving instruction is executed.

Then, when a receive instruction on the selected content is executed, the service manager 350 of the receiver 300 receives corresponding content immediately or perform reception reservation in operation S7160. According to an embodiment of the present invention, the selected content may be NRT service. Accordingly, the service manager 350 of the receiver 300 accesses a FLUTE session or internet network on the basis of the pre-received SMT and NRT-IT to receive the selected content such as NRT service in operation S7170. For example, as mentioned above, the receiver 300 obtains URL information of content items on the basis of an NRT_IT and then, confirms packets of the selected content item file.

Then, as shown in FIG. 50, the service manager 350 of the receiver 300 identifies a packet for content reserved for reception among packets of a content item file configuring NRT service in operation S7180. Then, the service manager 350 of the receiver 300 receives the identified packets for the content reserved for reception through FLUTE or an internet network in operation S7190.

In such a way, the transmitter 200 inserts the event descriptor into a content loop of an NRT-IT and also includes information on a broadcast program linked with NRT service in the event descriptor to transmit it. Moreover, the service manager 350 of the receiver 300 provides to a user the information on a broadcast channel or broadcast program that is currently transmitted based on the event descriptor of an NRT-IT.

Moreover, NRT service such as TDO may be signaled through an SMT or an NRT-IT, as mentioned above. Especially, if the service_category field of the SMT is a specific value, for example, it indicates that 0x0E, a service signaled through the SMT is NRT service. Additionally, the SMT may include a Service level descriptor to indicate an attribute of NRT service transmitted. A service level descriptor in the SMT may be in plurality and, for example, may be at least one of a Protocol Version Descriptor, an NRT Service Descriptor, a Capabilities Descriptor, an Icon Descriptor, an ISO-639 Language Descriptor, a Receiver Targeting Descriptor, a Genre Descriptor, and an ATSC Private information Descriptor. By using such a service level descriptor, the transmitter 200 transmits information on NRT service and the receiver 300 operates according to the NRT service information. However, a currently used service level descriptor may not include information specified to the TDO suggested by the present invention. Therefore, a service level descriptor to deliver information on a TDO is required.

FIG. 52 is a view illustrating a syntax of NRT_service_descriptor, that is, a service level descriptor.

As shown in FIG. 52, NRT_service_descriptor in service level descriptors may include information on NRT service transmitted. The information on NRT service may include auto update, the length of content, save reservation information, or consumption_model information.

Especially, a consumption model field in a box may include information on a service providing method of NRT service transmitted. Accordingly, the service manager 350 of the receiver 300 determines a proper processing method according to each NRT service on the basis of the consumption_model field, and provides NRT service according to the determined method.

According to an embodiment of the present invention, the transmitter 200 presets an NRT service providing method applicable to an TDO and allocates a specific value to the consumption_model field to correspond to the TDO. Accordingly, the transmitter 200 may allocate a value corresponding to a TDO to the consumption_model field and then transmit it.

Then, the service manager 350 of the receiver 300 receives the consumption_model field and determines that an TDO is transmitted and then, receives the TDO according to a predetermined service providing method to provide it.

therefore, according to an embodiment of the present invention, when the consumption_model field indicates a value corresponding to a TDO, for example, when the consumption_model field is 0x04, the service manager 350 of the receiver 300 determines that NRT service is TDO service, and operates according to a service providing method thereof. A service providing method according to a TDO consumption model of the receiver 300 will be described later.

FIG. 53 is a view illustrating a meaning according to each value of a consumption_model field in NRT_service_descriptor according to an embodiment of the present invention.

The consumption_model field is included in NRT_service_descriptor and is a field indicating which method for consumption_model NRT service that NRT_service_descriptor indicates uses. NRT service may be provided according to a consumption model of one of Browse&Download service, portal service, and push. Additionally, NRT service may be provided depending on a TDO consumption model according to an embodiment of the present invention. Accordingly, the meaning of a value of a consumption_model field and an operation of a receiver suggested by the present invention will be described.

First, when a value of the consumption_model field is 0x00, it indicates that NRT service is not transmitted (forbidden).

Also, when a value of the consumption_model field is 0x01, it indicates that a corresponding NRT service is provided through a Browse&Download method. In this case, the service manager 350 of the receiver 300 browses a corresponding NRT service, and when content is selected, downloads the selected content.

When a value of the consumption_model field is 0x02, it indicates that a corresponding NRT service is provided through a Portal method. In this case, a corresponding NRT service may be provided through a method of accessing a web browser. Accordingly, files transmitted/received through a FLUTE session linked with a corresponding NRT service may include files for text or graphic rendering.

When a value of the consumption_model field is 0x03, it indicates that a corresponding NRT service is provided through a Push method. In this case, a corresponding NRT service may be provided based on a request of a user or the receiver 300. Additionally, the service manager 350 of the receiver 300 may allow a user to select whether to perform automatic update of content linked with a corresponding NRT service. If a user selects automatic update, the service manager 350 of the receiver 300 stores content linked with corresponding service to a cache, and automatically updates files to a new version. Also, when a user returns to the requested Push service, the service manager 350 of the receiver 300 may display preloaded content.

In addition, when a value of the consumption_model field is 0x04, it indicates that a corresponding NRT service is provided according to a TDO consumption model. In this case, the service manager 350 of the receiver 300 determines that NRT service such as a TDO is transmitted based on the consumption_model field and operates the NRT service in linkage with real-time broadcast.

In more detail, when the consumption_model field is a TDO consumption model, the service manager 350 of the receiver 300 receives a corresponding NRT service (TDO), and by using at least one of the link descriptor or event descriptor, obtains NRT service related real-time broadcast channel or program information. Additionally, the service manager 350 of the receiver 300 may receive a trigger included in real-time broadcast to operate a TDO at a specific time or may download a content item in advance.

Moreover, in the case of a TDO consumption model, when each content item is displayed in a currently selected NRT service, it may be downloaded immediately. When an update version of each content item is displayed in a currently selected NRT service, it may be updated immediately. Also, each content item may be executed or terminated by a trigger.

FIG. 54 is a flowchart illustrating an operation of the receiver 300 when a TDO is transmitted by a TDO consumption model according to an embodiment of the present invention.

First, the receiver 300 receives an SMT in operation S8000, and parses a service level descriptor in operation S8010. The receiver 300 may receive an SMT through a service signaling channel by using the service manager 350, and may parse service level descriptors including an NRT descriptor in a service level descriptor loop in each NRT service loop.

Then, the receiver 300 confirms NRT_service_descriptor in the parsed each service level descriptor, and determines whether a value of the consumption_model field in NRT_service_descriptor is 0x04, i.e., a TDO consumption model, in operation S8030. If the value is not 0x04, the receiver 300 operates according to another NRT service consumption model.

However, if the value is 0x04, the receiver 300 determines that an NRT service designated as a TDO consumption model is transmitted. In this case, the receiver 300 determines whether a TDO automatic reception is set in operation S8040. If the automatic reception is not set, the receiver 300 displays TDO service and a list of contents in the TDO service, and displays a TDO reception selection screen in operation S8045. Then, the receiver 300 receives a TDO service selected by a user in operation S8047.

Moreover, when the automatic reception is set, the receiver 300 receives a TDO without a user's selection in operation S8050. Here, the receiver 300 may receive a TDO at a specific time regardless of a user's selection. For example, the receiver 300 may automatically receive and store a TDO in the background without a user's selection while not displaying to a user that the TDO is being received. Whether to execute the TDO is determined by a user's input, or may be received by the receiver 300 before the trigger time of the TDO. Additionally, the receiver 300 receives the TDO without a user's selection, so that it may smoothly operate in linkage with real-time broadcast during the execution of the TDO.

Then, the receiver 300 determines whether a trigger is received after receiving the TDO in operation S8060. The receiver 300 determines whether a trigger corresponding to the TDO is received through the trigger receiver 331. Also, when the trigger is received, the receiver 300 extracts a trigger time and a trigger action from the trigger through the service manager 350, and applies the trigger action to the TDO in ready at the trigger time in operation S8070. For example, the trigger target TDO may shift from one state of a non-ready state, a released state, a ready state, an active state, and a suspended state into another state. Accordingly, the receiver 300 may perform a shift operation according to a TDO state on the basis of the trigger action at the trigger time. As mentioned above, since the TDO is received automatically without a user's selection, and the trigger action is performed at the trigger time, the receiver 300 receives the TDO before the trigger time and prepares the TDO to be ready in the background before the trigger time.

Additionally, the receiver 300 receives and manages an NRT service that a user selects through the service manager 350. However, in the case of TDO service, since it operates in linkage with real-time broadcast and is triggered by a trigger, storing and managing the TDO service may be accomplished according to the intentions of real-time broadcast service providers.

Therefore, according to an embodiment of the present invention, in the case of a TDO consumption model type in which TDO service is transmitted, the receiver 300 allocates a predetermined area of a storage unit as a TDO storage area, and then, receives TDO service, stores the received TDO service in the allocated area, and manages it. Furthermore, the TDO storage area is designated by the transmitter 200, and then, the TDO service is transmitted to the receiver 300. In this case, the receiver 300 may receive, store, and manage the TDO service in the allocated area.

Figures 55, 56:
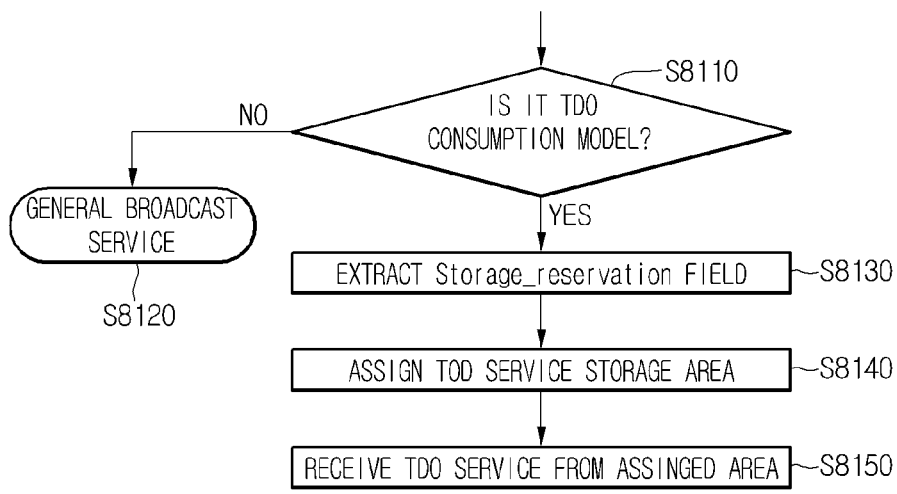
FIG. 55 is a flowchart illustrating a method of allocating and managing a TDO storage area according to a TDO consumption model according to an embodiment of the present invention.
FIG. 56 is a view illustrating a TDO metadata descriptor according to an embodiment of the present invention.

FIG. 55 is a flowchart illustrating a method of allocating and managing by the receiver 300 a TDO storage area according to a TDO consumption model.

Referring to FIG. 55, first, the receiver 300 determines a consumption model of NRT service transmitted after operations S8000 to S8020 of FIG. 54 are performed. Then, the receiver 300 determines whether an NRT service of a TDO consumption model type, for example, TDO service, is transmitted based on a consumption model field in operation S8110.

When the consumption model field indicates a TDO consumption model, the receiver 300 extracts a storage_reservation field of NRT_service_descriptor in operation S8310. The storage_reservation field may be a value corresponding to a storage space essential for a corresponding TDO service. The transmitter 200 may designate a space value for TDO storage area in the storage_reservation field and transmits it.

Then, the receiver 300 allocates a storage area for TDO service reception and operation on the basis on the storage_reservation field value in operation S8140. The receiver 300 allocates an area designated in the storage_reservation field or a predetermined TDO service reception area as a storage area for TDO service, and separates the storage area from another area of a storage unit and manages it. Additionally, the receiver 300 maintains the storage space size of the allocated area continuously and uniformly. Accordingly, a broadcast service provider provides extended NRT service such as a TDO continuously.

Then, the receiver 300 receives TDO service in an area allocated as a TDO service storage area in operation 8150 and stores and manages the received TDO service.

In such a way, the receiver 300 allocates a storage area for TDO service and manages it on the basis of the consumption model field and storage reservation field of NRT service. However, the above method is just one embodiment and is not limited to a storage method according to each value of a consumption model field and a storage reservation field. Accordingly, the receiver 300 determines whether to store TDO service on the basis of a consumption model field value and a storage reservation field value, and determine whether to receive TDO service on the basis of a current storage reservation field value and the size of a remaining space of a storage unit. Furthermore, when receiving a plurality of TDOs, the receiver 300 designates a predetermined area of a storage unit according to each TDO and manages it, or allocates a comprehensive area for TDO service in a storage unit to receive a plurality of TDOs.

Moreover, a TDO may mean an NRT service providing a TDO, or each of content items configuring TDO service. Moreover, each content item is signaled through an NRT-IT, and the receiver 300 receives data signaled through the NRT-IT and recognizes information on a TDO. However, NRT-IT does not include information for TDO, for example, a trigger time, an execution termination time, an execution priority, and an additional data receiving path, besides information provided for general NRT service. Accordingly, it is difficult for the receiver 300 to understand the attribute of a TDO in detail and operates smoothly. Especially, when the receiver 300 manages a storage space, TDO services of a plurality of TDOs provided, or additional data of TDO service, information on TDO is insufficient.

Therefore, according to an embodiment of the present invention, a method of including specific property information of a TDO in TDO metadata and an operation of the receiver 300 according thereto are suggested.

FIG. 56 is a view illustrating a TDO metadata descriptor according to an embodiment of the present invention.

Referring to FIG. 56, TDO metadata includes a descriptor_tag field, a descriptor_length field, a scheduled_activation_start_time field, a scheduled_activation_end_time field, a priority field, an activation_repeat_flag field, and a repeat_interval field.

The descriptor_tag field may have a value to distinguish this descriptor as a TDO metadata descriptor.

The descriptor_length field may be an 8-bit unsigned integer to define the length from a field immediately following this field to the end of a TDO metadata descriptor.

The scheduled_activation_start_time field may be a 32-bit unsigned integer indicating the fastest scheduled activation start time obtained by calculating GPS sec from the time 00:00:00 UTC on 6 Jan. 1980. When the scheduled_activation_start_time field is 0, it indicates that an activation start time of TDO is already passed.

The scheduled_activation_end_time field may be a 32-bit unsigned integer indicating the fastest scheduled activation end time obtained by calculating GPS sec from the time 00:00:00 UTC on 6 Jan. 1980. When the scheduled_activation_end_time field is 0, it indicates that an activation end time of TDO is not designated. Accordingly, when the scheduled_activation_end_time field is 0, the receiver 300 continuously provides service after the scheduled_activation_start_time.

The scheduled_activation_start_time field and the scheduled_activation_start_time field may be used to allow the receiver 300 to synchronize a TDO with real-time broadcast and operate it. Additionally, the receiver 300 may selectively download a TDO on the basis of the scheduled_activation_start_time field and the scheduled_activation_start_time field and may determine the download order of TDOs. Additionally, the receiver 300 may determine the deletion order of TDOs on the basis of the scheduled_activation_start_time field and the scheduled_activation_start_time field. Especially, the receiver 300 identifies a TDO having a scheduled_activation_start_time field value closest to the current time (i.e., a TDO to be activated first), and downloads and stores the identified TDO first. Additionally, the receiver 300 may delete a TDO having a scheduled_activation_start_time field value that is the latest from the current time if a storage space is insufficient.

Moreover, a priority field may be an 8-bit unsigned integer indicating the priority of a TDO service or a content item. The receiver 300 determines that as a value of the priority field is higher or lower, a higher priority is provided. Moreover, the receiver 300 may sequentially receive or store a plurality of TDOs on the basis of a priority field allocated to each TDO. Moreover, the receiver 300 may execute at least one of a plurality of TDOs on the basis of a priority field allocated to each TDO.

Also, since a target TDO executed by a trigger at a trigger time may be one but a TDO executable at one time may be in plurality, a priority designation for each TDO is necessary. Accordingly, when a TDO (service or a content item) is in plurality, the transmitter 200 designates each priority by using the above-mentioned priority field.

Moreover, the receiver 300 may sequentially download TDOs on the basis of the priority field. Moreover, the receiver 300 may display a plurality of TDOs executable at a specific time on the basis of a priority field. For example, although displaying a plurality of TDOs executable at a specific time, the receiver 300 positions and displays a TDO having a high priority on a top list. Accordingly, a user recognizes priority information through a displayed list, and efficient selection of a TDO according to priority information becomes possible.

Moreover, the receiver 300 may automatically execute a TDO on the basis of such a priority field. For example, if there are a plurality of TDOs to be executed within a specific time range, the receiver 300 selects a TDO having a high or low priority field and automatically executes it on the basis of a priority field corresponding to each TDO.

An activation_repeat_flag field may be a 1-bit Boolean flag indicating whether a repeat_interval field is included in this descriptor.

The repeat_interval field may be an 8-bit unsigned integer to indicate the repeat interval of an activation schedule time. The repeat_interval field may indicate the execution period of a TDO. Accordingly, the receiver 300 may receive a TDO or manages a storage unit on the basis of the repeat_interval field. The repeat_interval field may mean the execution period of a TDO according to each value as shown in Table 4.

TABLE 4

| VALUE | MEANING |
|---|---|
| 0 | Reserved |
| 1 | Every day |
| 2 | Every week 4-6 times |
| 3 | Every week 2-3 times |
| 4 | Every week |
| 5 | Biweekly |
| 6 | Every month |
| 7 | Once in two months |
| 8 | Once a quarter |
| 9 | Once in six months |
| 10 | Every year |
| 11-255 | Reserved |

In such a way, the transmitter 200 may transmit a TDO metadata descriptor through an NRT service signaling channel or an internet network. Additionally, the transmitter 200 inserts a TDO metadata descriptor into a content_level_descriptor loop of NRT-IT to transmit additional information on a corresponding TDO.

Moreover, the receiver 300 may receive TDO metadata through an NRT service signaling channel or an internet network to obtain information on a TDO. The receiver 300 receives NRT-IT to search for a content level descriptor loop and obtains TDO metadata. Furthermore, when TDO metadata is transmitted through an internet network, the receiver 300 accesses a FLUTE session for receiving a corresponding TDO service and receives FDT, and also receives TDO metadata from an internet network through URL information of a content location field for each file.

Figure 57:
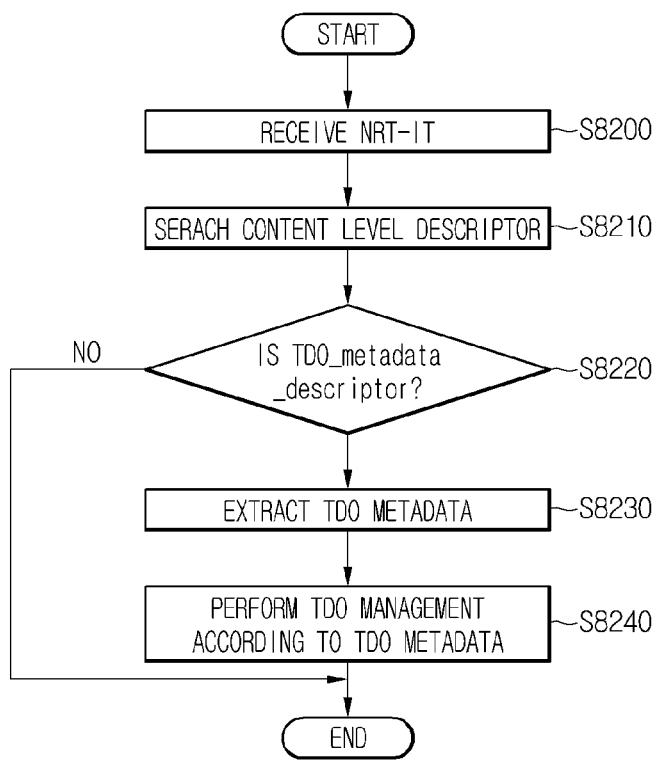
FIG. 57 is a flowchart illustrating an operation of receiving by the receiver 300 TDO metadata according to an embodiment of the present invention.

FIG. 57 is a flowchart illustrating an operation of receiving by the receiver 300 TDO metadata according to an embodiment of the present invention.

Referring to FIG. 57, the receiver 300 receives an SMT and an NRT-IT transmitted through a service signaling channel in operation S8200.

According to an embodiment, the transmitter 200 includes a TDO metadata descriptor in a content level descriptor loop and then, transmits it. Accordingly, the receiver 300 searches for the content level descriptor loop of the received NRT-IT in operation S8220 and then, determines whether there is a TDO metadata descriptor in operation S8220. The receiver 300 determines whether the descriptor tag field value of each descriptor corresponds to TDO_metadata_descriptor, and thus, determines whether there is a TDO metadata descriptor.

Then, if there is a TDO metadata descriptor, the receiver 300 extracts TDO metadata from a TDO metadata descriptor in operation S8230. As mentioned above, the TDO metadata may include at least one of scheduled activation start or end time information, priority information, related data reception information, and repeat interval information. Additionally, the related data reception information may include additional data on a corresponding TDO or reception path information of additional data.

Then, the receiver 300 obtains necessary information from the extracted TDO metadata and manages a TDO on the basis of the obtained information in operation S8240. The receiver 300 manages a TDO by receiving, storing, or deleting the TDO according to a predetermined condition on the basis of the TDO metadata. Moreover, the receiver 300 may receive related data that a service provider provides about a corresponding TDO on the basis of TDO metadata. For example, when a TDO is in execution, the receiver 300 extracts related data reception information from TDO metadata, receives additional action information on the TDO in execution through a broadcast channel or an internet network on the basis of the related data reception, and applies the received additional action to the TDO in execution.

Figure 58:
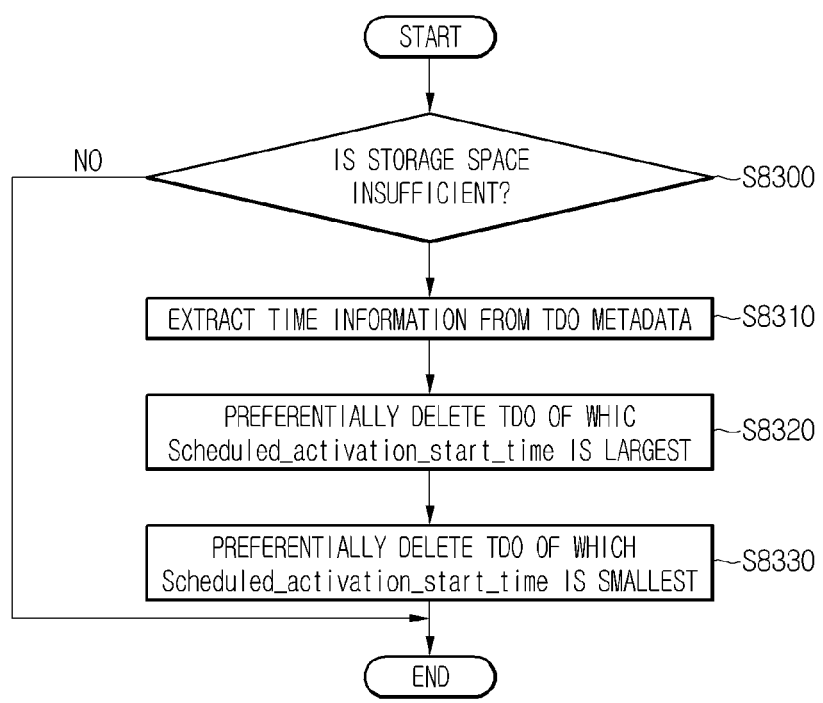
FIG. 58 is a flowchart illustrating a method of the receiver 300 to manage a TDO depending on time information in TDO metadata according to an embodiment of the present invention.

FIG. 58 is a flowchart illustrating a method of the receiver 300 to manage a TDO depending on time information in TDO metadata according to an embodiment of the present invention.

Referring to FIG. 58, the receiver 300 determines whether a storage space for TDO is insufficient in a storage unit in operation S8300. As mentioned above, the storage space may be a predetermined area of a storage unit for storing TDOs. Additionally, the receiver 300 determines a storage space necessary for TDO reception on the basis of an NRT service descriptor before receiving a TDO, and determines whether a storage space is insufficient in comparison to the remaining space of a current storage unit.

Then, if it is determined that a storage space is insufficient, the receiver 300 extracts time information from the TDO metadata on each TDO in operation S8310. Time information may include a scheduled activation start time or end time field of a TDO metadata descriptor. Moreover, the receiver 300 obtains TDO metadata on each TDO from a content level descriptor loop of NRT-IT as mentioned above, and extracts time information from the obtained TDO metadata.

Then, the receiver 300 first deletes a TDO having the largest value of a scheduled activation start time field on the basis of a scheduled activation start time for each TDO in operation S8320. As a scheduled activation start time is greater, the current needs may be reduced. Therefore, the receiver 300 first deletes a TDO to be executed at the time that is the farthest from the current time, so that storage space may be obtained.

Then, the receiver 300 first receives a TDO having the smallest value of a scheduled activation start time field on the basis of a scheduled activation start time for each TDO in operation S8330. As the scheduled activation start time value of a TDO is smaller, since the TDO is executed soon, if a storage space is insufficient, the receiver 300 first receives a TDO whose active start time reaches in the fastest time, so that reception is completed within a trigger time.

In addition, time information in TDO metadata may include a time slot descriptor for providing activation time information of a TDO in addition to scheduled activation start and end time fields. The time slot descriptor may include a slot start time, a slot length, and repeat information, by using a time at which a TDO is performed as one slot. Accordingly, the receiver 300 extracts a time slot at which a TDO is activated, so as to predict a repeated execution and end time of the TDO.

Figures 59, 60:
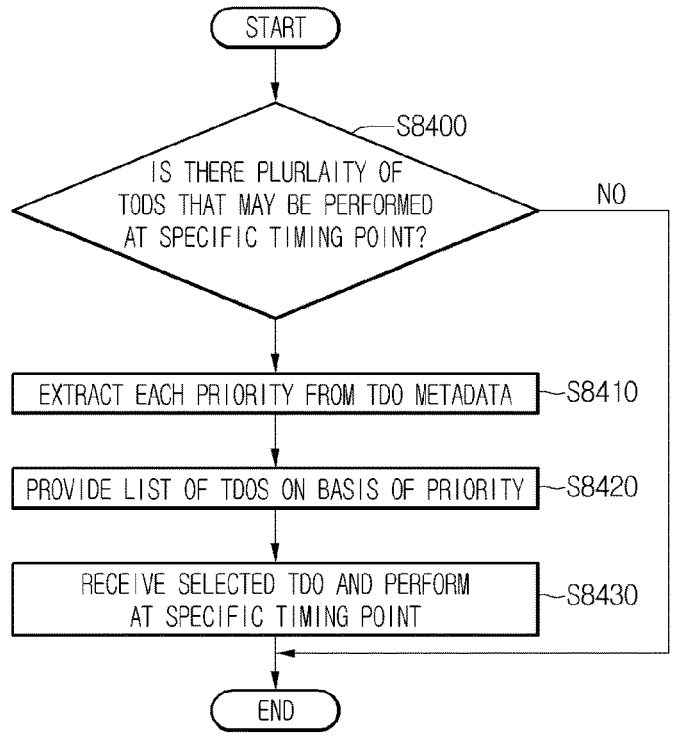
FIG. 59 is a flowchart illustrating a method of the receiver 300 to manage a TDO depending on time information and priority information in TDO metadata according to another embodiment of the present invention.
FIG. 60 is a view illustrating a syntax of an internet location descriptor according to an embodiment of the present invention.

FIG. 59 is a flowchart illustrating a method of the receiver 300 to manage a TDO depending on time information and priority information in TDO metadata according to another embodiment of the present invention.

Referring to FIG. 59, first, the receiver 300 receives TDO metadata, and determines whether there are a plurality of TDOs executable at a specific time in operation S8400. The receiver 300 extracts TDO metadata in a content descriptor loop of NRT-IT through a service signaling channel as mentioned above, and then receives TDO metadata corresponding to each TDO. Then, the receiver 300 may determine whether there are a plurality of TDOs executable at the same time on the basis of the scheduled activation start time field of the extracted each TDO metadata. When there are a plurality of TDOs having the same scheduled activation start time field value or a plurality of TDOs whose scheduled activation start time field value is within a predetermined time range, the receiver 300 determines that there are a plurality of TDOs executable at the same time.

Also, when it is determined that there are a plurality of TDOs, the receiver 300 extracts a priority value for each TDO from the TDO metadata in operation S8410. The priority value is extracted from a priority field in the TDO metadata descriptor. Additionally, the receiver 300 matches a priority in the TDO metadata to each of a plurality of TDOs executable at the same time and then, stores them.

Then, the receiver 300 provides a list of a plurality of TDO executable at a specific time to a user on the basis of the extracted priority. The receiver 300 displays a list of a plurality of TDOs executable at a specific time or after a predetermined time in addition to a priority to a user, so that this leads to a user's selection. Additionally, the receiver 300 places a TDO having a high priority on the upper side of a TDO list and displays it so that priority information for each TDO may be provided together. Accordingly, a user sets which TDO is selected and performed at a specific time with reference to a TDO list, and selects which TDO is received and stored.

Then, when a TDO is selected by a user, the receiver 300 receives the selected TDO, and performs a trigger action on the selected TDO at a specific time, for example, a trigger time. The receiver 300 may omit an operation of receiving the selected TDO if the selected TDO is received and stored already. Moreover, the receiver 300 deletes the selected TDO from a storage unit, so that a storage space is obtained.

According to an embodiment, the receiver 300 receives and stores a TDO on the basis of priority information according to setting without a user's selection, and then performs a trigger action. Moreover, when there are a plurality of TDOs executable at the same time, the receiver 300 receives a TDO having a high priority first and stores it, and perform a trigger action on a TDO having a high priority at a corresponding time.

Furthermore, according to an embodiment, the transmitter 200 may transmit files configuring a content item of NRT service through an internet network. In more detail, the transmitter 200 generates an FDT by including URL information of each file configuring a content item in a content location attribute, and transmits the generated FDT through a FLUTE session. Furthermore, the transmitter 200 may designate the URL of content item files transmitted through a broadcast network and an IP network by using an internet location descriptor. This internet location descriptor may be included in a content level descriptor loop of an NRT-IT. Accordingly, the transmitter 200 includes URL information on internet where each file placed in an internet location descriptor and transmits it.

One example of such an internet location descriptor is described with reference to FIG. 60.

FIG. 60 is a view illustrating a syntax of an internet location descriptor according to an embodiment of the present invention.

As shown in FIG. 60, the internet location descriptor includes a descriptor_tag field, a descriptor_length field, a URL_count field, a URL_length field, and a URL( ) field.

The descriptor_tag field may be an 8-bit unsigned integer to distinguish this descriptor as an internet location descriptor. For example, this field may have a 0xC9 value.

The descriptor_length field may be an 8-bit unsigned integer to define the length from a field immediately following this field to the end of an internet location descriptor.

The URL_count field may be a 5-bit unsigned integer to indicate the number of pairs of URL length fields and URL fields in an internet location descriptor. That is, the internet location descriptor includes a plurality of URL length fields whose number corresponds to a URL count field and a plurality of URL fields whose number corresponds to a URL count field.

The URL_length field may be an 8-bit unsigned integer to indicate the length of the URL( ) field immediately following this field.

The URL( ) field is a character string indicating URL. When the URL( ) field indicates Relative URL or absolute tag URI, a corresponding URL may be seen as a content transmitted only through FLUTE of NRT. In other cases, a corresponding URL may be seen as a content only transmitted through a broadcast network, a content transmitted through an IP network, or a content transmitted through both a broadcast network and an IP network.

When the URLs of files configuring a content item are transmitted by using an internet location descriptor, a URL corresponding to each file is designated and needs to be included in an internet location descriptor. However, when the number of files is increased, the number of URLs to be designated is increased, so that transmission efficiency may be reduced. Moreover, the number of URLs is increased, their management becomes complex and difficult.

Accordingly, the transmitter 200 according to an embodiment of the present invention includes list information of URLs corresponding to each file in a FLUTE file description table (FDT), and transmits the FDT through an internet network instead of a FLUTE session. The transmitter 200 may transmit list information of URLs or an FDT by using the internet location descriptor, and also may transmit list information of URLs or an FDT by using the link descriptor.

Also, related information between each file and a content item may be designated by a content linkage field in an FDT. Additionally, when the URL of the FDT is transmitted through an internet location descriptor, since a list of files configuring a content item is included in the FDT, the receiver 300 may determine a relationship between a content item and each file without a content linkage field. For example, the receiver 300 parses a content level descriptor loop of a content item to be received on the basis of NRT-IT, extracts the URL of the FDT from an internet location descriptor in the content level descriptor loop, and receives the FDT through an internet network, so that it obtains a list of files configuring the content item to be received.

The receiver 300 receives URL information of the FDT located through a link descriptor or an internet location descriptor, and receives the FDT on the basis of the received URL information through an internet network. Then, the receiver 300 receives files configuring a content item on the basis of URL information of each file in the FDT. In such a way, by transmitting the URL of FDT, it is not necessary to designate a URL to each of a plurality of files. As a result, transmission efficiency may be increased.

Figure 61:
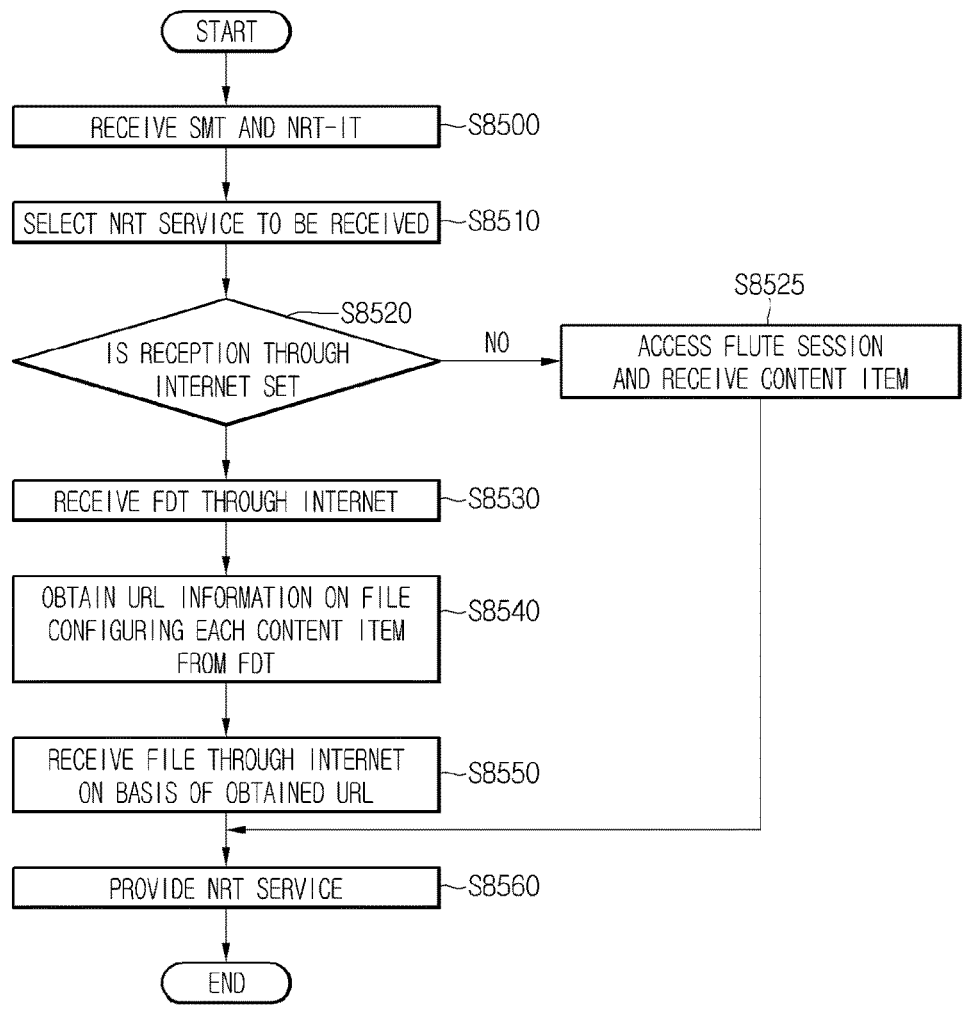
FIG. 61 is a flowchart illustrating an operation of the receiver 300 when an FDT is transmitted through an internet network according to an embodiment of the present invention.

FIG. 61 is a flowchart illustrating an operation of the receiver 300 when FDT is transmitted through an internet network according to an embodiment of the present invention.

Referring to FIG. 61, the receiver 300 first receives an SMT and an NRT-IT through the service manager 350 in operation S8500.

Then, the service manager 350 of the receiver 300 selects NRT service or a content item to be received in operation S8510. The service manager 350 of the receiver 300 selects NRT service to be received according to a predetermined condition. Additionally, the service manager 350 of the receiver 300 selects NRT service to be received according to a user's input.

Then, the service manager 350 of the receiver 300 determines whether to receive each file configuring a content item of the selected NRT service through internet in operation S8520. The service manager 350 of the receiver 300 determines whether to receive each file through internet on the basis of a connection state of the internet network. Additionally, the service manager 350 of the receiver 300 determines whether to receive each file through internet according to a user's setting.

Then, when it is determined that each file is not received through internet, the service manager 350 of the receiver 300 accesses a FLUTE session through an NRT service signaling channel, and receives each file configuring a content item of the selected NRT service in operation S8525. An operation of receiving NRT service through a FLUTE session is described above.

However, when it is determined that each file is received through internet, the service manager 350 of the receiver 300 receives FDT through internet in operation S8530. The service manager of the receiver 300 receives URL information of FDT through a link descriptor or an internet location descriptor, and receives the FDT located on an internet network on the basis of the received URL information of the FDT.

Here, the FDT may include a list index of each file configuring a content item in a FLUTE session. A MIME type designation is necessary in order to additionally transmit the FDT through an internet network. The MIME type means a specific format to indicate the type of a content transmitted through an internet network. Various file formats are registered as MIME types and are used in internet protocols such as HTTP and SIP. The MIME type registration is managed by IANA. MIME may define a message format of a tree structure. According to an embodiment of the present invention, an MIME type corresponding to FDT may be defined as a format such as application/nrt-flute-fdt+xml. Additionally, the receiver 300 parses a URL having the MIME type and, based on this, receives FDT.

When receiving an FDT, the service manager 350 of the receiver 300 obtains URL information of files configuring each content item from the FDT in operation S8540. Then, the service manager 350 of the receiver 300 receives each file on the basis of the obtained URL information through internet in operation S8550. The service manager 350 of the receiver 300 connects the received files on the basis of a content linkage field of the FDT, so that it obtains a content item.

Then, the service manager 350 of the receiver 300 provides NRT service through the received content item in operation S8560.

As mentioned above, since the receiver 300 receives the FDT through internet, it is not necessary to receive URL information of each file and it is possible to efficiently receive NRT service through an internet network. Moreover, according to an embodiment of the present invention, an arbitrary file including a file list (index) may be transmitted instead of FDT.

Figure 62:
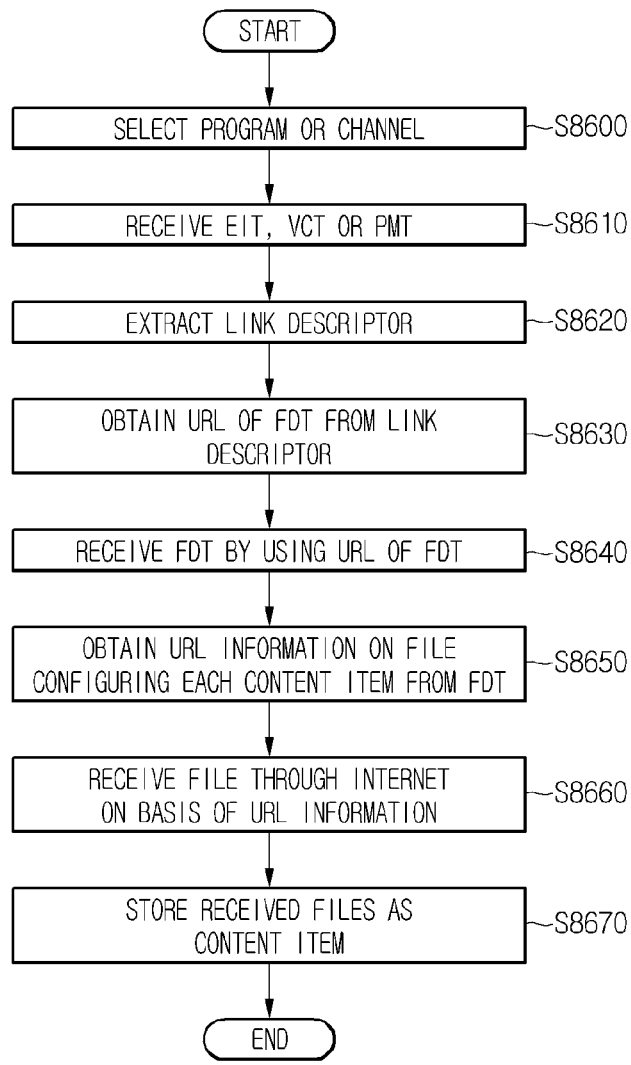
FIG. 62 is a flowchart illustrating an operation of the receiver 300 when the URL of an FDT is transmitted through a link descriptor according to an embodiment of the present invention.

FIG. 62 is a flowchart illustrating an operation of the receiver 300 when the URL of an FDT is transmitted through a link descriptor according to an embodiment of the present invention.

According to an embodiment of the present invention, the transmitter 200 includes the link descriptor in one of EIT, VCT, or PMT and transmits it, and the link descriptor includes URL information for obtaining FDT.

First, when the receiver 300 is turned on, a broadcast channel or a broadcast program is selected in operation S8600.

Then, the receiver 300 receives at least one of an EIT, a VCT, or a PMT through the service manager 350 or a PSIP/PSI handler in operation S8610, extracts a link descriptor in operation S8620, and obtains the URL information of an FDT from the link descriptor in operation S8630.

Here, the link descriptor may be included in the EIT and transmitted as shown in FIG. 46. In this case, the link descriptor includes information linked with a specific broadcast program. Additionally, a link descriptor may include URL information of an FDT in order to receive NRT service linked with the selected broadcast program through internet. Accordingly, the receiver extracts a link descriptor from an event descriptor loop of an EIT corresponding to the selected broadcast program, and obtains URL information of an FDT included in the link descriptor. Especially, when the MIME type field in the link descriptor indicates the MIME type of an FDT, the receiver 300 determines that information indicated by a link byte field is the URL of a FDT file.

Additionally, the link descriptor may be included in a VCT or a PMT and transmitted. In more detail, the link descriptor is included in the descriptor loop of a VCT or the program descriptor loop of a PMT and includes information on a content linked with a specific channel or service. The receiver 300 extracts the link descriptor in a VCT or a PMT, and obtains URL information of a FDT file in the link descriptor through a method that is identical to that of the case that a link descriptor is included in the EIT.

Then, the service manager 350 of the receiver 300 receives an FDT file by using the obtained URL information of the FDT through internet in operation S8640.

Then, the service manager 350 of the receiver 300 obtains URL information of each file included in the FDT in operation S8650. The URL information of each file included in the FDT may include position information on internet of files configuring a content item of NRT service.

Then, the service manager 350 of the receiver 300 receives designated files according to the obtained URL information through internet in operation S8660 and stores the received files as a content item in operation S8670. The service manager 350 of the receiver 300 may store each file as a content item of NRT service on the basis of the content linkage field of the FDT. Additionally, the service manager 350 of the receiver 300 provides to a user NRT service on the basis of the stored content item.

Through such a process, the receiver 300 may receive FDT including a file list configuring a content item of NRT service through an internet network. Moreover, since each file is received based on an FDT through internet, efficient transmission is possible.

Figure 63:
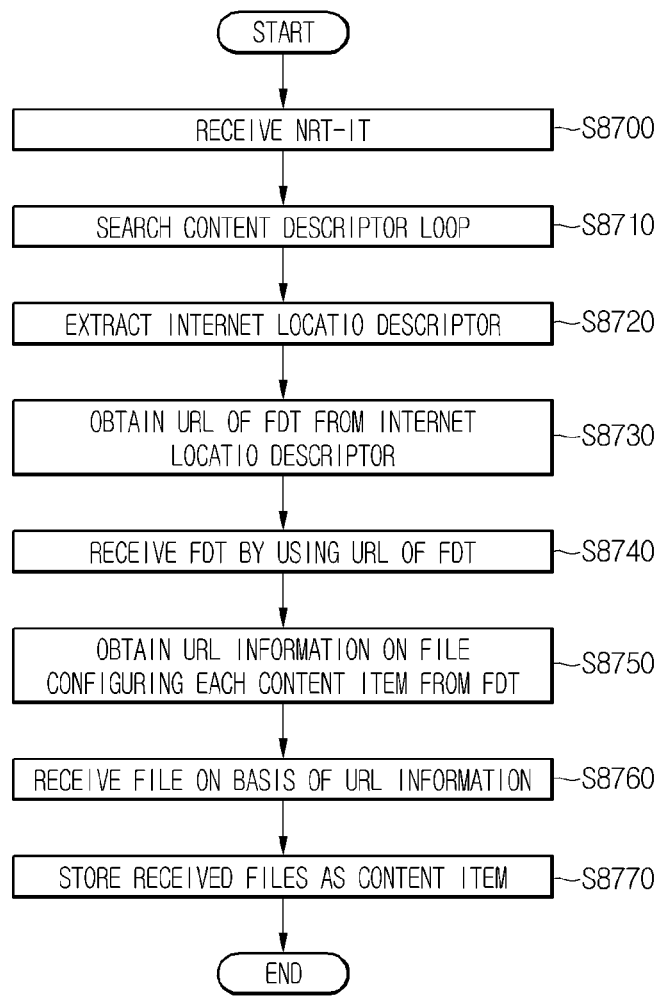
FIG. 63 is a flowchart illustrating an operation of the receiver 300 when the URL of an FDT is transmitted through an NRT-IT according to an embodiment of the present invention.

FIG. 63 is a flowchart illustrating an operation of the receiver 300 when the URL of FDT is transmitted through NRT-IT according to an embodiment of the present invention.

According to an embodiment of the present invention, the transmitter 200 includes the internet location descriptor in a content descriptor loop of an NRT-IT and transmits it, and the internet location descriptor includes URL information for obtaining FDT.

First, the receiver 300 receives the NRT-IT through the service manager 350 in operation S8700.

Then, the receiver 300 extracts an internet location descriptor from a content descriptor loop content_descriptor( ) of the NRT-IT through the service manager 350 in operation S8610, obtains URL information of an FDT from the internet location descriptor in operation S8630, receives the FDT by using the URL information of the FDT through an internet network in operation S8740, and obtains URL information of a file configuring each content item from the FDT in operation S8750.

Here, the receiver 300 receives URL information of FDT through an internet location descriptor, and also receives FDT in access to a FLUTE session through an SMT and an NRT-IT. Additionally, the URL of each file in an FDT may indicate the address of an internet network, and may also indicate a file position in a FLUTE session. Accordingly, the receiver 300 determines the URL format of each file from the FDT, and selectively receives each file through one of a FLUTE session and an internet network according to the determined format.

Additionally, the receiver 300 receives an FDT through an internet network, and receives files configuring a content item in access to a FLUTE session on the basis of the received FDT.

Moreover, the transmitter 200 designates a transmission preferred path when each file is transmittable through both a FLUTE session and an internet network. The transmission priority path may be designated as an attribute of File type: complex type by using xml schema. For example, it may be designated as <xs:attribute name="Internet_preferred" type="s:boolean" use="optional" default="false"/>. Here, internet_preferred means preferred transmission through an internet network, and when a type value is true, it means that preferred transmission through an internet network is performed. Additionally default is defined as false and this indicates that preferred transmission through a FLUTE session is performed by default. Accordingly, the receiver 300 confirms the attribute of each file type to selectively receive each file through one of a FLUTE session and an internet network.

Then, the service manager 350 of the receiver 300 receives designated files according to the obtained URL information of the files through a FLUTE session or an internet network in operation S8760 and stores the received files as a content item in operation S8670.

The service manager 350 of the receiver 300 may store each file as a content item of NRT service on the basis of the content linkage field of the FDT as mentioned above. Additionally, the service manager 350 of the receiver 300 provides to a user NRT service on the basis of the stored content item.

Furthermore, NRT service may include the above-mentioned TDO and an NRT service declarative object (NDO). The receiver 300 may receive a TDO or an NDO to provide NRT service. Moreover, NRT service may include at least one content item, and the receiver 300 may receive at least one content item to provide NRT service. In providing NRT service, the receiver 300 extracts the above-mentioned consumption model field from an NRT service descriptor, and determines a consumption model of NRT service, so that service is provided through different methods according to a consumption model.

A service provider determines a consumption model corresponding to NRT service and then, allocates a consumption model field value corresponding thereto to NRT service and transmits it. A consumption model field may be included in an NRT service descriptor as shown in FIG. 52, and the receiver 300 may operate according to the extracted consumption model field. Although such a consumption model field value and an operation of the receiver 300 are shown in FIG. 53, a more detailed operation will be described below.

A consumption model of NRT service may be Browse and Download. In this case, NRT service may include a selectable content for later download. Additionally, a user interface of NRT service provided from the receiver 300 may indicate selectable content. Also, a user may move between already-downloaded content items through a user interface of NRT service and may select a view command.

In the case of a browser and download consumption model, NRT service may include a plurality of content items. The receiver 300 may download at least one content item that a user selects to download. Here, a content item is downloaded in the background. Additionally, the receiver 300 monitors a content item downloaded for update in the background. The receiver 300 downloads a updated content item if update is confirmed based on a result of monitoring. Additionally, the receiver 300 may not update downloaded content items according to a setting.

Additionally, when at least one content that a user select is downloaded completely, the receiver 300 may launch or present it according to a user's selection. Then, the launched or presented at least one content item may be suspended or paused according to a user's instruction. Additionally, the receiver 300 may resume to launch or present the suspended or paused at least one content according to a user's instruction. In addition, when the launched or presented at least one content item is completed or a user instructs it to be terminated or a user selects to present another content item of browser and download service, the receiver 300 may terminate the launched or presented at least one content item. The receiver 300 may delete one content item when a user instructs to delete it.

Accordingly, a user may launch or present a content item of a browser and download consumption model, or may suspend or pause the launching or presenting, or after a user exit the NRT service and comes back again, may resume the launching or presenting again.

Moreover, a consumption model of NRT service may be Push. In this case, NRT service may include a request based content. For example, the receiver 300 may launch or present a content item included in NRT service according to a request of a user subscribed to an NRT service of a push consumption model. The receiver 300 receives from a user an input on whether an NRT service of a received push model or a content relating thereto is automatically updated.

According to an embodiment of the present invention, the receiver 300 displays topics that a user or subscriber can select in correspondence to content items included in an NRT service of a push consumption model, receives a content item corresponding to the selected topic, and automatically performs updating. Accordingly, a user is allowed to select a content item to be updated automatically. The receiver 300 may provide an updated content item by using a predetermined area of NRT service displayed, and may continuously perform updating. If a user selects a content item for automatic update, the receiver 300 stores a received push model NRT service or a content relating thereto in a cache, and automatically updates files configuring the content to a new version. The receiver 300 may pre-load content and then display it when returning to a push model NRT service that a user requests. Additionally, in the case of a push consumption model, download, launch, suspend, resume, and shutdown are performed identical to those of the browser and download service.

In the case of a push consumption model, NRT service may include one content item. The receiver 300 may download one content item in a push consumption model in the background. Then, the receiver 300 confirms update of the downloaded content item in the background. Additionally, the receiver 300 may launch the downloaded content item according to a user's NRT service select command. The receiver 300 may terminate the launched content item when a user makes an input for exiting NRT service. The receiver 300 may perform the automatic update when a user subscribes to a content item receiving service of a push consumption model. The receiver 300 determines whether to provide an automatic update option on the basis of an auto-update field in an NRT service descriptor in an SMT. Accordingly, the receiver 300 provides automatic update according to a user's selection on an automatic update option provided based on an NRT service descriptor and performs update in the background. When the automatic update option is off, for example, when a user closes the content item receiving service of the push consumption model, the receiver 300 may delete the downloaded content item.

Moreover, a consumption model of NRT service may be Portal. In this case, NRT service may include a service similar to accessing a web browser. Accordingly, a FLUTE session linked with an NRT service of a portal consumption model may include files for text or graphical components to configure a web page. Additionally, files providing portal NRT service are updated within near-real-time and then transmitted. Accordingly, the receiver 300 may generate a screen of a portal consumption model NRT service to be displayed while a viewer waits.

In the case of a portal consumption model, NRT service may include one content item. When a user selects a portable consumption model NRT service, the receiver 300 may download one content item therein. Additionally, the receiver 300 may launch a content item when an entry file is downloaded among files of the content item that is being downloaded. The receiver 300 may terminate and delete the launched content item when a user makes an input for exiting NRT service. Additionally, in the case of a portal consumption model, download, launch, suspend, resume, and shutdown are performed identical to those of the browser and download service.

In the case of the above consumption models, the receiver 300 provides NRT service on the basis of one content item. However, with one content item, it is difficult to generate a user interface linked with real-time broadcast or provide a complex and diverse NRT service.

Accordingly, according to an embodiment of the present invention, an NRT service provider may provide a plurality of content items through the transmitter 300. Additionally, an NRT service provider may set one content item to control an operation of another content item. The receiver 300 receives this, and identifies a consumption model providing a plurality of content items to provide complex and various NRT services to a user. By using such a consumption model, an NRT service provider may generate a user interface that is interactive with NRT service (NDO or TDO) and transmit it. The receiver 300 generates a look and feel user interface interactive with a user on the basis of a plurality of content items in NRT service and provides it to a user.

Such a consumption model of NRT service may be the above-mentioned TDO consumption model. In this case, NRT service transmitted may include the above-mentioned TDO.

In the case of a TDO consumption model, NRT service may include a plurality of content items. The receiver 300 may download each content item founded in the currently selected NRT service. The receiver 300 may update each content item whose updated version is founded in the currently selected NRT service. Each content item is launched or terminated by a trigger.

Also, according to an embodiment of the present invention, a consumption model of NRT service may be a scripted consumption model. In Such an interactive content item may be referred to as an entry content item that controls content items but is not limited the name of the content item. For example, an interactive content item may be a master content item of other content items. The receiver 300 first receives an entry content item or master content item and then launches it. The entry content item may include a function for managing the access and download of NRT service content items. Additionally, the entry content item may include a function for displaying usable contents. The receiver 300 may display a user interface for allowing a user to select a usable content and reserve download, according to the launch of an entry content item. A user interface displayed may include a menu for playing previously-downloaded contents.

An NRT service object in an NRT service of a scripted consumption model is automatically launched when a user accesses the scripted consumption model NRT service. For example, a scripted consumption model NRT service object may be triggered by a user's access and then, launched.

The scripted consumption model NRT service may include a plurality of content items. One of the plurality of content items may include an entry content item having a user input available and interactive interface. The transmitter 300 inserts such a user interactive interface into an entry content item and transmits it, and the receiver 300 receives and launches an entry content item first. Then, the receiver 300 may control the download, update, or launch of another content item by launching the entry content item. Accordingly, an entry content item may include at least one file for downloading, updating, or launching other content items.

Also, an NDO including an entry content item may be launched when a user selects an NRT service including an NDO. Additionally, the launched NDO may be terminated when a NRT service exiting command of a user is inputted. An NRT service object including an entry content item is downloaded in advance and updated. Additionally, after the downloaded NRT service object is launched and terminated, the receiver 300 may maintain its storage. Through this, each time NRT service is selected, a user does not need to wait the receivers to download the NRT service, and is allowed to receive an NRT service updated by an entry content item, so that user's convenience may be enhanced.

According to an embodiment, in the case of a scripted consumption model, the receiver 300 may operate similar to a push consumption model. An NRT service designated as a scripted consumption model may include a plurality of content items corresponding to a push consumption model or a portal consumption model. Accordingly, a scripted consumption model may mean a consumption model extending a push consumption model. Accordingly, a scripted consumption model may mean a consumption model extending a portal consumption model. Accordingly, a service provider may generate and transmit an NRT object by designating a push scripted consumption model or a portal scripted consumption model.

An NRT service object or NRT service of a scripted consumption model may include the above-mentioned plurality of content items and one of the plurality of content items is an entry content item. An entry content item is a content item that is launched first of all to provide by the receiver 300 NRT service according to an NRT service object. Then, files configuring each content item may include an entry file. The entry file is a file that is launched first of all when a content item is launched. Accordingly, a service provider generates an NRT service object through the transmitter 200, designates an entry content item to be launched first, and includes information on an entry content item in an NRT service object or transmits it through service signaling data. Then, a service provider may designate an entry file to be launched first of all among files configuring each content item through transmitter 200, and may transmit information on an entry file through service signaling data or a FLUTE session.

Moreover, an NRT service of a consumption model, push consumption model, or portal consumption model of the browser and download consumption model may include a plurality of content items.

For example, an NRT service of a browser and download consumption model may include a plurality of content items. The plurality of content items may include a set of different information, and each may include an NRT service object with a unique look and feel interface to indicate a set of information. Each object may include the above-mentioned entry file by each content item. A user may select which content item is to be downloaded through the receiver 300, and also may select a content item for presentation after a predetermined time. When a content item for presentation is selected, the receiver 300 launches an object including a look and feel interface in the content item, outputs presentation, and manages the outputted presentation.

Additionally, an NRT service of a push consumption model may include an NRT service object including an entry file. The receiver 300 continuously updates files used in an NRT service object. When a user selects automatic update of service, the receiver 300 may maintain the update of the files. Additionally, the receiver 300 may update the files by an operation of an NRT service object itself. When a user selects NRT service, the receiver 300 may launch an NRT object to manage the presentation of the selected NRT service data.

Additionally, an NRT service of a portal consumption model may include an NRT service object including an entry file. When a user selects an NRT service of a portal consumption model, the receiver 300 obtains and launches an NRT service object including an entry file. The NRT service object including an entry file may manage presentation for other files. In this case, an entry file is a simple HTML page, and each time service is provided, an obtaining process is necessary, so that a smooth operation may be guaranteed only when an acquisition time is very short. Accordingly, it is difficult for the receiver 300 to provide complex and various look and feel interactive interfaces by using only an entry file. Therefore, according to an embodiment, when an entry content item is designated and transmitted, the receiver 300 may store the entry content item in a predetermined storage space after an initial acquisition time of the entry content item. Since the receiver 300 does not require a following acquisition time for presentation, the presentation is possible using an interactive interface, and a smooth and natural operation is guaranteed. Accordingly, a service provider generates and transmits a look and feel interactive interface through the transmitter 200, and the receiver 300 provides a list of NRT service to a user through the interactive interface generated by the service provider without its own interface and launches a selected NRT service.

Figure 64:
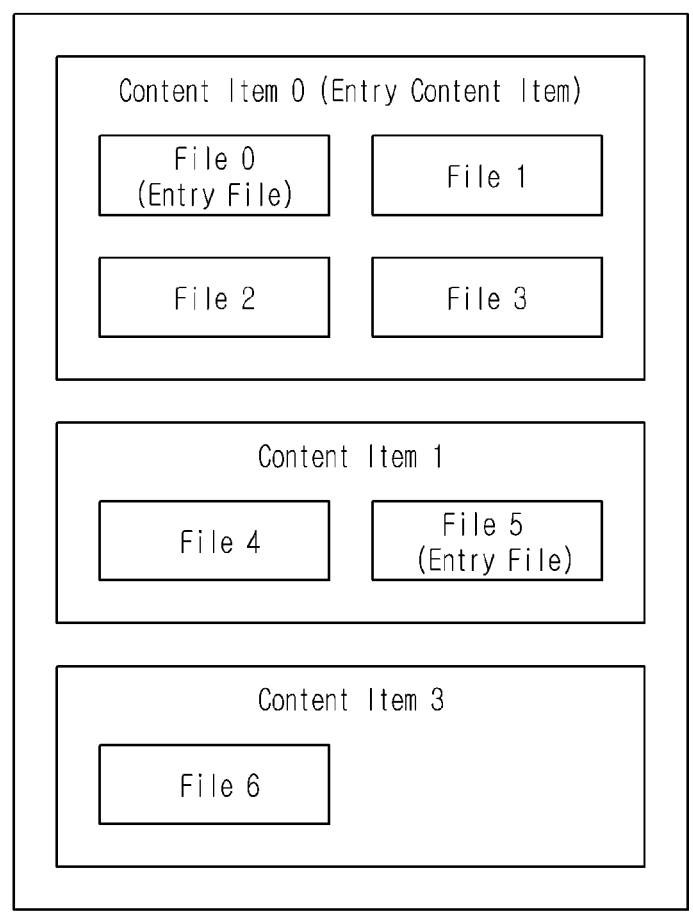
FIG. 64 is a conceptual view illustrating an NRT service including an entry content item.

FIG. 64 is a conceptual view illustrating an NRT service including an entry content item.

Referring to FIG. 64, the NRT service may include a plurality of content items such as a content item 0, a content item 1, and a content item 3. Also, a service provider may designate each entry content item or entry file through the transmitter 200. As shown in FIG. 64, an entry content item is designated as the content item 0, and the entry file is designated as a file 0 and a file 5.

When an NRT service of FIG. 64 is received and a user selects it, the receiver 300 launches the content item 0, i.e., an entry content item first of all. When launching the content item 0, the receiver 300 may execute the file 0, i.e., an entry file, first of all. Here, the entry content item may include a function for managing other content items. Accordingly, the receiver 300 may display the content item 1 and the content item 3 by an operation of the content item 0, and the content item 0 may launch or terminates at least one of the content item 1 and the content item 3 according to a user's selection. Moreover, when the content item 1 is launched, the file 5, i.e., an entry file, may be launched first.

FIGS. 65 and 66 are views illustrating an NRT-IT to transmit information on an entry content item.

The NRT-IT or NCT shown in FIGS. 65 and 66 is included in service signaling data, and the transmitter 200 includes information on an entry content item in service signaling data and transmits it. For example, the transmitter 200 may include a field, which indicates whether a specific content item is an entry content item, in the NRT-IT and then, may transmit it. Accordingly, the receiver 300 receives the service signaling data, extracts the NRT-IT, parses the field that indicates whether a specific content item is an entry content item, determines which content item is an entry content, and launches it first of all. As mentioned above, the NRT-IT may include individual information on a plurality of content items. Information of each of the plurality of content items may be included in a content item loop starting as for (j=0; j<num_content_items_in_section; j++). Then, each content item may correspond to each content item loop identified by a content_linkage field. Accordingly, the receiver 200 parses a content item loop to obtain a no_entry_flag field corresponding to each content item. Since descriptions for other fields in FIGS. 65 and 66 are identical or similar to those of FIG. 16, their repeated descriptions are omitted.

A no_entry_flag field may be a 1-bit number indicating an entry content item. If this field is 0, a content item corresponding to a content item loop that this field belongs may be an entry content item of a service identified by service_id. If this field is 1, a content item corresponding to a content item loop that this field belongs may not be an entry content item of the above-mentioned service.

The transmitter 200 designates a content item to be launched first as an entry content item by using the no_entry_flag field and transmits it. The receiver 300 determines whether the no_entry_flag field is 0 or 1, and thus obtains information on a content item to be launched first.

Figure 67:
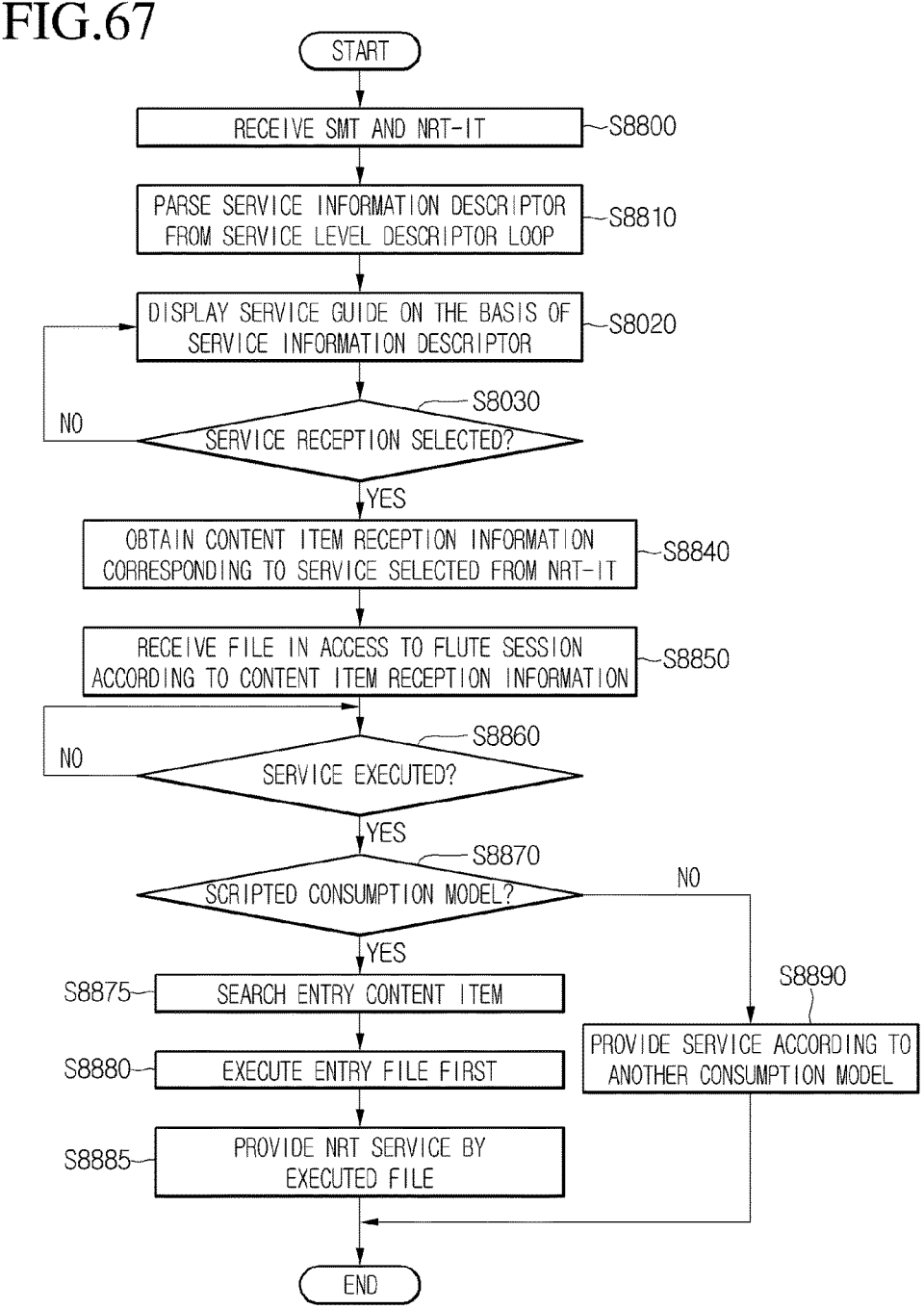
FIG. 67 is a view illustrating an operation method of a receiver when an entry content item is transmitted according to an embodiment of the present invention.

FIG. 67 is a view illustrating an operation method of the receiver 300 when an entry content item is transmitted according to an embodiment of the present invention.

Referring to FIG. 67, the receiver 300 first receives an SMT and an NRT-IT from service signaling data in operation S8800, parses a service level descriptor loop from the SMT, and parses NRT_service_info_descriptor in the service level descriptor loop in operation S8810. The receiver 300 may receive an SMT through a service signaling channel by using the service manager 350, and may parse service level descriptors including an NRT service information descriptor in a service level descriptor loop in each NRT service loop.

Also, the receiver 300 obtains information on an NRT service transmitted based on the parsed NRT service information descriptor, for example, at least one of an application type, a service category, service capacity, and video or audio codec information, to generate service guide and displays it in operation S8820. The receiver 300 generates and displays service guide through the service manager 350.

For example, the service manager 350 calculates a capacity of NRT service on the basis of a storage_requirement field in the NRT service information descriptor and displays it on the service guide. Moreover, the service manager 350 determines video or audio codec of NRT service on the basis of an audio_codec_type or video_codec_type field in the NRT service information descriptor, and displays information therefor on the service guide.

Then, the receiver 300 determines whether service reception on NRT service is selected in operation S8830. The service reception selection may be made by a user viewing the service guide. The service manager 350 determines which one of NRT service displayed on the service guide is selected by a user. The receiver 300 may maintain the service guide display when NRT service is not selected.

Moreover, when service reception on NRT service is selected, the receiver 300 obtains reception information of content items that a service to be received includes from an NRT-IT in operation S8840. The service manager 350 obtains the service identifier of the selected NRT service from an SMT. Then, the service manager 350 obtains information on content items to receive the selected NRT service by comparing the service identifier with the NRT-IT.

For example, the service manager 350 extracts service_id corresponding to the NRT service to be received from an SMT. Then, the service manager 350 determines whether the service_id field of the NRT-IT corresponds to an NRT service to be received, and when they are matched, extracts a content_linkage field from a content item loop to obtain reception information of content items. Additionally, according to an embodiment, the service manager 350 obtains the no_entry_flag field from each content item loop, and determines in advance whether a content item corresponding to each content item loop is an entry content item before reception.

Then, the receiver 300 receives content items of an NRT service transmitted from the transmitter 200 on the basis of the obtained content item reception information in operation S8850. The service manager 350 of the receiver 300 may receive files configuring content items in access to a FLUTE session on the basis of the obtained service_id field and content_linkage field, as mentioned above.

Then, the receiver 300 determines whether there is a launch command on the received NRT service in operation S8860. The service manager 350 of the receiver 300 determines whether there is a user's launch command when the content item of NRT service is received completely. Additionally, the service manager 350 may automatically launch the received NRT service without a user's launch command.

When the NRT service is launched, the receiver 300 first determines whether a consumption model is scripted in operation S8870. The service manager 350 of the receiver 300 parses a service level descriptor loop from SMT, extracts NRT_service_descriptor from the service level descriptor loop, and determines whether the NRT service is a scripted consumption model on the basis of a value of the consumption_model field in NRT_service_descriptor. A value of a consumption model field for a scripted consumption model may be pre-designated. When its value is not a scripted consumption model, the receiver 300 operates in a different way according to another consumption model to provide service in operation S8890.

However, when the consumption model field corresponds to a value designated as a scripted consumption model, the receiver searches for an entry content item among the received content items in operation S8875. The receiver 300 searches for files in the entry content item among content items to execute it first. For this, the receiver 300 may search for an entry content item by using the no_entry_flag field of the NRT-IT. Additionally, the receiver 300 first receives and stores an entry content item in order for fast search and launch. For example, when content items configuring the selected NRT service are not all received, the receiver 300 receives, searches for, and launches an entry content item in advance, so that the NRT service may be partially provided.

Then, when the entry content item is searched, the receiver 300 launches an entry file first among files in the entry content item in operation S8880. When there is no entry file, the receiver 300 may execute a file according to a file order or predetermined order.

Then, the receiver 300 operates by the executed file, and accordingly, provides NRT service to a user in operation S8885. The receiver 300 provides NRT service by sing an interactive interface in an entry content item. Additionally, the receiver 300 may launch or manage another content item according to a user input for an interactive interface in an entry content item.

In such a way, the receiver 300 launches an entry content item first to provide an interactive interface to a user. Additionally, the receiver 300 may manage content items of the selected NRT service through an interactive interface launched in an entry content item. The interactive interface may include a look and feel interface, and may be configured based on a graphic user interface for user's convenience. Moreover, the interactive interface may include a management menu such as launch, shut down, storage, or deletion of NRT service. For this, the interactive interface may include an icon image or video corresponding to each management menu. A user may conveniently manage another NRT service or other content items through an interface in an entry content item.

In such a way, the transmitter 200 designates a consumption mode corresponding to NRT service or an NRT service object to a consumption model or one of the other consumption models, allocates a value corresponding to the designated consumption model to a consumption model field in an NRT service descriptor of an NRT service information table, and transmits the NRT service information table through a service signaling channel.

However, a recognizable consumption model field value may be limited according to the type or production time of the receiver 300. For example, the receiver 300 may operate by recognizing one of a push or portal consumption model value. In this case, when the transmitter 200 designates NRT service as a scripted consumption model and transmits it, the receiver 300 determines that a consumption model value is not designated, so that normal NRT service may not be provided.

Therefore, according to an embodiment of the present invention, the transmitter 200 generates a plurality of NRT service objects in correspondence to the same NRT service, and allocates different consumption model field values to the generated NRT service objects. The transmitter 200 may include allocation information of the consumption model field values in the above-mentioned NRT service table and then, may transmit it.

Figure 68:
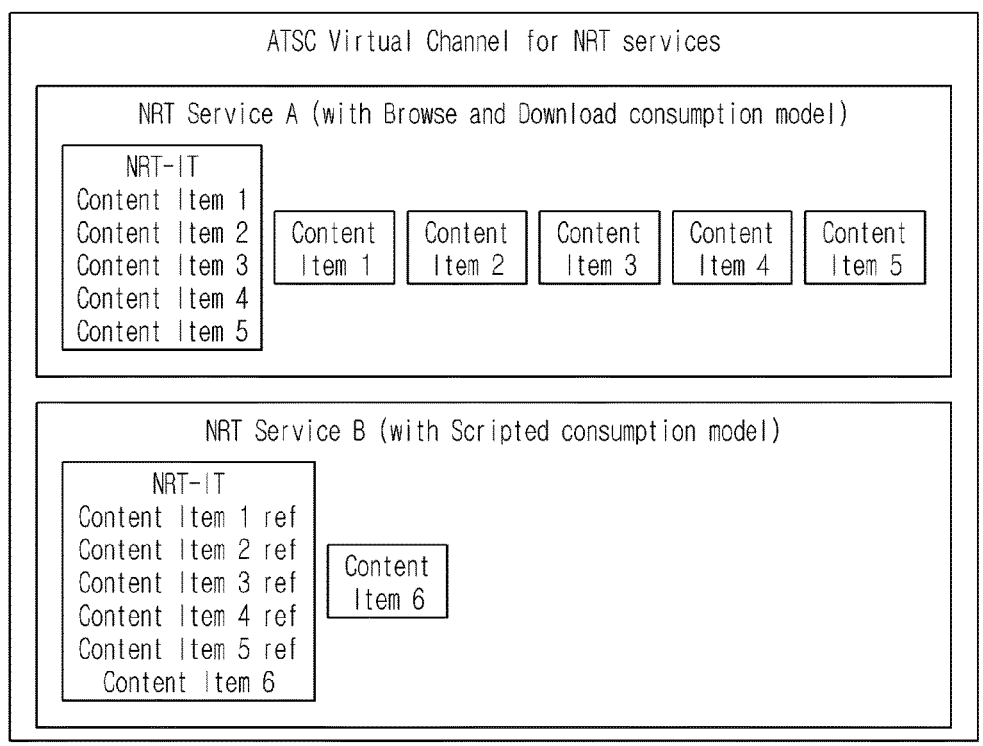
FIG. 68 is a conceptual view of a plurality of NRT service objects transmitted according to an embodiment of the present invention.

FIG. 68 is a conceptual view of a plurality of NRT service objects transmitted according to an embodiment of the present invention.

As shown in FIG. 68, an NRT service transmitted one virtual channel may include an NRT service object A and an NRT service object B. Also, A and B may provide the same NRT service. However, the NRT service object A may be designated as a browser and download consumption model and the NRT service object B may be designated as a scripted consumption model.

According to an embodiment of the present invention, a content item for providing the same NRT service may be the content item 1 to the content item 5 as shown in FIG. 68. Accordingly, the NRT service object A may include the content item 1 to the content item 5 provided by the browser and down consumption model. Also, the NRT service object B may include the content item 6, i.e., the entry content item of the scripted consumption model. The content item 6 may include the above-mentioned interactive interface controlling the content item 1 to the content item 5.

In this way, when transmitting a specific NRT service including the content item 1 to the content item 5 as a browser and download consumption model, the transmitter 200 includes the content item 1 to the content item 5 in the NRT service A and transmits it. When transmitting them as a scripted consumption model, the transmitter 200 includes the content item 6, which is an entry content item to control the content item 1 to the content item 5, in the NRT service B and transmits it. The NRT service B includes only an entry content item, and the content item provides an interface by using content items included in the NRT service B, so that redundant transmission of a content item may be prevented and the waste of a bandwidth may be reduced.

Here, the entry content item may refer to an NRT-IT or an SMT in order to launch content items included in another NRT service. The NRT-IT or SMT may include relationship information between NRT services and information on content items according thereto. For example, the NRT-IT may include relationship information or reference information that the NRT service A and the NRT service B provide services by using the same content item.

According to an embodiment, the NRT service A and the NRT service B provide service by using the same content item, but the NRT service A and the NRT service B may include different NRT service objects or content items.

FIG. 69 is a view illustrating a syntax of an NRT service descriptor included in the SMT according to an embodiment of the present invention.

The above-mentioned relationship information may be included in an NRT service descriptor in a service descriptor loop of the SMT. According to an embodiment of the present invention, service is provided using the same content item but NRT services having different consumption model field values may be referred to as the same service or equivalent service. The relationship information on the equivalent services, as shown in FIG. 69, may include an equivalent_service_not_present field, a num_equivalent_services field, and an equivalent_service_id field.

The equivalent_service_not_present field may be a 1-bit flag to indicate whether there is equivalent service among transmitted NRT services. If this field is 0, it means that there is equivalent service.

The num_equivalent_services field may be an 8-bit unsigned integer to indicate the number if there is equivalent service.

The equivalent_service_id field may be an 16-bit unsigned integer to indicate a service identifier corresponding to equivalent service. Here, the equivalent_service_id field may include on a service identifier when equivalent service is transmitted through the same broadcast channel. However, when the same service is transmitted through different virtual channels, the equivalent_service_id field may include a service identifier and a broadcast identifier. Moreover, an NRT service descriptor may further include an MH broadcast identifier field corresponding to a mobile broadcast identifier.

Since descriptions for other fields of an NRT service descriptor are identical to those of FIG. 52, repeated descriptions are omitted.

FIGS. 70 and 71 are views illustrating a syntax of another NRT-IT according to another embodiment of the present invention. Since descriptions for other fields of the NRT-IT of FIGS. 70 and 71 are identical to the above, repeated descriptions are omitted.

As shown in FIGS. 70 and 71, the NRT-IT may further include an available_on_current_service field. When equivalent service is transmitted, this field indicates whether there is a content item transmitted in another NRT service. Additionally, even when there is no equivalent service, this field indicates whether a content item linked with a currently launched NRT service is transmitted through another NRT service in order for the receiver 300 to receive or launch a content item of another NRT service through an entry content item.

The available_on_current_service field may be a 1-bit number to indicate whether a currently transmitted NRT service (NRT service corresponding to a service identifier field of NRT-IT) includes a content item that this field belongs. If a value of this field is 1, the content item is included in the currently transmitted NRT service and transmitted, and if a value of this field is 0, the content item is included in another NRT service and transmitted.

The available_on_current_service field may be used for the receiver 300 to determine whether there is a content item transmitted in another NRT service linked with the currently transmitted NRT service. For example, when NRT service is selected and an entry content item is launched in the receiver 300, an entry content item determines whether there is a content item transmitted in another NRT service on the basis of the available_on_current_service field in order to provide a content item in another NRT service, and receives or launches a content item transmitted in another NRT service. The transmitter 200 may include information on a content item transmitted through another NRT service in NRT-IT and then, may transmit it. For example, the transmitter 200 may include information on a content item transmitted through another NRT service in a specific descriptor of NRT-IT and then, may transmit it.

FIG. 72 is a view illustrating a syntax of Other_NRT_location_descriptor according to another embodiment of the present invention.

Referring to FIG. 72, an other NRT location descriptor includes a descriptor_tag field, a descriptor_length field, a num_other_NRT_locations field, and an other_service_id field.

The descriptor_tag may be an 8-bit unsigned integer to distinguish this descriptor as a link descriptor. For example, this field may have a 0xe8 value.

The descriptor_length field may be an 8-bit unsigned integer to define the length from a field immediately following this field to the end of a link descriptor.

The num_other_NRT_locations field may be a 6-bit unsigned integer to indicate the number of other_service_id.

The other_service_id field may be an 16-bit unsigned integer to indicate a service identifier of another NRT services in which a content item is transmitted.

Such an other NRT service location descriptor may be one of content level descriptors in a content level descriptor loop (a loop starting with for (i=0; j<num_content_descriptors; i++)) of the NRT-IT of FIGS. 70 and 71. Accordingly, the NRT service location descriptor is included in the NRT-IT and then, transmitted.

The receiver 300 determines whether a content item is transmitted through another NRT services on the basis of the NRT-IT, and obtains the identifier of another NRT services in which a content item is transmitted on the basis of an NRT service location descriptor.

Figure 73:
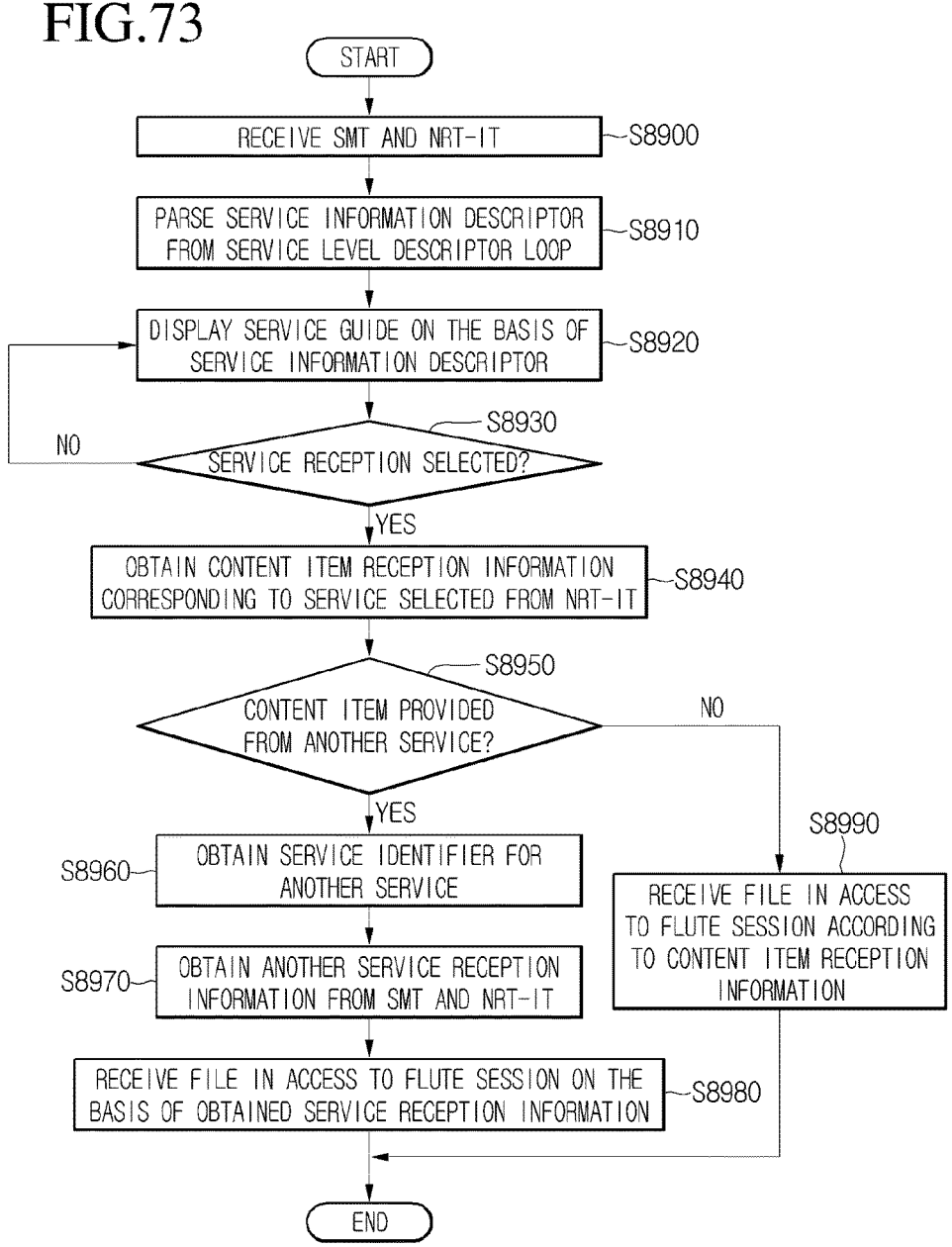
FIG. 73 is a flowchart illustrating a method of receiving broadcast service according to an embodiment of the present invention.

FIG. 73 is a flowchart illustrating a method of receiving broadcast service according to an embodiment of the present invention.

Referring to FIG. 73, the receiver 300 receives an SMT and an NRT-IT from the service signaling data in operation S8900, parses a service level descriptor loop from the SMT and parses NRT_service_info_descriptor in the service level descriptor loop in operation S8910, generates service guide on the basis of the parsed NRT service info descriptor and displays it in operation S8920, and determines whether service reception for NRT service is selected in operation S8930. The above operations may be performed by the service manager 350 of the receiver 300.

Moreover, when service reception on NRT service is selected, the receiver 300 obtains reception information of content items that a service to be received includes from the NRT-IT in operation S8940. The reception information on content items may include content_linkage of a content item and service_id of NRT service that each content item belongs.

Then, the receiver 300 first determines whether a content item is provided through NRT service by using the reception information in operation S8950. Here, the reception information of a content item may include relationship information indicating whether a content item is transmitted through a currently selected service or whether a content item is transmitted through another NRT services. For example, the reception information may include the available_on_current_service field. Additionally, when a content item is transmitted through another NRT service, the reception information of the content item may include the identifier of the other NRT service and the identifier of the content item in order to receive the content item. Accordingly, the receiver 300 determines whether a content item is provided through another NRT service by using the relationship information.

Additionally, the relationship information may include other_NRT_location_descriptor, and the service manager 350 of the receiver 300 determines whether a content item of NRT service that a current user selects to receive is transmitted through a selected service or another NRT service by using the relationship information, and identifies an object corresponding to the other NRT service to receive a content item therein.

If it is determined that the content item is not transmitted through another NRT service, the service manager 350 of the receiver 300 accesses a FLUTE session according to the obtained content item reception information, and receives files configuring each content item through the above method.

Moreover, if it is determined that the content item is transmitted, the service manager 350 of the receiver 300 obtains the service identifier for another NRT service from the reception information in operation S8960 and, by receiving SMT and NRT-IT corresponding thereto, obtains content item reception information in another NRT service in operation S8970. Then, the service manager 350 may receive files configuring a content item in access to a FLUTE session on the basis of the content item reception information.

Here, content items in another NRT service may be launched by an entry content item of the reception selected NRT service. The service manager 350 of the receiver 300 identifies the entry content item of the reception selected NRT service, receives and launches the entry content item first, and displays an interactive interface in the entry content item. Additionally, the receiver 300 may receive or launch a content item of another NRT service in correspondence to a user input for the displayed interface.

Additionally, as mentioned above, a content item of the same NRT service may be launched or received by an entry content item. When each content item is received or launched, the service manager 350 of the receiver 300 first receives and launches an entry file in files configuring each content item, as mentioned above. The service manager 350 of the receiver 300 may receive a list of files from a FLUTE session through FDT before receiving a file of a content item, and identifies an entry file first on the basis of the FDT.

< >

Moreover, the receiver 300 may provide Electronic Program Guide (EPG) including guide information on broadcast service by using NRT service. Moreover, the receiver 300 may provide EPG on the basis of an Event information table (EIT) of a PSIP table like an existing receiver, and may additionally provide EPG provided through NRT service, if necessary. When EPG is provided using NRT service, the receiver 300 receives images, videos, or executable contents in advance through a service signaling channel or an internet network, and provides the received EPG service according to a user's request.

According to an embodiment of the present invention, the transmitter 200 allocates an additional consumption model corresponding to EPG in order to transmit such an extended EPG through NRT service, and the receiver 300 provides EPG service by performing a predetermined operation when it is determined as EPG according to a consumption model.

FIG. 74 is a view illustrating a meaning according to each value of a consumption_model field in an NRT service descriptor when an EPG consumption model is allocated according to an embodiment of the present invention.

As described with reference to FIG. 53, the consumption_model field is included in NRT_service_descriptor and is a field indicating which method for consumption_model NRT service that NRT_service_descriptor indicates uses. According to an embodiment, the consumption_model field may indicate an EPG consumption model. A field value for EPG consumption model may be 0x05.

NRT service allocated as an EPG consumption model may include at least one content item. Such content items may include information on a broadcast service that is currently in service. For example, each content item may include virtual channel service information according to a broadcast channel, TV event information, NRT service information, or information on content items of NRT service. Also, each information is collected in an html page format and is provided in an EPG format through the receiver 300.

Also, the receiver 300 connects broadcast information provided in EPG with other NRT service objects or various multimedia contents. For this, the transmitter 200 inserts a link descriptor or an event descriptor for receiving contents connected to broadcast information into SMT or NRT-IT and transmits it. Additionally, the transmitter 200 inserts a link descriptor or an event descriptor including the above broadcast information into VCT or EIT and transmits it.

Also, the transmitter 200 generates a linkage descriptor corresponding to an NRT service allocated as an EPG consumption model, and inserts it into at least one of a VCT, an EIT, an SMT, and an NRT-IT to correspond to each service or channel, and transmits it. A transmission method of the transmitter 200 by using a linkage descriptor or a reception and service providing method of the receiver 300 will be described later.

An NRT service designated as an EPG consumption model may include extended EPG information for EPG on a program or service that the receiver 300 provides. Since the extended EPG information may include rich and diverse multimedia data, the receiver 300 provides to a user a guide to a program or service through rich and various methods.

At least one content item included in an NRT service designated as an EPG consumption model may corresponding to one virtual channel, one event, or one NRT service, and may include related information on each corresponding virtual channel, event, or NRT service. The receiver 300 may obtain such related information on the basis of a linkage descriptor.

For example, when a user's additional information request on a specific virtual channel, event, or NRT service displayed on a program or service guide is provided, its service may be provided by using a content item of an EPG consumption model NRT service linked with the additional information requested specific virtual channel, event, or NRT service. A content item of an NRT service of an EPG consumption model may include at least one of preview, related HTML page collection, a movie poster image.

Accordingly, when there is a user's additional request on a specific event in the displayed service guide, the receiver 300 launches a preview content item of an NRT service of an EPG consumption model corresponding to an additional request target, and displays it to a user, so that extended EPG service is provided.

Moreover, an NRT service (or, an EPG NRT service) designated as an EPG consumption model may be downloaded in the background in order to prevent a user from recognizing it. Also, content items of an EPG NRT service downloaded through the background may be presented when there is a user's request on the displayed broadcast service guide in the receiver 300.

Content items included in EPG NRT service may be downloaded and stored through an internet network like an NRT service of another consumption model as mentioned above. Then, each content item may be downloaded in the background through an internet network in order to prevent a user from recognizing it. Also, content items of an EPG NRT service downloaded in the background through an internet network may be presented when there is a user's request on the displayed broadcast service guide in the receiver 300, and each content item may be downloaded in real-time through an internet network and played according to a user's request. In order to download and store various types of content items included in an NRT service designated as an EPG consumption model through the background, the receiver 300 is required to manage a limited storage space. For this, the receiver 300 allocates and manages a predetermined storage space and the transmitter 200 includes information on a required storage space in an NRT descriptor and transmits it.

Furthermore, when content items of EPG NRT service are downloaded and stored through the background, the service manager 350 of the receiver 300 updates the received and stored EPG NRT service when it is determined that there is an updated version after periodically confirming and monitoring the content items.

Then, among the downloaded and stored content items of EPG NRT service, a content item linked with a specific virtual channel, specific event, or NRT service whose additional information is requested by a user may be launched or presented in a broadcast program or service guide that the receiver 300 provides. For this, the receiver 300 may display that a content item of an EPG NRT service including additional information corresponding to each virtual channel, event, or NRT service is received or stored. The receiver 300 may display an indicator displaying the above in a service guide.

Additionally, the service manager 350 of the receiver 300 may control not to suspend the launched or presented content items of EPG NRT service. However, when the launched or presented content items of EPG NRT service is a video clip, for example, the service manager 350 of the receiver 300 performs a pause operation of video according to an operation of a presentation engine for playing a content item to suspend the video clip. Additionally, when controlling not to suspend the launched or presented content items of EPG NRT service, the service manager 350 of the receiver 300 may not perform a resume operation on suspending. Accordingly, the service manager 350 of the receiver 300 may not perform a suspend or resume operation on the launched or presented content items of EPG NRT service.

Also, the receiver 300 or the service manager 350 of the receiver 300 may close or exit the launched or presented content item of EPG NRT service when a user selects a virtual channel, an event, or NRT service different from the above-mentioned specific virtual channel, event, or NRT service from a broadcast program or service guide. Also, even when a user selects a close command from a broadcast program or service guide, the receiver 300 may close or exit the launched or presented content item of EPG NRT service.

Figure 75:
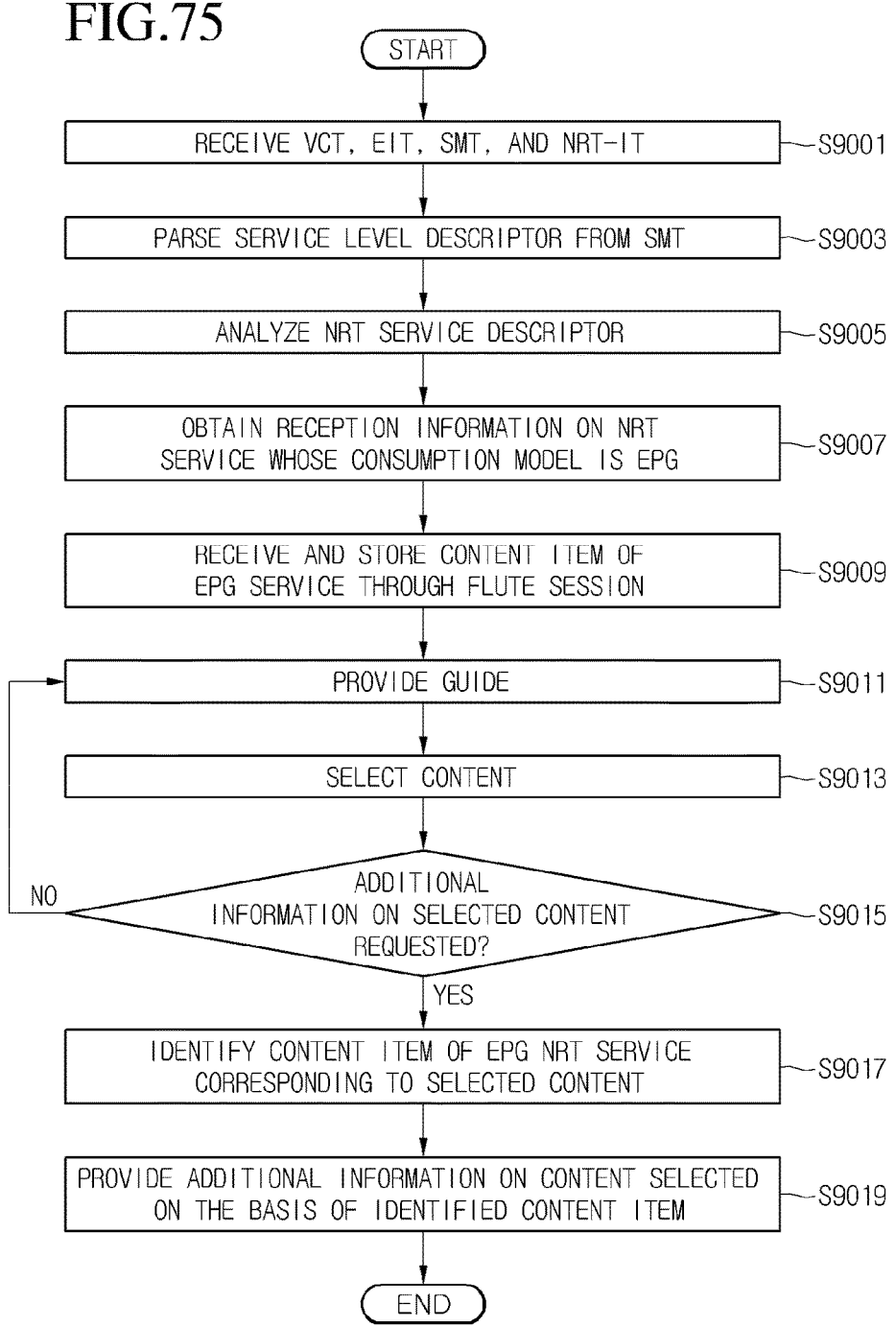
FIG. 75 is a flowchart illustrating a method of providing EPG on the basis of an NRT service of an EPG consumption model, as a method of receiving broadcast service according to an embodiment of the present invention.

FIG. 75 is a flowchart illustrating a method of providing EPG on the basis of an NRT service of an EPG consumption model, as a method of receiving broadcast service according to an embodiment of the present invention.

Referring to FIG. 75, the receiver 300 first receives a VCT, an EIT, an SMT, and an NRT-IT in operation S9001 and parses a service level descriptor of the SMT in operation S9003.

The receiver 300 may receive an SMT through a service signaling channel by using the service manager 350, and may parse a plurality of loops corresponding to each NRT service from the received SMT. The parsed each loop may be referred to as a service level descriptor. Then, the receiver 300 may parse service level descriptors including an NRT service descriptor from each service level descriptor loop. An NRT service descriptor may include detailed information on an NRT service corresponding thereto. Also, the detailed information may include requirement information of a receiver to provide a corresponding NRT service. Accordingly, the receiver 300 determines whether the receiver 300 is capable of providing NRT service on the basis of an NRT service descriptor.

Accordingly, the service manager 350 of the receiver 300 parses a PSIP table from a broadcast signal transmitted through a broadcast channel and parses a VCT and an EIT from the parsed PSIP table. The receiver may parse a VCT and an EIT by using a PSIP handler.

Then, the receiver 300 analyzes the parsed service level descriptor in operation S9005, confirms NRT_service_descriptor, and determines whether a value of the consumption_model field in NRT_service_descriptor indicates an EPG consumption model. The receiver 300 determines this referring to the table of FIG. 74. Then, if the value does not indicate an EPG consumption model, the receiver 300 performs an operation according to the above-mentioned another NRT service consumption model.

However, if the value indicates an EPG consumption model, the receiver 300 determines that an NRT service designated as the EPG consumption model is transmitted. In this case, the receiver 300 obtains reception information of an NRT service of the EPG consumption model in operation S9007.

The reception information of an NRT service of an EPG consumption model may include the service id of the NRT service and the content linkage of content items. As mentioned above, the service id may be included in the SMT and the linkage information between content items may be included in the NRT-IT. Accordingly, the receiver 300 obtains NRT service reception information of an EPG consumption model on the basis of the SMT and the NRT-IT.

Then, the receiver 300 accesses a FLUTE session on the basis of the obtained reception information and receives and stores the content items configuring the obtained NRT service of the EPG consumption model in operation S9009. The reception of an NRT service of an EPG consumption model may be made in the background without a user's recognition. Accordingly, the NRT service of an EPG consumption model may be continuously received regardless of a user's selection. However, the reception method may be changed according to a user's setting. For example, the receiver 300 may not receive the NRT service of an EPG consumption model according to a user's setting, receives it in the foreground, or receives it according to a user's set period. Accordingly, the receiver 300 receives an EPG service extended according to a user's preference, and provides it.

Additionally, the receiver 300 receives and manages an NRT service of an EPG consumption model in a storage unit through the service manager 350. However, as mentioned above, in order to receive and manage an NRT service of an EPG consumption model in a storage unit, a constant predetermined size of storage space may be required. Additionally, the allocated amount of such a storage space may be transmitted through the transmitter 200 according to a service provider's intention. Therefore, according to an embodiment of the present invention, the receiver 300 allocates a predetermined area of a storage unit of the receiver 300 as a storage area of an NRT service of an EPG consumption model, receives EPG service in an allocated area, and then stores and manages it. Accordingly, the transmitter 200 includes information on the storage area in an NRT service descriptor and then, transmits it to the receiver 300. In this case, the receiver 300 may receive, store, and manage EPG service in a designated area.

For example, the transmitted storage area information may be included in a storage_reservation field in an NRT service descriptor, and the receiver 300 allocates a predetermined area on the basis of the storage area information and the EPG consumption model field, and manages it as an area to receive an NRT service of an EPG consumption model.

Moreover, a content item of an NRT service designated as an EPG consumption model may be transmitted through IP in addition to a broadcast service channel. The transmission through IP may be performed through the NRT service transmitting method through an internet network. For example, the receiver 300 obtains URL information to receive a content item of an NRT service designated as an EPG consumption model on the basis of NRT-IT, and receives files configuring a content item through an internet network on the basis of the obtained URL information. Accordingly, the receiver 300 receives content item files in an NRT service of an EPG consumption model, which are transmitted through an internet network, through IP, and stores it.

Then, the receiver 300 provides a service guide on the basis of the parsed VCT and EIT in operation S9011. The service guide may include guide information on a broadcast channel, a broadcast program, or NRT service. The receiver 300 generates an EPG on a broadcast program or service from the VCT and EIT through the service manager 350, and then displays it, so that it provides a service guide to a user. In order to provide a guide on NRT service as well as a broadcast program, the transmitter 200 may include brief information on NRT service in a VCT or an EIT and then, transmit it. Accordingly, the receiver 300 may generate a guide on a broadcast program and NRT service on the basis of a VCT and an EIT and then, displays it. For example, the transmitter 200 includes a descriptor including information on NRT service in a VCT and an EIT and transmits it, and the receiver 300 parses it to generate a guide and display it.

Once the guide is provided, a user may select a desired content, for example, a specific virtual channel, a specific program (event) or a specific NRT service, from the displayed EPG. Accordingly, the receiver 300 selects a corresponding content (a virtual channel, event, or NRT service object) according to a user's selection in operation S0913. A user may display a list of desired information contents in highlight, position an interface point on a content list, or select a content by using a gesture.

Then, the receiver 300 first displays information on a content selected based on the parsed VCT and EIT. Then, the receiver 300 determines whether there is an additional information request on the selected content in operation S9015. If there is no additional information request, operation S9011 is continuously performed.

Here, a receiver may display an indicator indicating the request around an additional information available content list by using the service manager 350. Additionally, the receiver 300 may lead a user to request additional information on a content having an indicator displayed thereon. The indicator may be displayed when an NRT service of the EPG consumption model is received completely. The additional information, for example, may include preview information (image information or image information) included in a content item of an NRT service of an EPG consumption model or related home page information.

Moreover, when there is an additional information request on the selected content, the receiver 300 identifies a content item of an NRT service of an EPG consumption model corresponding to the selected content in operation S9017.

The receiver 300 identifies content items corresponding to the selected content from the received and stored NRT service of the EPG consumption model by using the service manager 350. For example, when the selected content is a specific virtual channel, the receiver 300 obtains content item identification information of an NRT service designated as an EPG consumption model from the linkage information corresponding to a specific virtual channel included in a VCT and then, based on this, identifies a content item corresponding to a specific virtual channel from the content items of the received EPG consumption model NRT service.

Moreover, when the selected content is a specific program (event), the receiver 300 obtains content item identification information of an NRT service designated as an EPG consumption model from the linkage information corresponding to a specific event or program included in an EIT and then, based on this, identifies a content item corresponding to a specific program (event) from the content items of the received EPG consumption model NRT service.

Then, when the selected content is a specific NRT object, the receiver 300 obtains content item identification information of an NRT service designated as an EPG consumption model from the linkage information corresponding to a specific event or program included in an SMT or an NRT-IT and then, based on this, identifies a content item corresponding to a specific service object from the content items of the received EPG consumption model NRT service.

Then, the receiver 300 provides additional information on the selected content on the basis of the identified content item in operation S9019.

The receiver 300 may provide additional information on the selected content by launching or presenting the identified content item. The additional information, as mentioned above, may include various and rich multimedia information to provide extended EPG. Accordingly, a user may request additional information while watching a service guide, and may obtain various and rich EPG information on the selected content at the request.

Figure 76:
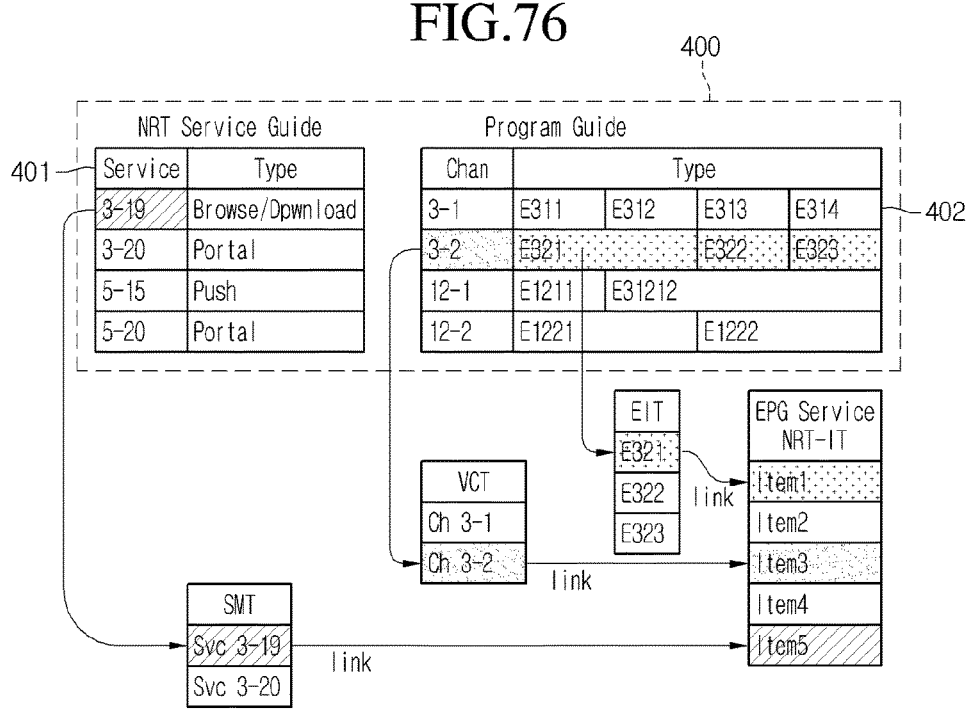
FIG. 76 is a view illustrating a linkage between EPG and each table according to an embodiment of the present invention.

FIG. 76 is a view illustrating a linkage between EPG and each table according to an embodiment of the present invention.

Referring to FIG. 76, the EPG 400 may include an NRT service guide 401 and a broadcast program guide 402. The receiver 300 may analyze VCT and EIT to generate the NRT service guide 401 or the broadcast program guide 402 and display it.

Moreover, the receiver 300 may obtain information on a content item of an NRT service of an EPG consumption model corresponding to each NRT service, virtual channel, or event on the basis of an SMT, a VCT, or an EIT, and may provide additional information by using a content item of an EPG service corresponding to the NRT service, virtual channel, or event that a user selects.

For example, as shown in FIG. 76, when there is an additional information request on an NRT service 3-19, the receiver 300 may obtain EPG content item identification information on the service identifier Svc 3-19 corresponding thereto through linkage information in the SMT. Then, the receiver 300 may identify a corresponding content item item5 from the NRT-IT corresponding to an NRT service of an EPG consumption model to launch or present it so that additional information on EPG using NRT service may be provided.

Furthermore, when there is an additional information request on a virtual channel 3-2, the receiver 300 may obtain EPG content item identification information on the virtual channel CH 302 corresponding thereto through linkage information in the VCT. Then, the receiver 300 may identify a corresponding content item item3 from the NRT-IT corresponding to an NRT service of an EPG consumption model to launch or present it so that additional information on EPG using NRT service may be provided.

In the same manner, when there is an additional information request on an event E321, the receiver 300 may obtain EPG content item identification information on a virtual channel CH 302 corresponding thereto through linkage information in EIT. Then, the receiver 300 may identify a corresponding content item item1 from the NRT-IT corresponding to an NRT service of an EPG consumption model to launch or present it so that additional information on EPG using NRT service may be provided.

Figure 77:
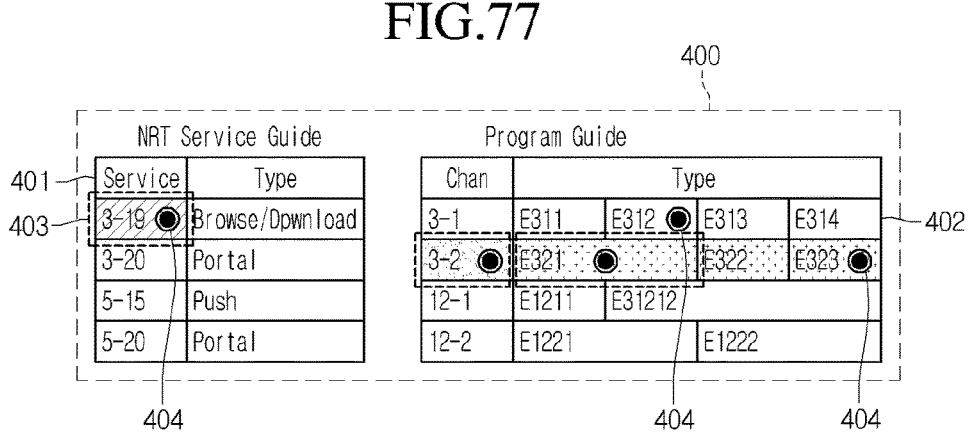
FIG. 77 is a view illustrating an EPG provided according to an embodiment of the present invention.

FIG. 77 is a view illustrating an EPG provided according to an embodiment of the present invention.

As shown in FIG. 77, the EPG 400 may include a highlighter 403 for indicating a content that a user selects and an indicator 404 for indicating available additional information in addition to the NRT service guide 401 and the broadcast program guide 402.

A user may select a specific content, for example, a specific NRT service, a specific virtual channel, or a specific broadcast program (event) through the highlighter 403.

Then, the receiver 300 may determine whether an NRT service of an EPG consumption model is received in correspondence to each NRT service, virtual channel, or event, and may display the indicator 404 indicating that additional information is available. Here, the indicator 404 may be displayed around a corresponding content list. Additionally, the receiver 300 may display the indicator 404 on a content that a user selects according to a setting, and also may display the indicator 404 on a content that a user does not select. In FIG. 77, although the indicator 404 is displayed in a circular form, it is not limited thereto, and thus may be displayed in at least one form of characters, symbols, or figures, which indicate that additional information on content is available.

Figure 78:
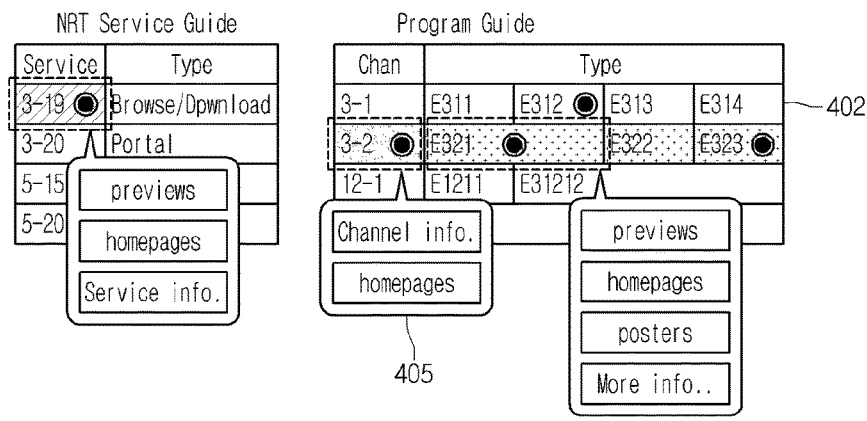
FIGS. 78 and 79 are views illustrating an EPG screen when a user requests additional information according to an embodiment of the present invention.
Figure 79:
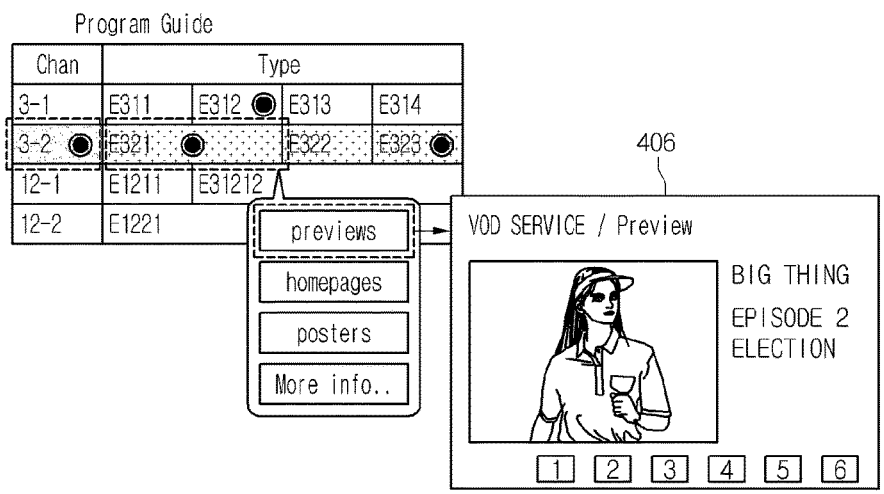

FIGS. 78 and 79 are views illustrating an EPG screen when a user requests additional information according to an embodiment of the present invention.

As shown in FIG. 78, according to an embodiment, when a user selects the indicator 404 to request additional information on a specific content, an extended EPG is displayed by the launched or presented content item of an EPG consumption model NRT service. For example, as shown in FIG. 78, the receiver 300 may further display an extended guide 405 corresponding to a content that a user selects. The extended guide 405 may include a menu for selecting at least one of preview information, related home page information, detailed information on a corresponding content, and poster information.

Then, when a user selects a specific menu, for example, preview information, as shown in FIG. 79, a preview information screen 406 on a corresponding content may be additionally displayed on the EPG. The preview information screen 406 may indicate preview information included in a content item of an EPG consumption model NRT service as shown in FIG. 79. The preview information, as shown in FIG. 79, may include detailed content, video, or VOD information on the corresponding content E321, and may be played according to a user's selection.

Figure 80:
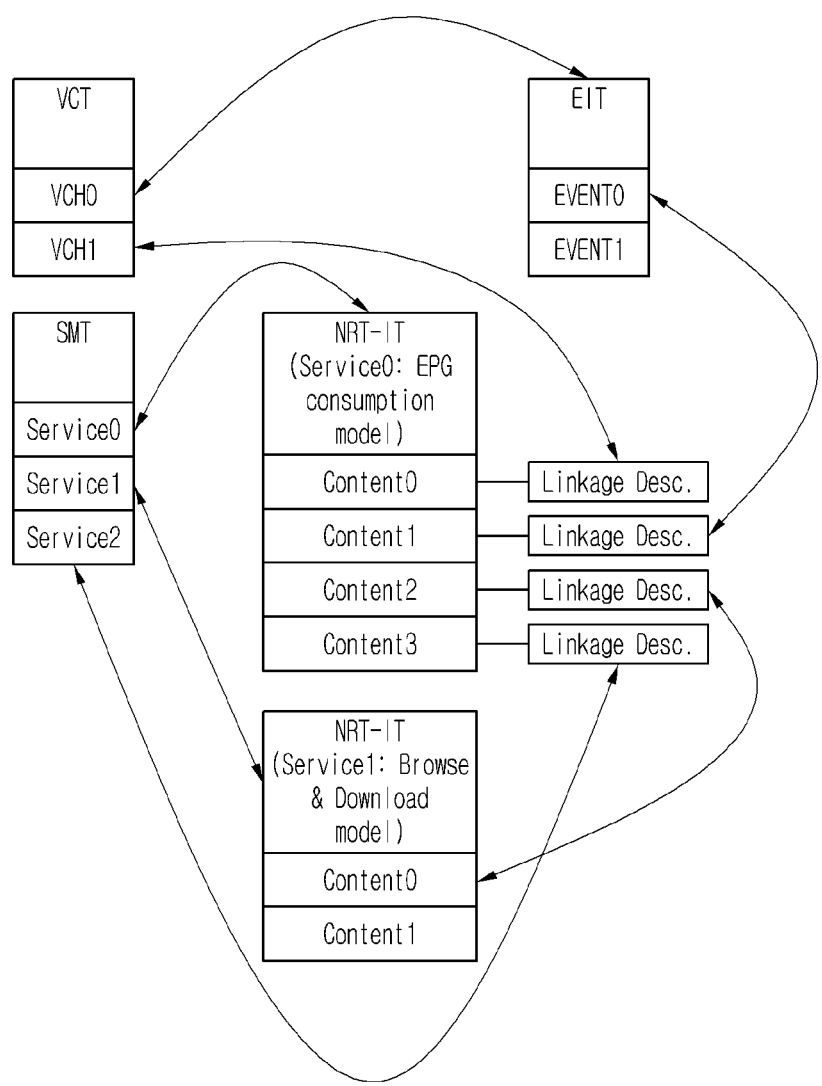
FIG. 80 is a view illustrating linkage information linked with other tables according to another embodiment of the present invention.

FIG. 80 is a view illustrating linkage information linked with other tables according to another embodiment of the present invention.

As shown in FIG. 80, linkage information may be included in a linkage descriptor, and also may be included in a descriptor loop corresponding to a content item of a specific channel, specific event, specific NRT service, or a content item of a specific NRT service of each table of a VCT, an EIT, an SMT, or an NRT-IT, and then transmitted by the transmitter 200. The receiver 300 parses each descriptor loop to obtain a linkage descriptor and obtains identification information of a content item of an EPG NRT service linked with each content on the basis of the linkage descriptor. Also, the receiver 300 may provide additional extended EPG information by launching or playing a specific content item among content items corresponding to an NRT service designated as an EPG consumption model in NRT-IT on the basis of the obtained identification information.

For example, as shown in FIG. 80, Service 0 may include an NRT service of an EPG consumption model. In this case, each of content items 0 to 3 in Service 0 may include extended EPG information. Then, the receiver 300 determines which content item EPG information linked with each channel, event, or service is included in on the basis of a linkage descriptor. The receiver 300 determines that extended EPG information on a virtual channel of VCH1 is included in content 0 on the basis of the linkage descriptor, and launches or plays the content 0 to provide the extended EPG. Additionally, the receiver 300 determines that extended EPG information on a virtual channel of VCH1 is included in content 1 on the basis of the linkage descriptor, and launches the content 1 to provide the extended EPG. In the same manner, the receiver 300 launches or plays Content 2 of Service0 to provide extended EPG information on content0 of Service1, i.e., a content item of NRT service, and also launches or plays content3 to provide extended EPG information on Service2, i.e., NRT service.

Such linkage descriptor may include information for signaling a linkage between a target content (for example, a channel, event or NRT service object) and an NRT service object of an EPG consumption model. Accordingly, the linkage descriptor may indicate a specific content item of an EPG consumption model NRT service indicating a target content. Such a linkage descriptor may be included in the VCT, EIT, SMT or NRT-IT and then transmitted as mentioned above, and for example, may be included a service descriptor loop of SMT or a content descriptor loop of NRT-IT and then transmitted. Accordingly, the receiver 300 may provide extended EPG information linked with an EPG consumption model NRT service on the basis of a linkage descriptor transmitted via various paths. Accordingly, a user may receive more detailed and additional information on a desired content.

FIG. 81 is a view illustrating a syntax of a linkage descriptor according to an embodiment of the present invention.

Referring to FIG. 81, the linkage descriptor may include a descriptor_tag field, a descriptor_length field, a target_type field, a major_channel_number field, a minor_channel_number field, a channel_TSID field, and a source_id field, and may further include an event_id field or a service_id field or may further include a service_id field and a content_linkage field.

The descriptor_tag field may be an 8-bit unsigned integer to distinguish this descriptor as a linkage descriptor.

The descriptor_length field may be an 8-bit unsigned integer to define the length from a field immediately following this field to the end of a linkage descriptor.

The target_type field may indicate the type of a target content. For example, as shown in FIG. 82, a target type field may be displayed to correspond the type of a target content linked with a linkage descriptor to a field value. The target content may be a TV service (virtual channel), TV event, NRT service or a content item of an NRT service, and a value corresponding thereto may be one of 0x00 to 0x07. Accordingly, the receiver 300 may determine which type of service the target content relates to on the basis of the target type field.

The major_channel_number field may indicate a major channel number linked with a virtual channel, i.e., a target of a linkage descriptor. Each virtual channel may relate to a major channel number and a minor channel number. The major channel number and the minor channel number may serve as a reference number of a user's virtual channel.

The minor_channel_number field (10 bits) may include a minor or sub-channel number in a range of '0' to '999' linked with a virtual channel, i.e., a target of a linkage descriptor.

The channel_TSID field (16 bits) may be an unsigned integer indicating an MPEG-2 transfer stream ID linked with a transfer stream carrying an MPEG-2 program referenced by a virtual channel in a range of '0x0000' to '0xFFFF' to identify a virtual channel, i.e., a target of a linkage descriptor.

The source_id field (16 bits) indicates a source of a program linked with a virtual channel, i.e., a target of a linkage descriptor.

Here, the receiver 300 may use a combination of the major channel number field and the minor channel number field in order to identify a virtual channel, i.e., a target of a linkage descriptor. Moreover, the receiver 300 may identify a virtual channel by using a combination of the channel_TSID field and the source_id field. The linkage descriptor may include various fields to identify a virtual channel, and the transmitter 200 identifies a virtual channel through a method of using the minimum field among a combination of the fields, so that the size of a descriptor may be reduced and a bandwidth may be efficiently used.

FIG. 82 is a view illustrating a target type field of a linkage descriptor according to an embodiment of the present invention. As shown in FIG. 82, when the target type field indicates a TV event (0x02), the linkage descriptor may include an event_id field according to the target type field. When the target type field indicates an NRT service (0x03), the linkage descriptor may include a service_id field. When the target type field indicates a content item of NRT service (0x04), the linkage descriptor may include a service_id field and a content_linkage field. Accordingly, the receiver 300 first parses the target type field, and determines the type of a target content on the basis of the value of the target type field, and also obtains each identifier field according to the determined content type so that it may identify the target content.

In addition, according to another embodiment of the present invention, the receiver 300 may include descriptive information of contents (for example, a virtual channel, an event, or NRT service) to display service guide. For this, the receiver 300 may obtain a linkage descriptor from tables transmitted through a broadcast channel or NRT service signaling channel.

The linkage descriptor may be included in a channel level descriptor loop corresponding to a specific virtual channel in the VCT. Additionally, the linkage descriptor may be included in an event level descriptor loop corresponding to a specific event in an EIT instance. Then, the linkage descriptor may be included in a service level descriptor loop in the SMT corresponding to a specific NRT service.

The receiver 300 may determine what descriptive information of a virtual channel, event, or NRT service is included based on the position in the VCT, EIT, or SMT including such a linkage descriptor.

Moreover, the receiver 300 may identify at least one content item of an EPG consumption model NRT service linked with the above-mentioned virtual channel, event, or NRT service on the basis of the linkage information in the linkage descriptor. The receiver 300 may provide additional information on the above-mentioned specific virtual channel, event, or NRT service by launching or playing at least one content item, and the additional information may be displayed on a service guide that a user views.

FIG. 83 is a view illustrating a linkage descriptor according to another embodiment of the present invention. The linkage descriptor may include a descriptor_tag field, a descriptor_length field, and a num_of_linked_content_items field, and also may include at least one linked content item loop divided by a for loop. Each content item loop may include a service_id_ref field to identify a content item, a content_linkage_ref field, and a role field.

The descriptor_tag field may be an 8-bit unsigned integer to distinguish this descriptor as a linkage descriptor.

The descriptor_length field may be an 8-bit unsigned integer to define the length from a field immediately following this field to the end of a linkage descriptor.

The num_of_linked_content_items field may be an 8-bit unsigned integer indicating the number of content items identified in loops starting from a field immediately following this field.

The Service_id_ref field may be a 16-bit unsigned integer matching the service identifier field of NRT service. The NRT service matched by this field is to provide descriptive information for a program or service guide, and may be an NRT service designated as an EPG consumption model. The NRT service designated as an EPG consumption model may be included in a broadcast stream including the linkage descriptor and then transmitted, or may be transmitted through another broadcast stream in the same broadcast area.

The content_linkage_ref field may be a 32-bit unsigned integer matching the content_linkage field corresponding to a content item of an NRT service designated as an EPG consumption model that the service identifier reference field in an NRT-IT instance indicates. Accordingly, by parsing this field, the receiver 300 may identify a content item of an EPG consumption model NRT service as a content item linked by the linkage descriptor.

The role field may be a 4-bit unsigned integer indicating the role of the identified content item. The meaning according to a value allocated to the role field, for example, is shown in the following Table 5.

TABLE 5

| value | Meaning |
|---|---|
| 0 | Preview |
| 1 | General description |
| 2-15 | Reserved |

As shown in Table 5, when a value of the role field is 0, it indicates that the identified content item serves as a preview role. When a value of the role field is 1, it indicates that the identified content item serves a general description role.

As mentioned above, the receiver 300 receives EPG information, which is included in the VCT or EIT and transmitted through a broadcast channel, from the transmitter 200 and then, displays EPG, and also, according to a user's additional information request on guide, launches or plays an EPG NRT content item on a specific content to provide extended EPG information.

Moreover, according to an embodiment, the transmitter 200 may further include information for providing NRT service guide in the VCT or EIT and then, transmit it. Such information may be included in a specific descriptor, and may express a descriptor for providing NRT service guide as an enhanced EPG descriptor. The receiver 300 parses the EPG descriptor from a descriptor loop of VCT or EIT and displays EPG on NRT service.

Such an enhanced EPG descriptor may include various information to provide NRT service guide. For example, the enhanced EPG descriptor may include information on whether there is an adjunct NRT service added to a specific virtual channel or event A/V stream and transmitted and whether an existing adjunct NRT service is access-controlled. Moreover, the enhanced EPG descriptor may include information on whether a list of NRT service included in an NRT virtual channel and each NRT service are access-controlled.

Moreover, the enhanced EPG descriptor, as mentioned above, may be included in a channel level descriptor loop of a VCT (a TVCT or a CVCT), and may be included in an event level descriptor loop of the EIT. Accordingly, the receiver 300 may display EPG on data service or NRT service by using a PSIP table transmitted through a broadcast channel or an internet network, without extracting complex data or other tables through each virtual channel or signaling channel.

The enhanced EPG descriptor may include capability information on NRT service. The capability information may include information on the capability of the receiver 300 with which an NRT service included in a corresponding virtual channel or event is successfully played. Therefore, the receiver 300 may not display the existence of a corresponding NRT service in the EPG of the NRT service if a required capability is not provided on the basis of the capability information. Then, the capability information may be included in an NRT Capabilities descriptor, and also is included in a VCT or an EIT in addition to the enhanced EPG descriptor, and then transmitted.

FIG. 84 is a view illustrating a syntax of an enhanced EPG descriptor according to an embodiment of the present invention.

Referring to FIG. 84, the enhanced EPG descriptor may include a descriptor tag field, a descriptor length field, a num_of_NRT_services field, and at least one NRT service loop divided by a for loop. The at least one NRT service loop may include a service_id_ref field, a consumption model field, an access_controlled field, a short_service_name_length field, and a short_service_name field.

The descriptor_tag may be an 8-bit unsigned integer to distinguish this descriptor as an enhanced EPG descriptor.

The descriptor_length field may be an 8-bit unsigned integer to define the length from a field immediately following this field to the end of a link descriptor.

The num_of_NRT_services field may be a 4-bit integer indicating the number of NRT services included in a specific virtual channel in the VCT including this field, or may be a 4-bit integer indicating the number of NRT services linked with a specific event in EIT including this field.

The service_id_ref field may be a 16-bit integer identifying an NRT service included in a specific virtual channel in the VCT including this field, or may be a 16-bit integer identifying an NRT service linked with a specific event in EIT including this field.

The consumption_model field may be a 6-bit unsigned integer indicating a consumption_model of an NRT service identified by the service identifier reference field.

The access controlled field may be a 1-bit flag indicating whether an NRT service identified by the service identifier reference field is access-controlled. If a value of this field is 1, it indicates that the NRT service is access-controlled and if a value of this field is 0, it indicates that the NRT service is not access-controlled.

The short_service_name_length field may be a 3-bit unsigned integer having the same meaning as that of the short_service_name_length field in the SMT. For example, this field may indicate the length of a short service name described in the short_service_name field in a byte unit. Additionally, when service_type of a virtual channel including this field is not 0x08, a value of this field may be designated as 0. When NRT service is adjunct NRT service (for example, when service type is not 0x08), the receiver 300 may not display the name of an adjunct NRT service added to a broadcast program and transmitted according to this field, on an EPG for broadcast program.

The short_service_name field may be a variable having the same meaning as that of the short_service_name field included in the SMT, and for example, may indicate the short name of an NRT service identified by the service identifier reference field.

FIG. 85 is a view illustrating a syntax of an enhanced EPG descriptor according to another embodiment of the present invention.

Referring to FIG. 85, the enhanced EPG descriptor may be referred to as service_enhancements_descriptor. A service enhancements descriptor may include capability information of the receiver 300 to use each NRT service. Accordingly, the service enhancements descriptor further includes capability code information necessary for using each NRT service, and unlike FIG. 85, may further include at least one of capability string and capability set to indicate capability information that is required by the receiver 300 to launch or play NRT service.

The service enhancements descriptor may include a descriptor tag field, a descriptor length field, a num_of_enhancements field, and a for loop divided enhancements loop. Each enhancements loop includes a service identifier reference field, a consumption model field, a content item count field, a for loop divided content item loop, a capability code count field, and a for loop divided capability code loop. The content item loop includes a content item identifier field, and the capability code loop may include an essential_indicator field, a capability_code field, and a format_identifier field.

The Service_id_ref field may be a 16-bit unsigned integer indicating the service identifier of NRT service. An NRT service identified by the service identifier reference field may be a service that is included in a broadcast stream corresponding to this descriptor as an adjunct NRT service and transmitted. When a value of the content item count field immediately following this field is 0, a service enhancements descriptor including this field may include information on a service identified by this field. Then, when a value of the content item count field immediately following this field is not 0, a service enhancements descriptor including this field may include information on individual content items included in at least one content item loop following the content item count number.

The consumption model field may be a 6-bit unsigned integer indicating a consumption model of an NRT service identified by the service_id_ref field.

The num_of_linked_content_items field may be an 8-bit unsigned integer indicating the number of content items identified by a content item loop immediately following this field.

The content_linkage field may be a 32-bit unsigned integer matching the content_linkage field in NRT-IT in order to identify a content item that a service enhancements descriptor including this field indicates, among content items included in an NRT service identified by service_id_ref.

The capability_code_count field may be an 8-bit unsigned integer indicating the number of capability code following this field.

The essential_indicator field may be a 1-bit field indicating whether a support for capability indicated by the capability code field following this field is necessary. Whether the support is necessary may be determined depending on whether the meaningful playback of an NRT service or content item that this field indicates is possible. When a value of this field is 1, it indicates that the support is necessary, and when a value of this field is 0, it indicates that the support is not necessary. Accordingly, the receiver 300 may determine in advance whether NRT service is launchable or playable according to a value of an essential_indicator field and the performance of the receiver 300, and also determine whether to display information thereon on guide or whether to display a non-playable NRT service.

The capability_code field may be a 7-bit unsigned integer indicating a specific capability. A value of each capability code field may include specific information on at least one of a download protocol required by NRT service, a Forward error correction (FEC) algorithm, a Wrapper or archive format, a compression algorithm, and a media type.

The format_identifer field may be a 32-bit field defined by registration_descriptor of ISO/IEC 13818-1 Section 2.6.9. A value of the format identifier may be certified and registered according to the SMPTE standard. The format identifier field may be used to immediately identify and scope the capability code.

Figure 86:
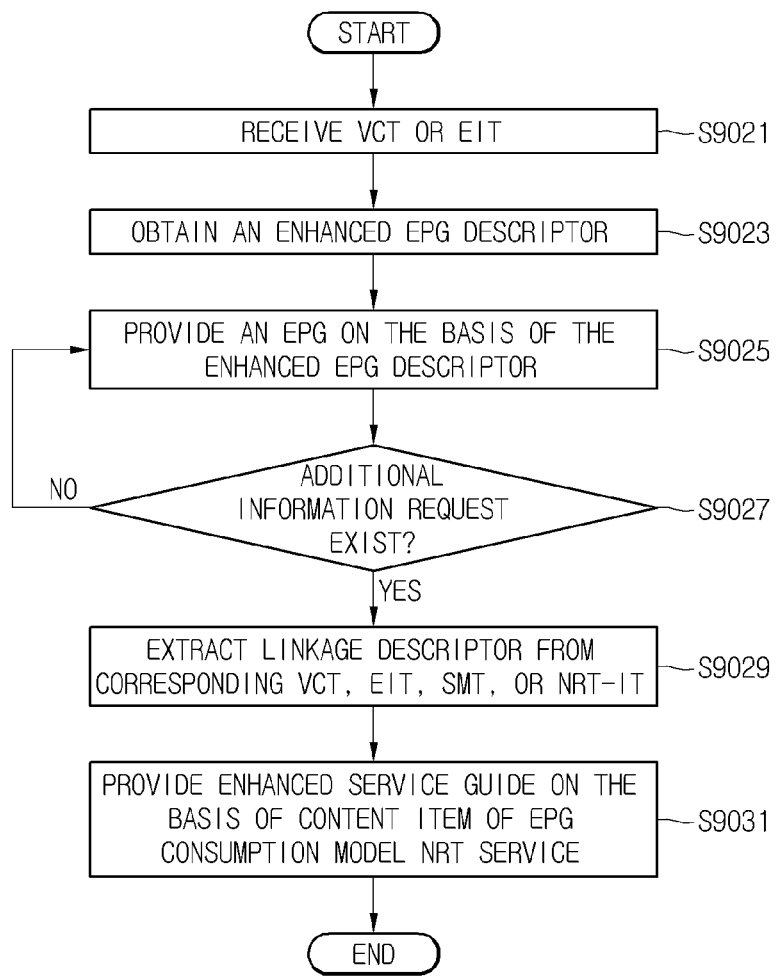
FIG. 86 is a flowchart illustrating a method of providing EPG by using an enhanced EPG descriptor and a linkage descriptor according to an embodiment of the present invention.

FIG. 86 is a flowchart illustrating a method of providing EPG by using an enhanced EPG descriptor and a linkage descriptor according to an embodiment of the present invention.

Referring to FIG. 86, like FIG. 75, the receiver 300 receives VCT or EIT in operation S9021. The receiver 300 receives a PSIP table from a broadcast channel, an internet network, or an internet network by using the service manager 350, and parses a VCT or an EIT from the received PSIP table.

Then, the receiver 300 obtains an enhanced EPG descriptor from the VCT or the EIT in operation S9023. The receiver 300 may obtain an enhanced EPG descriptor from a channel descriptor loop of the VCT or an event descriptor loop of the EIT by using the service manager 350.

Then, the receiver 300 provides an EPG on the basis of the enhanced EPG descriptor in operation S9025. Here, the receiver 300 generates a guide on an NRT service based on an enhanced EPG descriptor by using the service manager 350, and displays the generated NRT service guide. Additionally, the receiver 300 generates an NRT service guide, which is linked with a broadcast channel or broadcast program in addition to a guide, in linkage with a specific channel or event including an enhanced descriptor, and displays it.

For example, the receiver 300 obtains at least one of a service identifier of an NRT service, a consumption mode, access control information, a content item identifier, a service name, and capability information, which are linked with a specific channel or event, from the enhanced EPG descriptor shown in FIG. 84 or 85, and displays it on a service guide. Accordingly, even when information on NRT service is not received through other complex paths, the receiver 300 generates a service guide on an NRT service linked with a broadcast channel or broadcast program, and displays it, so that service delivery efficiency may be improved.

Then, once the guide is provided, a user may select a desired content, for example, a specific virtual channel, a specific program (event) or a specific NRT service, from the displayed EPG. Accordingly, the receiver 300 determines whether there is an additional information request on a corresponding content (a virtual channel, event, or NRT service object) according to a user's selection in operation S9027.

Then, when there is an additional information request on the selected content, the receiver 300 extracts the linkage descriptor from a VCT, an EIT, an SMT, or an NRT-IT corresponding to the selected content in operation S9029 The receiver 300 may identify a content item of an NRT service of an EPG consumption model indicated by a linkage descriptor. For example, when the selected content is a specific virtual channel, the receiver 300 obtains content item identification information of an NRT service designated as an EPG consumption model from the linkage information corresponding to a specific virtual channel included in the VCT and then, based on this, identifies a content item corresponding to a specific virtual channel from the content items of the received EPG consumption model NRT service.

Then, the receiver 300 provides an enhanced service guide on the basis of the identified content item of the NRT service of the EPG service consumption model in operation S9031. The receiver 300 determines whether the identified content item is received using the service manager 350, and if it is received, launches or plays a corresponding content item to generate and display an extended service guide. The receiver 300 may receive and store a content item not received yet.

FIG. 87 is a view illustrating an EPG provided through a method of receiving broadcast service according to an embodiment of the present invention.

Referring to FIG. 87, the EPG provided through a method of receiving broadcast service may include a program guide 410. The program guide 410 may include an NRT service indicator 411 and an NRT service information guide 412 corresponding to each NRT service indicator 411.

The program guide 410 may include information on an event for each virtual channel of a broadcast program, as mentioned above. The service manager 350 of the receiver 300 may generate the program guide 410 on the basis of a VCT and an EIT and display it.

Moreover, the NRT service indicator 411 may indicate that there is an NRT service corresponding to a specific virtual channel or event. The service manager 350 of the receiver 300 parses the enhanced EPG descriptor from the VCT or the EIT and determines that an NRT service identified by the enhanced EPG descriptor is linked with a specific virtual channel or specific event (a broadcast program). Accordingly, the receiver 300 displays the NRT service indicator 411 around a specific virtual channel or event to indicate that there is an NRT service linked with a specific virtual channel or specific event.

Moreover, the receiver 300 may display detailed information on NRT services corresponding to each NRT service indicator 411 on the NRT service information guide 412. The receiver 300 analyzes the enhanced EPG descriptor by using the service manager 350, obtains at least one of a service identifier, consumption model, access control information or capability information of an NRT service linked with each virtual channel or event, and based on this, displays it on the NRT service information guide 412. Additionally, the receiver 300 determines whether NRT service can be launched by the receiver 300 itself on the basis of capability information, and when the NRT service cannot be launched, a corresponding NRT service is omitted, or not displayed, or shaded to indicate that it is difficult to launch the NRT service.

Then, when a user requests additional information on a specific NRT service, a specific virtual channel, or a specific event, which are displayed on the guide 410 or 420, the receiver 300 may launch the NRT service of the EPG consumption model, so that additional information may be provided.

Therefore, the receiver 300 may generate a guide providing guide information on an NRT service linked with each channel or event on the basis of a VCT and an EIT and then, displays it. Additionally, the receiver 300 may provide guide information on NRT service without parsing or analyzing the SMT or the NRT-IT. Then, if there is a user's additional request, additional information may be provided using an NRT service of an EPG consumption model on a corresponding content, so that the receiver 300 may provide instant and rich service guide according to a user's demand.

A method of transmitting and receiving broadcast service according to the present invention may be stored in the computer readable recording medium that includes read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method for a broadcast receiving device to receive a broadcast, comprising:
   receiving, by a receiving unit, signaling data signaling first channel information for a real time service,
   wherein the signaling data includes second channel information for a non-real time service that is delivered in advance of use and stored in the broadcast receiving device;
   extracting, by a service manager, the first channel information and the second channel information from the signaling data; and
   providing, by the service manager, a service guide for displaying information about the real time service and the non-real time service together according to the signaling data, without needing other signaling data for acquiring channel information for the non-real time service, wherein the other signaling data is transmitted separately with the signaling data, wherein the second channel information includes channel number information indicating channel number of the non-real time service and service identification information identifying the non-real time service, and wherein the signaling data includes broadcast stream information identifying a broadcast stream within which the non-real time service is transmitted.

2. The method of claim 1, wherein the second channel information includes information identifying a content of the non-real time service.

3. The method of claim 1, wherein the second channel information includes first information on whether an access of the non-real time service is controlled, second information on a number of the non-real time service, and third information on a method of consuming the non-real time service.

4. A method for transmitting a broadcast, comprising:
generating, by a transmitter, signaling data signaling first channel information for a real time service, wherein the signaling data is used for providing a service guide for displaying information about the real time service and a non-real time service together, and wherein the signaling data includes second channel information for the non-real time service that is delivered in advance of use and stored in a broadcast receiving device; and transmitting, by a transmitter, the signaling data, wherein the service guide is provided according to the signaling data, without needing other signaling data for acquiring channel information for the non-real time service, wherein the other signaling data is transmitted separately with the signaling data, wherein the second channel information includes channel number information indicating channel number of the non-real time service and service identification information identifying the non-real time service, and wherein the signaling data includes broadcast stream information identifying a broadcast stream within which the non-real time service is transmitted.

5. The method of claim 4, wherein the second channel information includes information identifying a content of the non-real time service.

6. The method of claim 4, wherein the second channel information includes first information on whether an access of the non-real time service is controlled, second information on a number of the non-real time service, and third information on a method of consuming the non-real time service.

* * * * *